US008489844B2

(12) United States Patent
Orikasa et al.

(10) Patent No.: US 8,489,844 B2
(45) Date of Patent: Jul. 16, 2013

(54) STORAGE SYSTEM PROVIDING HETEROGENEOUS VIRTUAL VOLUMES AND STORAGE AREA RE-ALLOCATION

(75) Inventors: Daisuke Orikasa, Odawara (JP); Ken Matsuda, Odawara (JP); Yutaka Takata, Ninomiya (JP); Yoshiaki Eguchi, Yokohama (JP); Ai Satoyama, Sagamihara (JP); Yoichi Mizuno, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 185 days.

(21) Appl. No.: 12/811,275

(22) PCT Filed: Dec. 24, 2009

(86) PCT No.: PCT/JP2009/007207
§ 371 (c)(1),
(2), (4) Date: Jun. 30, 2010

(87) PCT Pub. No.: WO2011/077489
PCT Pub. Date: Jun. 30, 2011

(65) Prior Publication Data
US 2011/0167236 A1    Jul. 7, 2011

(51) Int. Cl.
*G06F 12/00*    (2006.01)
(52) U.S. Cl.
USPC ............................ 711/170; 711/165; 710/18
(58) Field of Classification Search
USPC .................... 711/114, 165, 170; 710/18
See application file for complete search history.

(56) References Cited

U.S. PATENT DOCUMENTS

| 6,832,248 | B1* | 12/2004 | Byrnes ..................... 709/223 |
| 7,035,883 | B2 | 4/2006 | Kezuka et al. |
| 7,398,418 | B2 | 7/2008 | Soran et al. |
| 7,698,517 | B2* | 4/2010 | Tulyani ..................... 711/161 |
| 8,006,111 | B1* | 8/2011 | Faibish et al. ............. 713/324 |
| 2002/0059539 | A1 | 5/2002 | Anderson |
| 2006/0004957 | A1* | 1/2006 | Hand et al. ................. 711/113 |
| 2006/0242376 | A1 | 10/2006 | Tsuge et al. |
| 2007/0066259 | A1 | 3/2007 | Ryan et al. |
| 2007/0185902 | A1 | 8/2007 | Messinger et al. |
| 2007/0226631 | A1 | 9/2007 | Tevis |
| 2008/0091898 | A1 | 4/2008 | Takahashi et al. |
| 2009/0043942 | A1 | 2/2009 | Shiga |
| 2009/0144732 | A1 | 6/2009 | Tanaka |
| 2010/0169541 | A1* | 7/2010 | Freikorn .................... 711/103 |
| 2011/0035548 | A1* | 2/2011 | Kimmel et al. ............ 711/114 |

FOREIGN PATENT DOCUMENTS

| JP | 2001-519563 A | 10/2001 |
| JP | 2006-302077 A | 11/2006 |
| JP | 2007-200333 A | 8/2007 |
| JP | 2007-234006 A | 9/2007 |
| JP | 2008-47156 A | 2/2008 |
| JP | 2009-43055 A | 2/2009 |
| JP | 2009-134397 A | 6/2009 |

* cited by examiner

*Primary Examiner* — Kalpit Parikh
(74) *Attorney, Agent, or Firm* — Mattingly & Malur, PC

(57) ABSTRACT

If an I/O load on a first virtual storage area falls below a first threshold, a controller copies data in a first storage area, which is allocated to the first virtual storage area, to a third storage area in a second tier storage area, and allocates the third storage area instead of the first storage area to the first virtual storage area. If an I/O load on a second virtual storage area exceeds a second threshold which is greater than said first threshold, the controller copies data in a second storage area, which is allocated to the second virtual storage area, to a fourth storage area in a first tier storage area, and allocates the fourth storage area instead of the second storage area to the second virtual storage area.

26 Claims, 38 Drawing Sheets

FIG.5

| RVOL TYPE | TIER ID |
|---|---|
| SSD | 00 |
| HDD-SAS(15K) | 01 |
| HDD-SAS(10K) | 02 |
| HDD-SATA | 03 |
| ... | ... |

| POOL ID | TIER ID | TIER RANGE | PIVOL ID | TIER THRESHOLD | USAGE RATE | ACTUAL PAGE ID |
|---|---|---|---|---|---|---|
| 00 | 00 | 1000-5000 | 00 | 90% | 75% | 00000-00999 |
|  |  |  | 02 |  |  |  |
|  |  |  | ... |  |  |  |
|  | 01 | 0-999 | 04 | 80% | 75% | 01000-02999 |
|  |  |  | ... |  |  |  |
|  | ... | ... | ... | ... | ... |  |
| ... |  |  | ... | ... | ... |  |

| VVOL ID | POOL ID | ALLOCATED TIER ID | DEFAULT TIER ID | CAPACITY | REALLOCATION |
|---|---|---|---|---|---|
| 00 | 00 | 00-01 | 00 | 1TB | ON |
| 01 | 00 | 02 | 02 | 500GB | OFF |
| ... | | | | | |

| AUTOMATIC PERFORMANCE | REALLOCATION PERFORMANCE CYCLE | REALLOCATION PERFORMANCE TIME | MONITOR TIME ZONE |
|---|---|---|---|
| ON | 1 DAY | 24:00 | 7:00 - 23:00 |
| OFF | INVALID | INVALID | INVALID |
| ... | | | |

FIG.10

| VVOL ID | VIRTUAL PAGE ID | POOL ID | ACTUAL PAGE ID | TIER ID |
|---|---|---|---|---|
| 00 | 00000 | 00 | 00010 | 01 |
| | 00001 | 00 | 00100 | 00 |
| | ... | ... | ... | ... |
| 01 | 00000 | 00 | 00020 | 01 |
| | 00001 | - | - | - |
| ... | ... | ... | ... | ... |

| POOL ID | ACTUAL PAGE ID | STATUS |
|---|---|---|
| 00 | 00000 | ON USE |
| | 00001 | FREE |
| ... | ... | ... |

| VVOL ID | VIRTUAL PAGE ID | TOTAL NUMBER OF I/OS | AVERAGE NUMBER OF I/OS | MAXIMUM NUMBER OF I/OS | LAST I/O TIME |
|---|---|---|---|---|---|
| 00 | 00000 | 1000 | 100 | 200 | 17:00 |
| | 00001 | 20 | 2 | 5 | 12:00 |
| | ... | ... | ... | ... | ... |
| 01 | 00000 | — | — | — | — |
| | 00001 | — | — | — | — |
| ... | ... | ... | ... | ... | ... |

| VVOL ID | AVERAGE NUMBER OF I/OS | NUMBER OF PAGES |
|---|---|---|
| 00 | 0 | 561 |
| | 1 | 27 |
| | 2 | 141 |
| | 3 | 57 |
| | 4-7 | 72 |
| | 8-15 | 236 |
| | 16-31 | 0 |
| ... | ... | ... |

| VIRTUAL PAGE ID | MIGRATION SOURCE TIER ID | MIGRATION DESTINATION TIER ID | MIGRATION STATUS |
|---|---|---|---|
| 10001 | 00 | 01 | COMPLETED |
| 10002 | 01 | 02 | COMPLETED |
| 10005 | 02 | 03 | IN PROCESS |
| 10008 | 03 | 01 | IN PROCESS |
| 10014 | 01 | 00 | NOT COMPLETED |
| ... | ... | ... | ... |

| VVOL ID | TIER MAINTENANCE | ALLOCATED TIER ID | STORAGE THRESHOLD |
|---|---|---|---|
| 00 | ON | 00 | 80% |
|  |  | 01 | INVALID |
|  |  | 03 | INVALID |
| 01 | OFF | 01 | 70% |
|  |  | 02 | INVALID |
| 02 | ON | 02 | INVALID |
|  |  | 03 | 70% |
| ... | ... | ... | ... |

POOL DEFINITION    1700

| | | |
|---|---|---|
| POOL ID | 00 ▶ | |
| HIERARCHIZATION | ● ON  ○ OFF | |
| REALLOCATION | ● ON  ○ OFF | |
| AUTOMATIC PERFORMANCE | ○ ON  ● OFF | |
| PERFORMANCE CYCLE | 1 DAY ▶ | |
| PERFORMANCE TIME | 24:00 ▶ | |
| MONITOR TIME ZONE | FROM 07:00 ▶  TO 23:00 ▶ | |
| TIER THRESHOLD | ○ COMMON  ● INDIVIDUAL | |
| | 90% | TIER 00  90%<br>01  80%<br>03  70% |

APPLY    CANCEL

FIG.19

VVOL CREATION  1900

| | |
|---|---|
| VVOL ID | 00 ▶ |
| POOL ID | 00 ▶ |
| REALLOCATION | ● ON  ○ OFF |
| AUTOMATIC PERFORMANCE | ● ON  ○ OFF |
| PERFORMANCE CYCLE | 1 DAY ▶ |
| PERFORMANCE TIME | 24:00 ▶ |
| MONITOR TIME ZONE | FROM 07:00 ▶  TO 23:00 ▶ |
| ALLOCATED TIER | TIER 00 ☑  01 ☑  03 ☒ |
| DEFAULT TIER | 00 ▶ |
| CAPACITY | 1TB |
| STORAGE THRESHOLD | 80% ▶  INVALID ▶  INVALID ▶ |

APPLY   CANCEL

FIG.20

| VVOL ID | COMPARISON MEANS | COMPARISON OBJECT | 4404 |
|---|---|---|---|
| 00 | ABSOLUTE VALUE | AVERAGE NUMBER OF I/OS | ... |
| 01 | RELATIVE VALUE | MAXIMUM NUMBER OF I/OS | ... |
| ... | ... | ... | ... |

FIG.32

| POOL ID | ... | COMPARISON MEANS | COMPARISON TARGET 4403 |
|---------|-----|------------------|------------------------|
| 00 | ... | ABSOLUTE VALUE | AVERAGE NUMBER OF I/OS |
| 01 | ... | RELATIVE VALUE | MAXIMUM NUMBER OF I/OS |
| ... | ... | ... | ... |

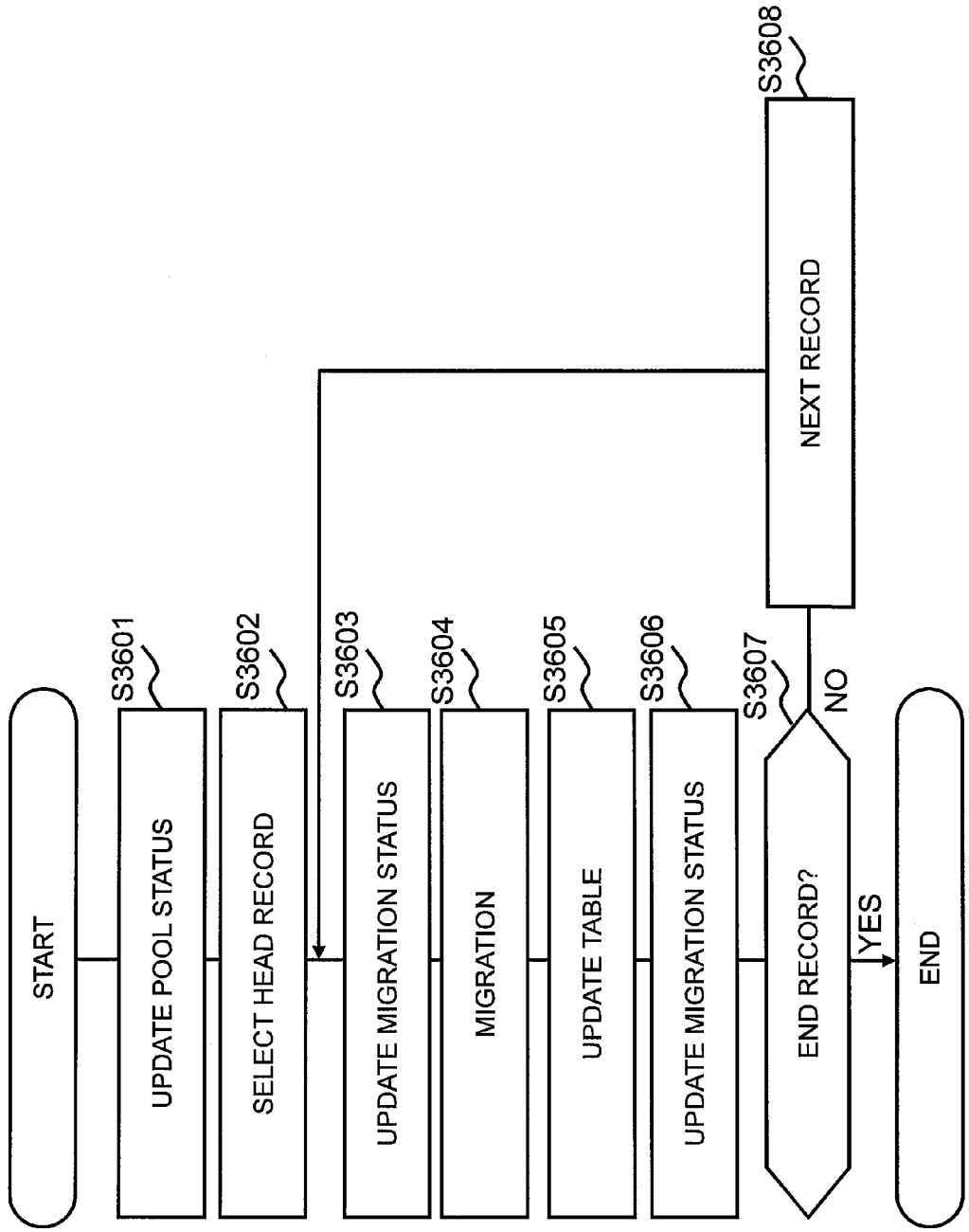

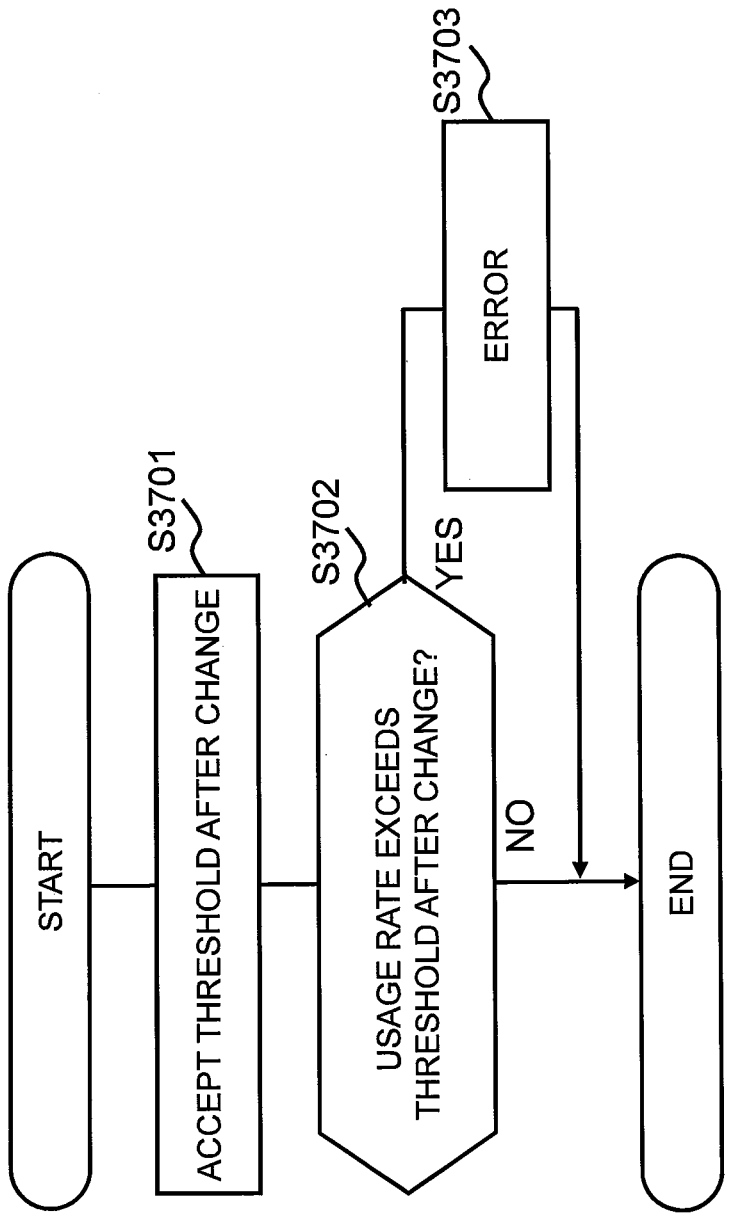

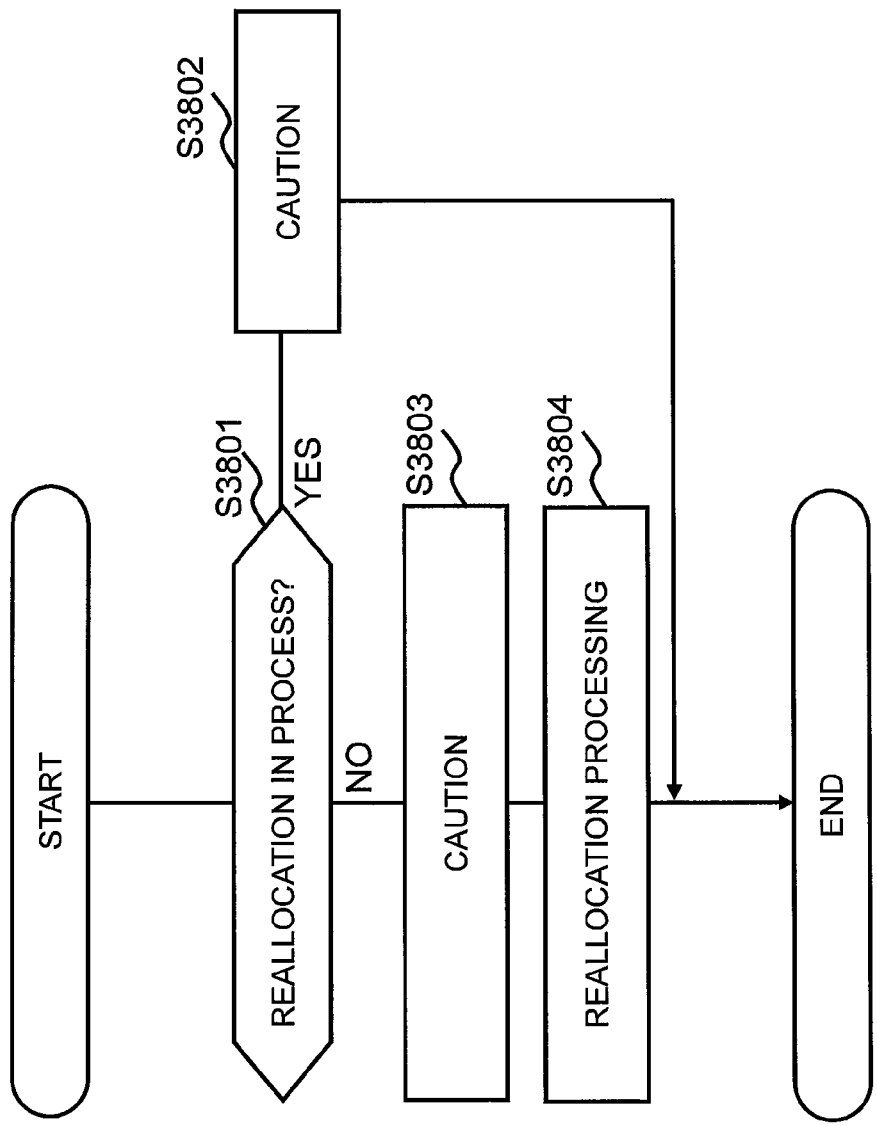

STORAGE SYSTEM PROVIDING HETEROGENEOUS VIRTUAL VOLUMES AND STORAGE AREA RE-ALLOCATION

TECHNICAL FIELD

This invention relates to storage control to which Thin Provisioning (also referred to as Dynamic Provisioning) is applied.

BACKGROUND ART

The technology of data migration is well known. Data migration is generally performed in units of volumes. For example, according to the Citation 1, all data stored in the first logical volume is migrated from the first logical volume to the second logical volume.

The technology of storage hierarchization is also well known. For example, according to the Citation 2, each of multiple logical volumes which multiple storage systems comprise is classified in any one tier of multiple tiers, and the logical volumes belonging to a certain tier are migrated to another tier. Multiple tiers, for example, include highly-reliable tiers, low-cost tiers and others.

Citation List
Patent Literature
PTL 1: Japanese Unexamined Patent Application Publication No. 2006-302077
PTL 2: Japanese Unexamined Patent Application Publication No. 2008-047156

DISCLOSURE OF INVENTION

Technical Problem

Meanwhile, the technology referred to as Thin Provisioning (also referred to as Dynamic Provisioning) is well known. According to Thin Provisioning, a virtual logical volume (virtual volume) consisting of multiple virtual storage areas (virtual pages) and multiple actual storage areas (actual pages) are provided. If write to a virtual page is performed, an actual page is allocated to the virtual page and, to the allocated actual page, the data as the write target is written.

Let us assume that the above-mentioned data migration technology and the storage hierarchization technology are applied to Thin Provisioning. Let us also assume that the first virtual volume belongs to the first tier and that the second virtual volume belongs to the second tier. In this case, from the first virtual volume belonging to the first tier to the second virtual volume belonging to the second tier, all data can be migrated.

According to this technology, though all data in the first virtual volume is migrated from the first tier to the second tier, it is not necessarily desirable for all the data to exist in the second tier.

Therefore, the purpose of this invention is the appropriate allocation of data in virtual volumes in accordance with Thin Provisioning.

Solution to Problem

Multiple storage area groups into which multiple storage areas provided by multiple storage devices are classified with reference to storage area attributes are managed. The multiple logical volumes to which, in accordance with a write request to at least one address included in multiple addresses in the logical volume, at least one storage area included in the multiple storage areas is allocated are provided. In accordance with the access condition of the at least one address in the logical volume, the data written to the at least one address by the write request is migrated from the at least one storage area included in one of the multiple storage area groups to at least one storage area in another storage area group included in the multiple storage area groups.

BRIEF DESCRIPTION OF DRAWINGS

FIG. 1 shows the overview of the Embodiment 1 of this invention.
FIG. 2 shows the configuration of a storage system 103.
FIG. 3 shows the relations among respective types of storage areas in the storage system 103.
FIG. 4 shows information and computer programs stored in the CMPK 119.
[FIG. 5]
FIG. 5 shows the configuration of a tier definition table 401.
[FIG. 6]
FIG. 6 shows the configuration of a tier management table 402.
FIG. 7 shows the configuration of a pool management table 403.
[FIG. 8]
FIG. 8 shows the configuration of a VVOL management table 404.
FIG. 9 shows the configuration of a PVOL management table 405.
[FIG. 10]
FIG. 10 shows the configuration of an allocation table 407.
[FIG. 11]
FIG. 11 shows the configuration of an actual page management table 408.
[FIG. 12]
FIG. 12 shows the configuration of monitor tables 409.
[FIG. 13]
FIG. 13 shows the configuration of a frequency distribution table 410.
[FIG. 14]
FIG. 14 shows the configuration of a migration page table 411.
[FIG. 15]
FIG. 15 shows the configuration of a migration definition table 412.
FIG. 16 shows a flowchart of the pool creation processing.
[FIG. 17]
FIG. 17 shows a pool definition GUI 1700.
FIG. 18 shows the flow of the VVOL creation processing.
[FIG. 19]
FIG. 19 shows a VVOL creation GUI 1900.
[FIG. 20]
FIG. 20 shows the VVOL management table 4404 related to the Embodiment 5 of this invention.
FIG. 21 shows the overview of the data element aggregation processing.
FIG. 22 shows the flow of the information display processing.

FIG. 23 shows a frequency distribution GUI 2300.
FIG. 24 shows the flow of the write processing (write to a cache memory).
FIG. 25 shows the flow of the destaging processing.
FIG. 26 shows the flow of the read processing.
FIG. 27 shows the overview of the relationship between the I/O frequency monitor and reallocation.
FIG. 28 shows the flow of the reallocation processing.
FIG. 29 shows the overview of the tier range determination processing.
FIG. 30 shows the flow of the tier range determination processing.
FIG. 31 shows the flow of the tier border value ascertaining processing at S4402 in FIG. 30.
[FIG. 32]
FIG. 32 shows the pool management table 4403 related to the Embodiment 5 of this invention.
FIG. 33 shows the flow of the setting processing of comparison means and comparison targets related to the Embodiment 5 of this invention.
FIG. 34 shows the flow of the migration page table creation processing at S2808 in FIG. 28.
FIG. 35 shows the overview of the page-based migration processing.
[FIG. 36]
FIG. 36 shows the flow of the page-based migration processing.
[FIG. 37]
FIG. 37 shows the flow of the tier threshold changing processing.
[FIG. 38]
FIG. 38 shows the flow of the threshold excess handling processing.

DESCRIPTION OF EMBODIMENT

Figure 1:
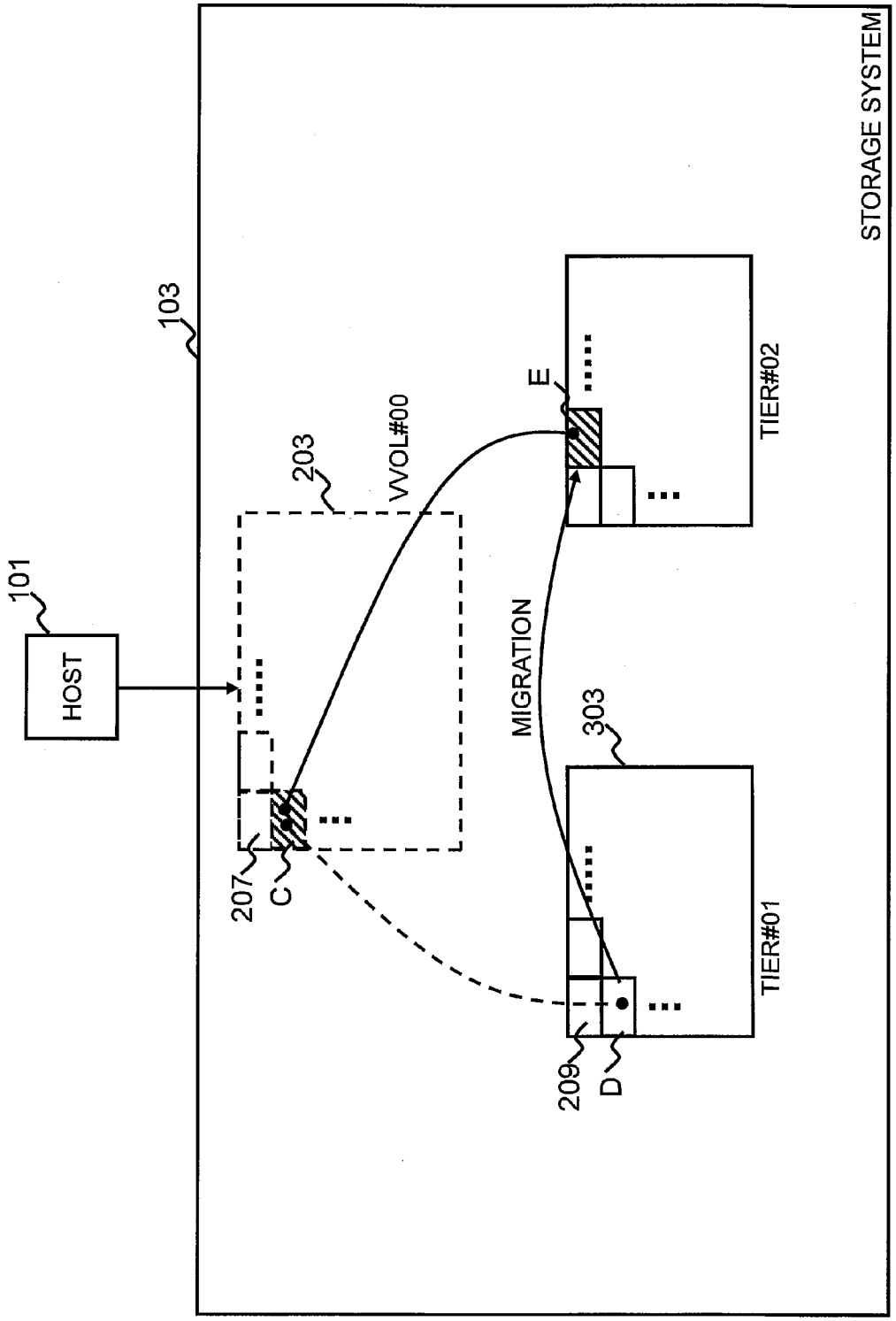
[FIG. 1]

The aspects with reference to the following multiple embodiments of this invention are described below.
Aspect 1
The method of controlling the storage system characterized by managing multiple storage area groups into which multiple storage areas provided by multiple storage devices are classified with reference to storage area attributes,
providing the multiple logical volumes to which, in accordance with a write request to at least one address included in multiple addresses in the logical volume, at least one storage area included in the multiple storage areas is allocated, and,
in accordance with the access condition of the at least one address in the logical volume, migrating the data written to the at least one address by the write request from the at least one storage area included in one of the multiple storage area groups to at least one storage area in another storage area group included in the multiple storage area groups.

Aspect 2
The method complying with the aspect 1 of controlling the storage system characterized by
that the first storage area group and the second storage area group included in the multiple storage area groups comprise the degrees of the access condition suitable for the respective groups as attributes of the respective groups, that the degrees of the access condition of the first and the second storage area groups are different among the groups but partially overlap,
and that, in the migration processing, if at least one of the storage areas included in one of the multiple storage area groups is stored in the first or the second storage area group and, at the same time, if the access condition of the at least one address is in the partially overlapping range of the degrees of the access condition, the data migration is not performed.
Aspect 3
The storage system coupled to one or more hosts comprises multiple types of physical storage device groups and a storage control device. The storage control device comprises a storage resource and a controller coupled to the multiple types of physical storage device groups, the storage resource, and the host(s). A physical storage device group is configured of one or more physical storage devices. The multiple types of physical storage device groups are the bases of multiple types of actual page groups. The type of an actual page group is based on the attribute of the physical storage device group which is the base of the actual page group. An actual page group comprises multiple actual pages. The controller provides one or more virtual volumes to the one or more hosts. The virtual volume is a virtual logical volume configured of multiple virtual pages. The virtual pages are virtual storage areas. The actual pages are actual storage areas. The storage resource stores the allocation information which is the information indicating which actual page is allocated to which virtual page, the monitor information which is the information showing the I/O (input/output) frequency of each virtual page, and the actual page group management information including the information indicating the I/O frequency range set for each actual page group type (any form of information may be permitted such as a table form or a queue form). The controller receives a write command from the host, identifies the virtual page as the write destination from the write command, updates the allocation information to allocate a free actual page to the identified virtual page, and stores the write target data in the allocated actual page. The controller, in accordance with the I/O for the virtual page or the actual page allocated to the virtual page, updates the I/O frequency of the virtual page in the monitor information. The actual page is an actual storage area, and the data stored in the actual page is stored in the physical storage device which is the base of the actual page. The controller performs the migration processing which includes the processing (A) to (C) described below, that is,
(A) identifying the virtual volume or the virtual page whose I/O frequency identified by the monitor information does not satisfy a specified condition,
(B) migrating the data stored in the first actual page in the actual page group of the first type allocated to the identified virtual volume or virtual page to the second actual page in the actual page group of the second type, and
(C) updating the allocation information to allocate the second actual page instead of the first actual page to the first virtual page which is the virtual page as the allocation destination of the first actual page. The specified condition is falling within the I/O frequency range of the actual page group of the first type. The actual page group of the second type is the actual page group whose I/O frequency range falls within the I/O frequency of the virtual volume or the virtual page identified at the (A). The controller performs the I/O frequency range determination processing and, in the determination processing, with reference to the monitor information, determines the I/O frequency ranges of the respective types of actual page groups. The controller, for example, may comprise at least one processor. The storage resource, for example, may be a memory. The host may also be a computer, another storage system, or another storage control device.

By this method, data in virtual volumes can be reallocated, in accordance with the I/O frequency of each virtual page, in units of pages. In that case, data can be made actual page groups of the type corresponding to the I/O frequency range which the I/O frequency of the virtual page to which the actual page storing the data is allocated falls within.

Aspect 4

In the storage system complying with the aspect 3, the controller, in the determination processing, performs the following processing (a) and (b), that is,
(a) by using the monitor information, creating the relation information which is the information indicating the relation between the I/O frequency and the number of virtual pages and,
(b) with reference to the relation information, determining the I/O frequency ranges of the respective types of actual page groups.

Aspect 5

In the storage system complying with the aspect 4, the controller, in the processing (b), performs the following processing (b1) to (b3), that is,
(b1) by using the relation information, ascertaining the total amount of the I/O frequencies which is the total amount of the I/O frequencies of all the virtual pages in one or more virtual volumes to which actual pages are allocated from the multiple types of actual page groups,
(b2) with reference to the ratio of the performance values of the respective types of actual page groups and the total amount of I/O frequencies, ascertaining the border value which is the I/O frequency of an actual page group border per actual page group border and,
(b3) with reference to the I/O frequencies of the respective types of actual page groups and the border value of each actual page group border, determining the I/O frequency ranges of the respective types of actual page groups.

The performance value of an actual page group is the value related to the performance determined with reference to the attribute of the physical storage device group which is the base of the actual page group. The actual page group border is the border between an actual page group and the higher and/or the lower actual page group(s) of the same. The maximum value and/or the minimum value of the I/O frequency range of each actual page group is/are the value(s) determined with reference to the border value of the border between the actual page group and the higher and/or the lower actual page group(s) of the same.

Aspect 6

In the storage system complying with any of the aspects 3 to 5, the maximum value of the I/O frequency range is larger than the larger border value corresponding with the I/O frequency range, and/or the minimum value of the I/O frequency range is smaller than the smaller border value corresponding with the I/O frequency range.

Aspect 7

In the storage system complying with the aspect 3 or 4, the performance value of an actual page group is the value ascertained by multiplying the number of actual pages which can be the migration destination in the migration processing by the performance value per actual page in the actual page group. The performance value per actual page in the actual page group is the value related to the performance determined with reference to the attribute of the physical storage device group which is the base of the actual page group.

Aspect 8

In the storage system complying with any of the aspects 3 to 7, the controller, in the determination processing, performs the processing described below, that is,
(a) by using the monitor information, ascertaining the total amount of the I/O frequencies which is the total amount of the I/O frequencies of all the virtual pages in one or more virtual volumes to which actual pages are allocated from the multiple types of actual page groups,
(b) with reference to the ratio of the performance values of the respective types of actual page groups and the total amount of I/O frequencies, ascertaining the border value which is the I/O frequency of an actual page group border per actual page group border and,
(c) with reference to the I/O frequencies of the respective types of actual page groups and the border value of each actual page group border, determining the I/O frequency ranges of the respective types of actual page groups.

The performance value of an actual page group is the value related to the performance determined with reference to the attribute of the physical storage device group which is the base of the actual page group. The actual page group border is the border between an actual page group and the higher and/or the lower actual page group (s) of the same. The maximum value and/or the minimum value of the I/O frequency range of each actual page group is/are the value(s) determined with reference to the border value of the border between the actual page group and the higher and/or the lower actual page group(s) of the same.

Aspect 9

In the storage system complying with any of the aspects 3 to 8, the controller, in the determination processing, performs the processing (d) and (e) described below, that is,
(d) assuming that the data elements in the actual pages allocated to all the virtual pages whose I/O frequencies fall within the I/O frequency range of the actual page group are migrated to the actual page group, determining whether the usage rate of the actual page group exceeds the rate threshold of the actual page group or not and,
(e) if the result of this determination at the (d) is negative, including the determined I/O frequency range in the actual page group management information.

The usage rate of the actual page group is the rate of the number of actual pages allocated to the virtual page to the number of the actual pages configuring the actual page group. The rate threshold of the actual page group is the threshold of the usage rate.

This method makes it possible to determine whether the I/O frequency range is appropriate or not.

Aspect 10

In the storage system complying with the aspect 9, the controller, in the determination processing, further performs the processing (f) described below, that is,
(f) if the result of this determination at the (d) is affirmative, altering the I/O frequency range to the width which the usage rate of the actual page group will not exceed the rate threshold of the actual page group.

Aspect 11

In the storage system complying with the aspect 10, the controller, in the determination processing, further performs the processing (g) described below, that is,
(g) including the altered I/O frequency range in the actual page group management information.

Aspect 12

In the storage system complying with any of the aspects 3 to 11, the I/O frequency of the virtual volume or the virtual page identified by the monitor information is the I/O frequency included in the monitor information of the virtual volume or the virtual page.

Aspect 13

In the storage system complying with any of the aspects 3 to 12, the I/O frequency of the virtual volume or the virtual page identified by the monitor information is the relative value to the I/O frequency of a different virtual volume from the virtual volume or to the I/O frequency of a different virtual page from the virtual page.

Aspect 14

In the storage system complying with any of the aspects 3 to 12, the controller receives a specification of whether to make the I/O frequency at the (A) an absolute value or a relative value. If a specification for the absolute value is received, the I/O frequency of the virtual volume or the virtual page identified by the monitor information is the I/O frequency included in the monitor information of the virtual volume or the virtual page. If a specification for a relative value is received, the I/O frequency of the virtual volume or the virtual page identified by the monitor information is the relative value to the I/O frequency of a different virtual volume from the virtual volume or to the I/O frequency of a different virtual page from the virtual page in the monitor information.

Aspect 15

In the storage system complying with any of the aspects 3 to 14, the I/O frequency at the (A) is the average of the number of I/Os at a certain point of time.

Aspect 16

In the storage system complying with any of the aspects 3 to 14, the I/O frequency at the (A) is the maximum number of multiple numbers of I/Os respectively corresponding with multiple points of time in a certain time zone.

Aspect 17

In the storage system complying with any of the aspects 3 to 14, the controller receives a specification of whether to make the I/O frequency at the (A) the average number of I/Os or the maximum number of I/Os. If a specification for the average number of I/Os is received, the I/O frequency at the (A) is the average of the number of I/Os at a certain point of time. If a specification for the maximum number of I/Os is received, the I/O frequency at the (A) is the maximum number of multiple numbers of I/Os respectively corresponding with multiple points of time in a certain time zone.

Aspect 18

In the storage system complying with any of the aspects 3 to 17, the controller receives an I/O command from the host and identifies the virtual page as the I/O destination from the I/O command. The controller, if performing I/O for the actual page allocated to the virtual page as the I/O destination, updates the I/O frequency corresponding with the virtual page as the I/O destination in the monitor information or, if not performing I/O for the actual page allocated to the virtual page as the I/O destination, does not update the I/O frequency corresponding with the virtual page as the I/O destination in the monitor information.

By this method, only when I/O is performed for an actual page, the I/O frequency of the virtual page to which the actual page is allocated can be updated.

Aspect 19

In the storage system complying with the aspect 18, the storage resource stores, as the monitor information, the monitor information in the active status and the monitor information in the standby status. The controller updates the I/O frequency in the active monitor information. The controller, in the page-based migration processing, with reference to the active monitor information, identifies the first virtual page as well as changes the status of the standby monitor information from standby to active, and then, if performing I/O for an actual page in accordance with an I/O command by which the virtual page is identified, updates the I/O frequency of the identified virtual page in the monitor information whose status is changed to active.

By this method, even when the migration processing is performed, monitoring (updating) the I/O frequency can be continued.

Aspect 20

In the storage system complying with the aspect 4, the controller outputs the relation information to display the created relation information. The controller, when receiving an instruction for starting migration, starts the migration processing.

Aspect 21

In the storage system complying with any of the aspects 3 to 20, the controller, if the usage rate of the first actual data group exceeds the specified rate threshold, starts the migration processing.

Therefore, if the usage rate of the first actual data group exceeds the specified rate threshold, by the migration processing, the number of free actual pages can be expected to increase in the first actual data group.

Aspect 22

In the storage system complying with any of the aspects 3 to 21, the actual data group of the first type is the most significant actual data group. The controller, to the virtual page as the write destination identified by the write command, always allocates an actual page from the actual data group of the first type.

Aspect 23

In the storage system complying with any of the aspects 3 to 22, the controller, if the larger number of actual pages than a specified rate of all the actual pages allocated to the virtual volume exist in a certain type of actual page group, among all the actual pages allocated to the virtual volume, the data in the actual pages in the actual page groups of other types than the certain type of actual page group is migrated to the actual page in the certain type of actual page group.

By this method, in accordance with the status of data allocation in the virtual volume, in the actual page group of the type considered to be appropriate for the virtual volume, the data in the virtual volume can be aggregated.

Aspect 24

In the storage system complying with the aspect 23, the actual pages allocated to the virtual page after migration to the actual pages in the certain type of actual page group are always the actual pages in the certain type of actual page group.

By this method, after data is aggregated by the migration processing, to the second virtual volume, actual pages are allocated from the certain type of actual page group.

Aspect 25

In the storage system complying with any of the aspects 3 to 24, the controller, if receiving a write command by which the first virtual page is identified from the host after the page-based migration processing is started and, at the same time, if data migration from the first actual page to the second actual page is not started yet, cancels the migration, writes the data complying with the write command to the actual page in the second type of actual page group, and also updates the allocation information to allocate the actual page as the write destination instead of the first actual page to the first virtual page.

As data is written to the actual page group as the migration destination before migration, migration does not have to be performed for the virtual page as the write destination of the data.

Aspect 26

In the storage system complying with any of the aspects 3 to 25, the controller, if receiving a write command by which the first virtual page is identified from the host after the page-based migration processing is started and, at the same time, if data migration from the first actual page to the second actual page is not started yet, writes the data complying with the write command to the first actual page, and then, performs the processing (A) and (B).

Aspect 27

In the storage system complying with any of the aspects 3 to 26, the controller, if receiving a write command by which the first virtual page is identified from the host after the page-based migration processing is started and, at the same time, if data is being migrated from the first actual page to the second actual page, cancels the migration, writes the data complying with the write command to the actual page in the second type of actual page group, and also updates the allocation information to allocate the actual page as the write destination instead of the first actual page to the first virtual page.

Aspect 28

In the storage system complying with any of the aspects 3 to 26, the controller, if receiving a write command by which the first virtual page is identified from the host after the page-based migration processing is started and, at the same time, if data is being migrated from the first actual page to the second actual page, writes the data complying with the write command to the first actual page, and then, resumes the data migration from the first actual page to the actual page in the second type of actual page group.

Aspect 29

In the storage system complying with any of the aspects 3 to 26, the controller, if receiving a write command by which the first virtual page is identified from the host after the page-based migration processing is started and, at the same time, if data is being migrated from the first actual page to the second actual page, after the migration is completed, in accordance with the allocation information, writes the data complying with the write command to the second actual page.

Aspect 30

In the storage system complying with any of the aspects 3 to 26, the controller, if receiving a write command by which the first virtual page is identified from the host after the page-based migration processing is started and, at the same time, if data is being migrated from the first actual page to the second actual page, writes data complying with the write command to both the first actual page and the second actual page.

Aspect 31

In the storage system complying with any of the aspects 3 to 30, the controller, if receiving a write command by which the first virtual page is identified from the host after the page-based migration processing is started and, at the same time, if the processing (A) and (B) are completed, in accordance with the allocation information, writes the data complying with the write command to the second actual page.

Aspect 32

In the storage system complying with any of the aspects 3 to 31, the first virtual page is the virtual page whose last I/O time, which is the latest time of performing I/O, satisfies a specified condition.

Aspect 33

In the storage system complying with the aspect 32, the specified condition is that the last I/O time should be earlier than the current time by a specified length of time or larger. The second type of actual page group is the actual page group that is less significant than the first actual page group.

Aspect 34

In the storage system complying with any of the aspects 3 to 33, the first virtual page is the virtual page for which I/O complying with a sequential access occurred. The second type of actual page group is the actual page group that is less significant than the first type of actual page group.

Aspect 35

In the storage system complying with any of the aspects 3 to 34, the controller updates the monitor information only in a specified time zone. The controller, each time the specified time zone is passed, saves the monitor information. The first virtual page is the virtual page whose I/O frequency identified by the monitor information corresponding with the specified time zone does not satisfy the specified condition.

Aspect 36

The storage control device of the storage system coupled to the host(s) comprises a storage resource and a controller coupled to the storage resource and the host(s). The controller provides one or more virtual volumes to the one or more hosts. The virtual volume is a virtual logical volume configured of multiple virtual pages. The virtual pages are virtual storage areas. The actual pages are actual storage areas. The storage resource stores the allocation information which is the information indicating which actual page is allocated to which virtual page, the monitor information which is the information showing the I/O (input/output) frequency of each virtual page, and the actual page group management information including the information indicating the I/O frequency range set for each actual page group type. The controller receives a write command from the host, identifies the virtual page as the write destination from the write command, updates the allocation information to allocate a free actual page from any of the multiple types of actual pages to the identified virtual page, and stores the write target data in the allocated actual page. The controller, in accordance with the I/O for the virtual page or the actual page allocated to the virtual page, updates the I/O frequency of the virtual page in the monitor information. The actual page is an actual storage area. The actual page group comprises multiple actual pages. The controller performs the migration processing which includes the processing (A) to (C) described below, that is, (A) identifying the virtual volume or the virtual page whose I/O frequency identified by the monitor information does not satisfy a specified condition, (B) migrating the data stored in the first actual page in the actual page group of the first type allocated to the identified virtual volume or virtual page to the second actual page in the actual page group of the second type, and (C) updating the allocation information to allocate the second actual page instead of the first actual page to the first virtual page which is the virtual page as the allocation destination of the first actual page. The specified condition is falling within the I/O frequency range of the actual page group of the first type. The actual page group of the second type is the actual page group whose I/O frequency range falls within the I/O frequency of the virtual volume or the virtual page identified at the (A). The controller performs the I/O frequency range determination processing and, in the determination processing, with reference to the monitor information, determines the I/O frequency ranges of the respective types of actual page groups.

The above-mentioned aspects 1 and 2 are the aspects referring to the control method of the storage system as an example, the aspects 3 to 35 are the aspects referring to the storage system as an example, and the aspect 36 is an aspect referring to the storage control device as an example, any aspects of which can be at least one aspect of a storage system, a storage control device, a storage control method, the control method of a storage system or a storage control device, a storage system or a storage control device, and a computer program (e.g. a computer program for storage control or a computer program performed by a storage system or the storage control device).

The storage system related to some of the embodiments of this invention is described below with reference to the attached figures. Note that, in the description below, the target might be referred to by a combination of the name and the ID instead of the reference sign. For example, if the logical volume is referred to by the reference sign 500, [the combination] is "logical volume 500" while, if the logical volume whose ID is 00 is referred to, [the combination] is "logical volume #00." Furthermore, data stored in one actual page is hereinafter referred to as "data elements." Furthermore, the data elements stored in actual pages allocated to virtual pages might be referred to as "data elements in virtual pages" or by similar expressions.

Embodiment 1

FIG. 1 shows the overview of the Embodiment 1 of this invention.

To a storage system 103, a host device (hereinafter referred to as a host) 101 is coupled. There may be one host 101 or may also be multiple hosts 101. The storage system 103 provides a virtual volume (hereinafter referred to as a VVOL (Virtual VOLume)) 203 to the host 101 and comprises multiple types of tiers 303.

A VVOL 203 is a virtual logical volume complying with Thin Provisioning, that is, a logical volume not based on a physical storage device (hereinafter referred to as a PDEV). A VVOL 203 is configured of multiple virtual pages 207. A virtual page 207 is a virtual storage area. As a VVOL 203, let us assume that one VVOL #00 exists. Hereinafter, a virtual page #b in a VVOL #a is referred to as a "virtual page #(a-b)." The VVOL 203 for Thin Provisioning is provided to the host 101 as what comprises a virtual capacity and, in accordance with a write request from the host 101 to an address in a virtual page, an actual page is allocated. Therefore, except for the status where actual pages are already allocated to fill the virtual capacity, the total capacity of all the actual pages allocated to a VVOL 203 is smaller than the virtual capacity. One VVOL 203 is provided to one or more hosts 101 and, if the VVOL 203 is provided to multiple hosts 101, the VVOL is supposed to be shared by these multiple hosts 101.

A tier 303 is configured of multiple actual pages 209. An actual page 209 is an actual storage area. As a tier 303, for example, let us assume that two tiers #01 and #02 exist. Hereinafter, an actual page #d in a tier #c is assumed to be referred to as an "actual page #(c-d)." Note that a tier 303, for example, may be configured of one or more actual volumes (hereinafter referred to as an RVOL (Real VOLume). An RVOL is an actual logical volume, that is, a logical volume based on a PDEV. Each of multiple tiers 303 in one pool is, in the status before data migration, set to be used by one or more VVOLs 203.

A host 101 is generally a computer, but may also be permitted to be another storage system instead of a computer. The host 101, for example, transmits an I/O (Input/Output) command to the storage system 103. The I/O command is, for example, a write command or a read command, comprising I/O destination information. The I/O destination information is the information indicating the I/O destination, for example, including the ID of a VVOL 203 (e.g. an LUN (Logical Unit Number)) and the address of the I/O destination (e.g. an LBA (Logical Block Address)). From the I/O destination information, the VVOL 203 and the virtual page 207 of the I/O destination is identified.

Let us assume that the storage system 103 receives a write command from the host 101 and that, with reference to the I/O destination information which the write command comprises, identifies a virtual page #(00-c) as the write destination. The storage system 103, if no actual page 209 is allocated to the identified virtual page #(00-c), allocates one of free (unallocated) actual page #(01-D) to the virtual page 207 and, to the allocated actual page #(01-D), writes the data elements of the write target complying with the write command.

In this embodiment, data migration is performed in units of pages. As more specifically described, for example, as shown in FIG. 1, the storage system 103 performs the processing below, that is, migrating the data elements in the actual page #(01-D) allocated to the virtual page #(00-c) to a free (unallocated) actual page #(02-E), change the allocation source of the virtual page #(00-C) from the actual page #(01-D) to the actual page #(02-E), and updating the status of the actual page #(01-D) to free (unallocated).

Whether to migrate data or not and which tier should be the migration destination are determined with reference to the tier range described later. The tier range is automatically determined.

The Embodiment 1 is described below in details.

Figure 2:
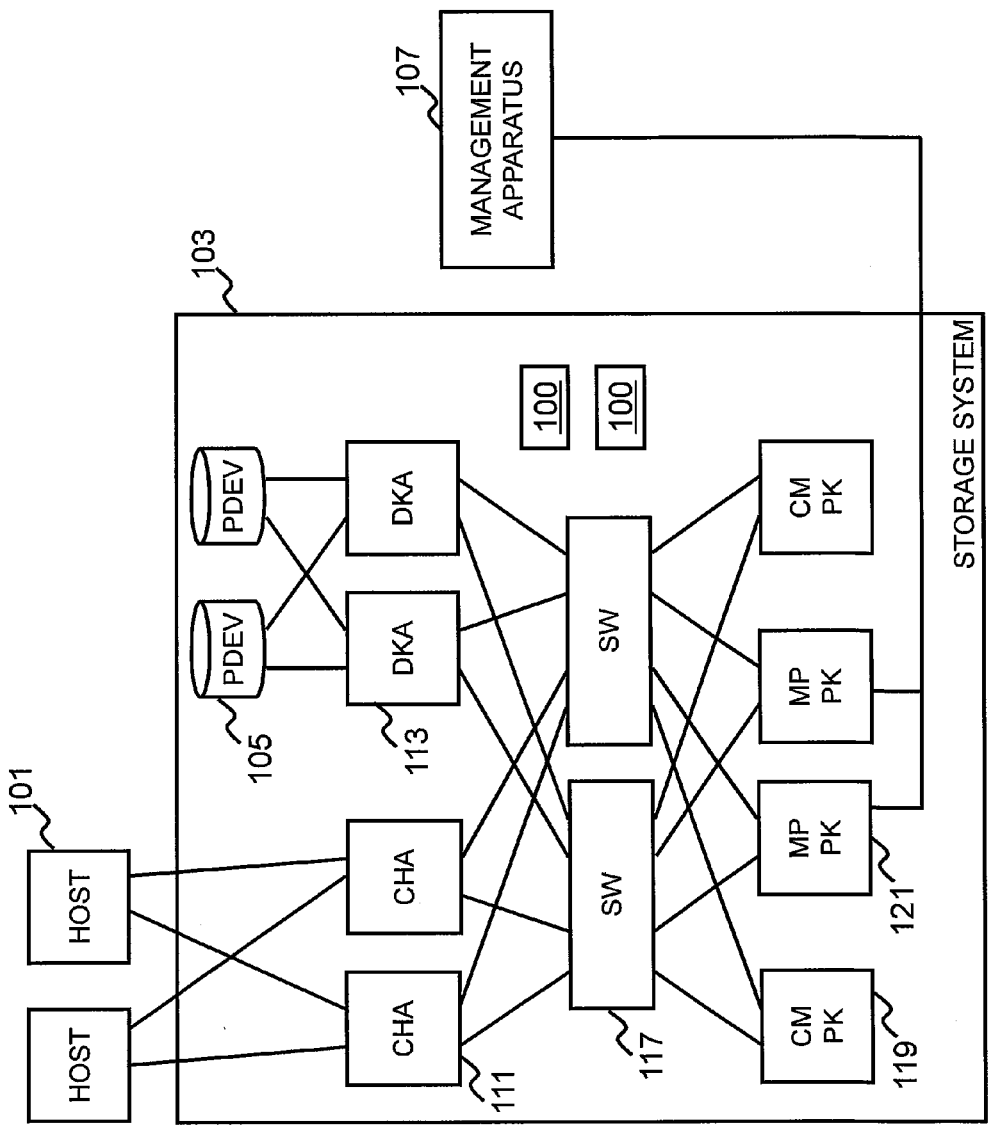
[FIG. 2]

FIG. 2 shows the configuration of a storage system 103.

The storage system 103 comprises multiple PDEVs 105, a storage control device coupled to the multiple PDEVs 105, and power-supply units 100.

The multiple PDEVs 105 include multiple types of PDEVs, for example, SSDs (Solid State Drives) and HDDs (hard disk drives). HDDs are, for example, HDD-FC (Fibre Channel), HDD-SATA (Serial ATA), HDD-SAS (Serial Attached SCSI), and others.

The storage control device comprises a controller and multiple CMPKs (cache memory packages) 119 coupled to the controller. The controller comprises multiple CHAs (channel adapters) 111, multiple DKAs (disk adapters) 113, multiple MPPKs (microprocessor packages) 121, and SWs (switches) 117. Though the CHAs 111, the DKAs 113, the MPPKs 121, the SWs 117, and the power-supply units 100 are multiple from the perspective of redundancy, at least one of those numbers is not limited to 2 as shown in the figure and may also be permitted to be larger or smaller than 2. The number of CMPKs 119 may also be permitted to be larger than 2.

A power-supply unit 100 supplies power based on power from commercial power supply to each of the packages 119, 111, 113, 121, and 117.

A CHA 111 is an interface device coupled to the host 101. The CHA 111 receives an I/O command (write command or read command) from the host 101 and transfers the received I/O command to one of the multiple MPPKs 121.

A CHA 111 comprises a protocol chip 112 and an LR (Local Router) 114. The protocol chip 112 performs protocol conversion for the communication with the host 101. The LR 114 transfers a received I/O command to an MPPK 121 corresponding with the I/O destination identified from the I/O destination information which the I/O command comprises.

The DKA 113 is an interface device coupled to the HDDs 105. The DKA 113 reads data from an HDD 105 and transfers the data to a DRAM (Dynamic Random Access Memory) in the CMPK 119, and writes the data from the CMPK 119 to the HDD 105.

An MPPK 121 is a device comprising one or more MPs (microprocessors). An MP processes I/O commands from the CHAs 111.

To an SW 117, multiple packages, that is, the CHAs 111, the DKAs 113, the CMPKs 119, and the MPPKs 121 are coupled. The SWs 117 control connection among the PKs (packages).

A CMPK 119 comprises a volatile memory and/or non-volatile memory. A CMPK 119, for example, includes a storage area (hereinafter referred to as a cache memory or, abbreviated as CM) where the data elements as the I/O target for a virtual page 207 (actual page 209) are temporarily stored. Furthermore, a CMPK 119 includes a storage area where various types of information and computer programs are stored. The information and computer programs are described later.

To the storage system 103, a management apparatus 107 is coupled. The management apparatus 107 is, for example, a computer comprising a display device and an input device. The administrator can perform various types of setting from the management apparatus 107 for the storage system 103.

Figure 3:
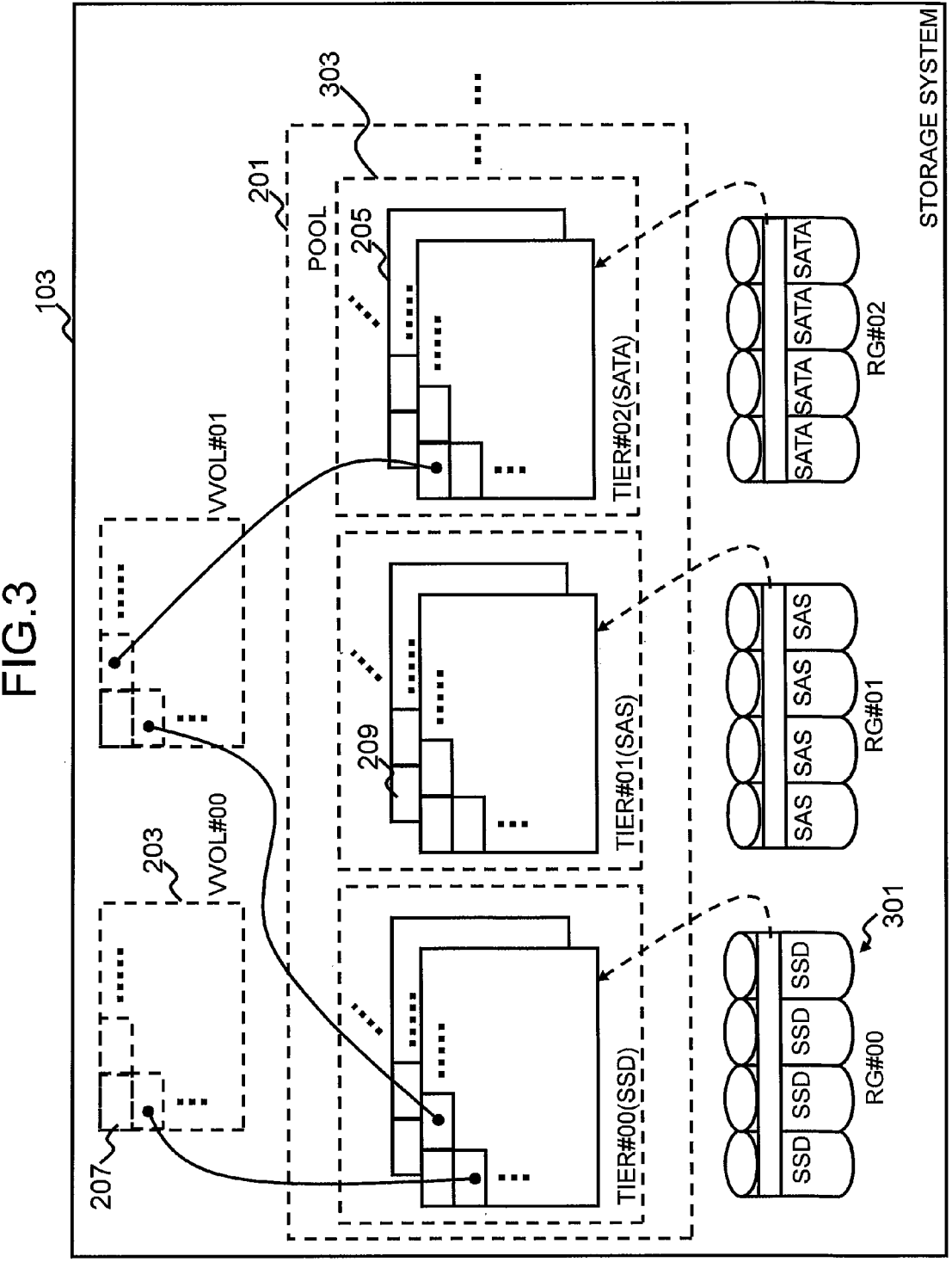
[FIG. 3]

FIG. 3 shows the relations among respective types of storage areas in the storage system 103.

As shown in FIG. 3, from lower to higher, one or more RGs 301, one or more pools 201, and one or more VVOLs 203 are managed.

An RG 301 is the abbreviation of a RAID group. One RG 301 is configured of the same type of PDEVs. The PDEV type is defined by at least either one of the performance or the unit cost. The performance is, for example, the data I/O speed or the response time (the length of time since a command is received from the host until a response is returned). The unit cost is the cost required for saving the data of a unit size (e.g. what is called a bit cost). For example, an RG #00 is configured of multiple SSDs, an RG #01 is configured of multiple HDD-SASs, and an RG #02 is configured of multiple HDD-SATAs. Note that the capacity of multiple PDEVs configuring one RG is, for example, equal.

A pool 201 is a set of actual pages 207. As more specifically described, for example, a pool 201 is configured of one or more RVOLs 205 and each RVOL 205 is configured of one or more actual pages 207. An RVOL configuring a pool 201 is hereinafter referred to as a "PVOL" as the abbreviation of a pool VOL.

Actual pages 207 configuring one pool 201 are hierarchized. That is, in one pool 201, multiple tiers 303 exist. The tiers 303, for example, exist for each RVOL type. For example, according to FIG. 3, as there are 3 types of RVOLs, the number of tiers 303 is also 3. For this reason, to one tier 303, RVOLs 205 corresponding with the tier are supposed to belong. As more specifically described, for example, to a tier #00, which is of the SSD type, the RVOLs based on the RG 301 configured of SSDs are supposed to belong while, to a tier #01, which is of the HDD-SAS type, the RVOLs based on the RG 301 configured of HDD-SASs are supposed to belong and, to a tier #03, which is of the HDD-SATA type, the RVOLs based on the RG 301 configured of HDD-SATAs are supposed to belong. Note that tiers 303 do not necessarily have to be set strictly for each RVOL type. To one tier 303, multiple RVOLs 205 based on the similar type of RGs may also be permitted to belong.

With a VVOL 203, from one or more pools 201, a pool 201 to be the allocation source is associated. Furthermore, with a VVOL 203, from the selected pool 201, a tier (hereinafter referred to as an allocation tier) 303 which can be used as the allocation source 303 is associated. Furthermore, with a VVOL 203, one of one or more allocation tiers 303 is associated as a default tier 303. According to FIG. 3, the allocation tiers of the VVOL #01 are a tier #00 and a tier #02

Furthermore, according to the description above, it is possible that multiple RVOLs, if belonging to the same tier, are based on one RG though, if they belong to different tiers respectively, [the RVOLs] are supposed to be based on different RGs respectively. For serially allocating multiple actual pages to multiple virtual pages in one or more VVOLs 203 associated with the same tier, it is desirable that actual pages are serially selected across the RGs associated with this tier 303. As more specifically described, multiple actual pages are serially selected from multiple RVOLs 205 included in this tier 303, considering the relation with the RGs, actual pages are serially selected from different RGs serially. By this method, it is possible to improve the access performance.

Figure 4:
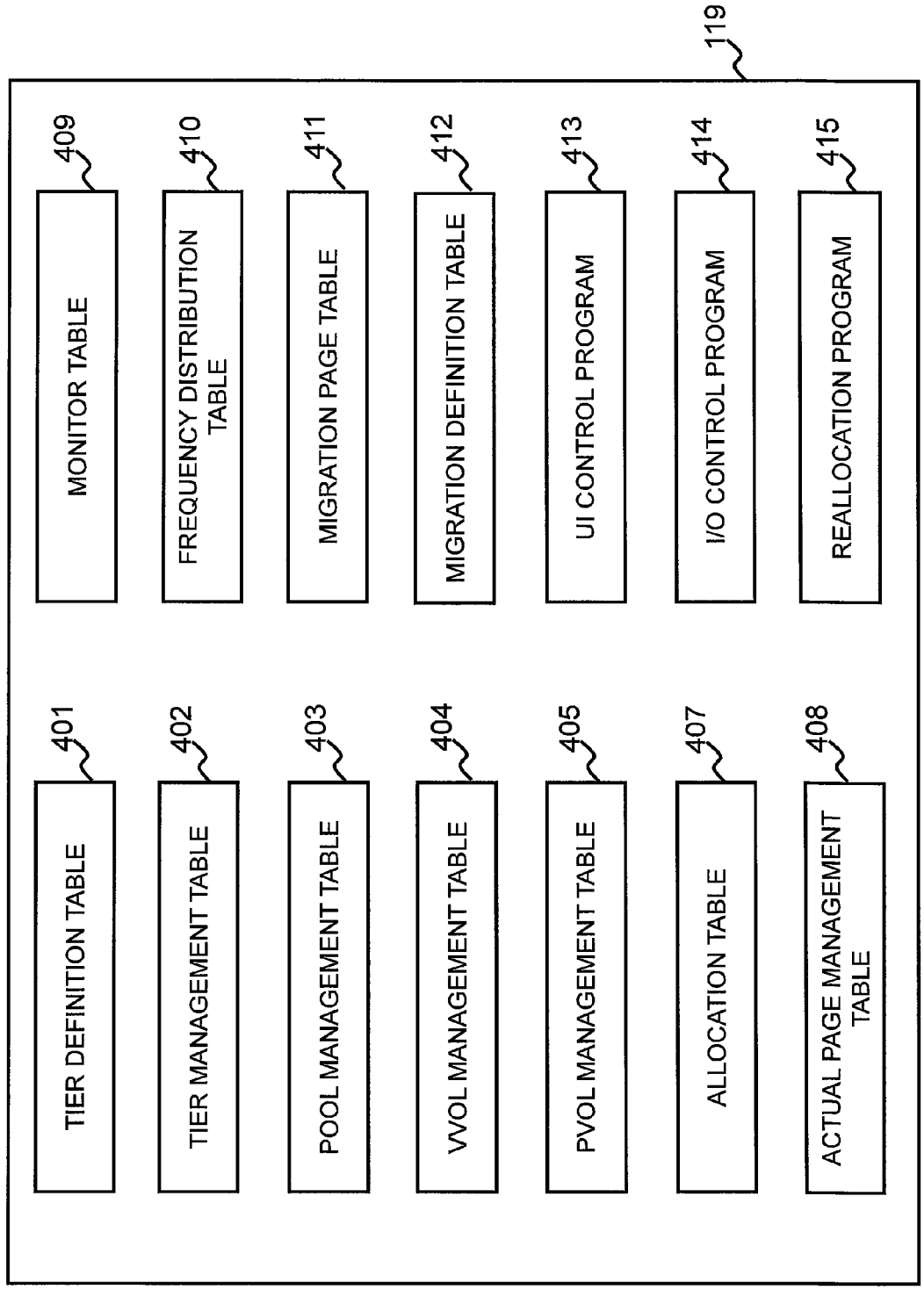
[FIG. 4]

FIG. 4 shows information and computer programs stored in a CMPK 119. Note that, though this embodiment adopts tables as an example of information, the information may also be permitted to be in other forms than tables (e.g. queue form).

The CMPK 119, as information, stores a tier definition table 401, a tier management table 402, a pool management table 403, a VVOL management table 404, a PVOL management table 405, an allocation table 407, an actual page management table 408, a monitor table 409, a frequency distribution table 410, a migration page table 411, and a migration definition table 412. Meanwhile, the CMPK 119 stores, as computer programs, a UI control program 413 controlling UIs (User Interfaces), an I/O control program 414 for controlling I/O, and a reallocation program 415 for performing reallocation. Note that at least one of these tables and computer programs may also be permitted to be stored in other storage resources than the CMPK 119. For example, at least one computer program and/or migration page table 411 may also be permitted to be stored in a memory in the MPPK 121.

Each table is described below. Note that, though the description below identifies the subjects using the IDs, [the subject] may also be permitted to be identified using at least one name and number instead of or in addition to the ID.

FIG. 5 shows the configuration of a tier definition table 401.

The tier definition table 401 is the table showing the definition of a tier. As more specifically described, for example, the table 401 shows the relation between the RVOL types and the tier IDs. According to the table 401, as a tier corresponding with the RVOL type "SSD," the tier to which the ID "00" is given is supposed to be provided.

FIG. 6 shows the configuration of a tier management table 402.

The tier management table 402 is the table for managing the information related to tiers. As more specifically described, for example, the table 402, for each tier, comprises the pool ID, the tier ID, the tier range, the PVOL ID, the tier threshold, the usage rate, and the actual page ID. As for one tier (hereinafter referred to as a "target tier" in the description of FIG. 6) as an example, these information elements are, specifically, as follows.

The "pool ID" is the ID of the pool comprising the target tier.

The "tier ID" is the ID of the target tier. From the tier ID, the type of the PDEV as the base of the PVOL belonging to the target tier is uniquely identified.

The "tier range" is the range of the load on the actual pages (e.g. I/O frequency) which should exist in the target tier.

The "PVOL ID" is the ID of the PVOL belonging to the target tier.

The "tier threshold" is the threshold of the usage rate of the target tier.

The "usage rate" is the usage rate of the target tier, that is, the rate of the number of already allocated actual pages to the number of actual pages configuring the target tier.

The "actual page ID" is the ID of all the actual pages belonging to the target tier.

Though, according to the example of the table 402 in FIG. 6, the tier threshold is set for each tier, instead of which, it may also be permitted that one tier threshold is set for each pool and that the one tier is common to all the tiers that the one pool comprises.

Figure 7:
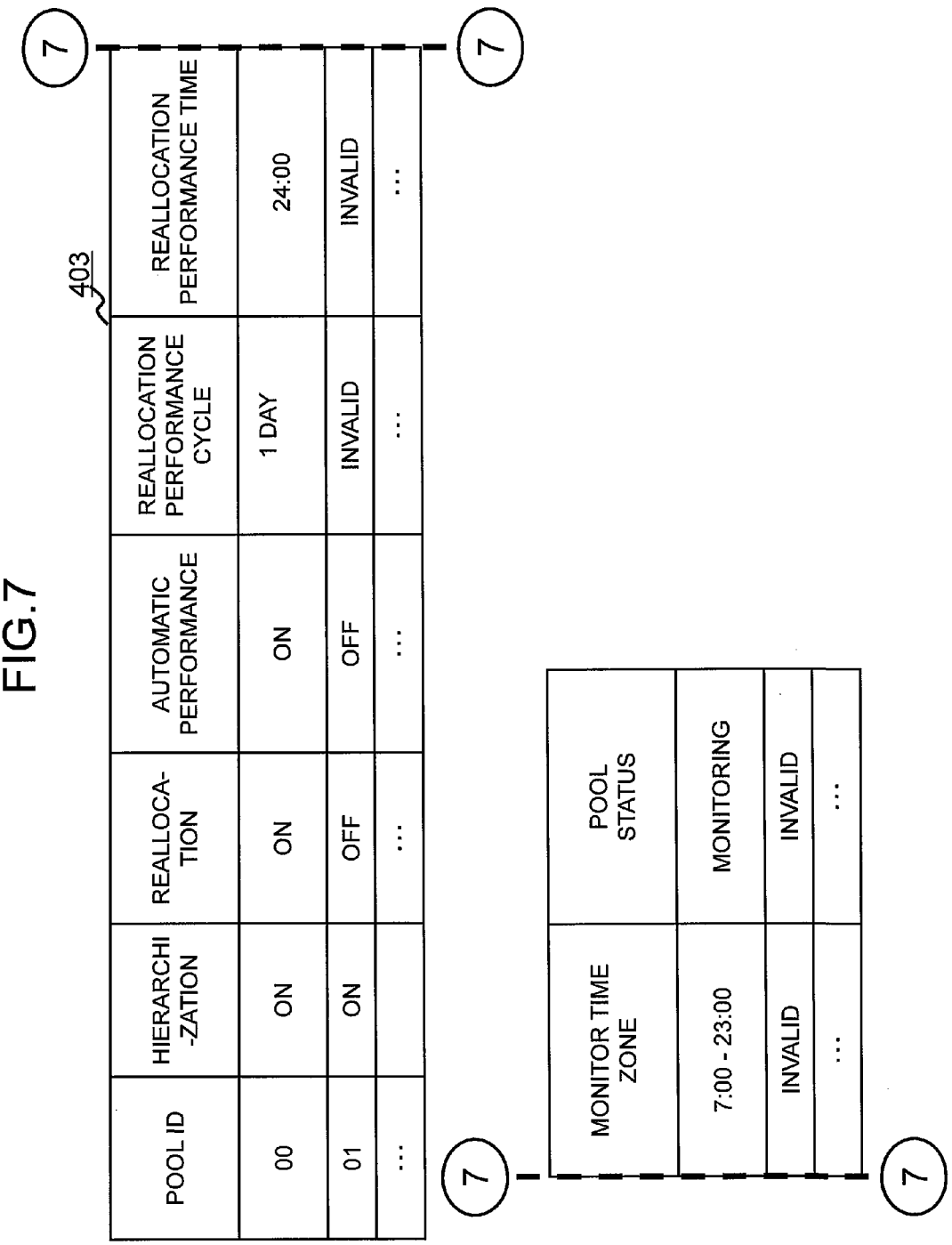
[FIG. 7]

FIG. 7 shows the configuration of a pool management table 403.

The pool management table 403 is the table for managing the information related to pools. As more specifically described, for example, the table 403, for each pool, comprises the pool ID, hierarchization, reallocation, automatic performance, reallocation performance cycle, the reallocation performance time, the monitor time zone, and the pool status.

As for one pool (hereinafter referred to as a "target pool" in the description of FIG. 7) as an example, these information elements are, specifically, as follows.

The "pool ID" is the ID of the target pool.

"Hierarchization" shows whether to hierarchize the actual pages in the target pool or not. "ON" indicates performing hierarchization (i.e. multiple tiers are set in the target pool) while "OFF" indicates not performing hierarchization (i.e. multiple tiers are not set in the target pool).

"Reallocation" shows whether to reallocate the data elements in the target pool or not. "ON" indicates performing reallocation and "OFF" indicates not performing reallocation. In case of "ON," the I/O frequency of the VVOL to which the target pool is allocated or the virtual pages of the same is monitored while, in case of "OFF," the I/O frequency of the VVOL to which the target pool is allocated or the virtual pages of the same is not monitored. What is important in monitoring I/O frequency is that, if I/O is not actually performed for the VVOL as the I/O destination or the actual pages allocated to the virtual pages, the I/O frequency is not updated and that, if I/O is performed for the allocated actual pages, the I/O frequency is updated. This is also described in the write processing and the read processing later.

"Automatic performance" shows whether to start the reallocation of the data elements in the target pool automatically or manually. "ON" indicates that reallocation is automatically started while "OFF" indicates that reallocation is manually started.

The "reallocation performance cycle" is the cycle of performing reallocation of the data elements in the target pool. For example, "1 day" indicates that reallocation is started every day (every 24 hours).

The "reallocation performance time" shows the time of starting reallocation of the data elements in the target pool.

The "monitor time zone" shows the time zone for monitoring the I/O frequency of the actual pages allocated to the VVOL to which the target pool is allocated.

The "pool status" is the status of the target pool. The values of the "pool status" are, for example, "monitoring," "reallocating," and "not monitoring." "Monitoring" indicates that the I/O frequency of the VVOL to which the target pool is allocated or the virtual pages in the VVOL is being monitored and that the data elements are not being reallocated. "Reallocating" indicates that the reallocation of the data elements (either the reallocation in the target pool or the reallocation of the data elements from the target pool to another pool may be permitted) is being performed. "Not monitoring" indicates that neither the I/O frequency monitoring nor the reallocation of the data elements is being performed.

FIG. 8 shows the configuration of a VVOL management table 404.

The VVOL management table 404 is a table for managing the information related to a VVOL. As more specifically described, for example, the table 404, for each VVOL, comprises the VVOL ID, the PVOL ID, the allocated tier ID, the default tier ID, the capacity, reallocation, automatic performance, reallocation performance cycle, the reallocation performance time, and the monitor time zone. Among these information elements, reallocation, automatic performance, reallocation performance cycle, the reallocation performance time, and the monitor time zone are the same as the information elements in the pool management table 403 and, if the value of an information element in this table 404 (e.g. "reallocation") is different from the value of the same information element in the pool management table 403 (e.g. "reallocation"), the value in this table 404 may be permitted to be prioritized. That is, in the pool management table 403, the values of the information elements are set for one pool and, as a result, the values can be reflected on the setting of all the VVOLs to which the pool is allocated, while the setting can be performed for each VVOL. If no specific values are set for a VVOL, the values set for the pool allocated to the VVOL are considered to be the values of the VVOL. As for one VVOL (hereinafter referred to as a "target VVOL" in the description of FIG. 8) as an example, the above-mentioned information elements in this table 404 are, specifically, as follows.

The "VVOL ID" is the ID of the target VVOL.

"PVOL ID" is the ID of the pool allocated to the target VVOL (hereinafter referred to as an allocated pool).

The "allocated tier ID" is the ID of the tier allocated to the target VVOL among the multiple tiers the allocated pool comprises. To a virtual page in the target VVOL, an actual page is allocated from the allocated tier.

The "default tier ID" is the ID of a default tier ID. The default tier is the tier which is the provision source of the actual page initially allocated to the virtual page as the write destination from the host 101.

The "capacity" is the capacity of the target VVOL.

"Reallocation" shows whether to reallocate the data elements in the target VVOL or not. "ON" indicates performing reallocation and "OFF" indicates not performing reallocation. In case of "ON," the I/O frequency of the target VVOL or the virtual pages of the same is monitored while, in case of "OFF," the I/O frequency of the target VVOL or the virtual pages of the same is not monitored.

"Automatic performance" shows whether to start the reallocation of the data elements in the target VVOL automatically or manually. "ON" indicates that reallocation is automatically started while "OFF" indicates that reallocation is manually started.

The "reallocation performance cycle" is the cycle of performing reallocation of the data elements in the target VVOL.

The "reallocation performance time" shows the time of starting reallocation of the data elements in the target VVOL.

The "monitor time zone" shows the time zone for monitoring the I/O frequency of the target VVOL or the virtual pages is allocated.

Figure 9:
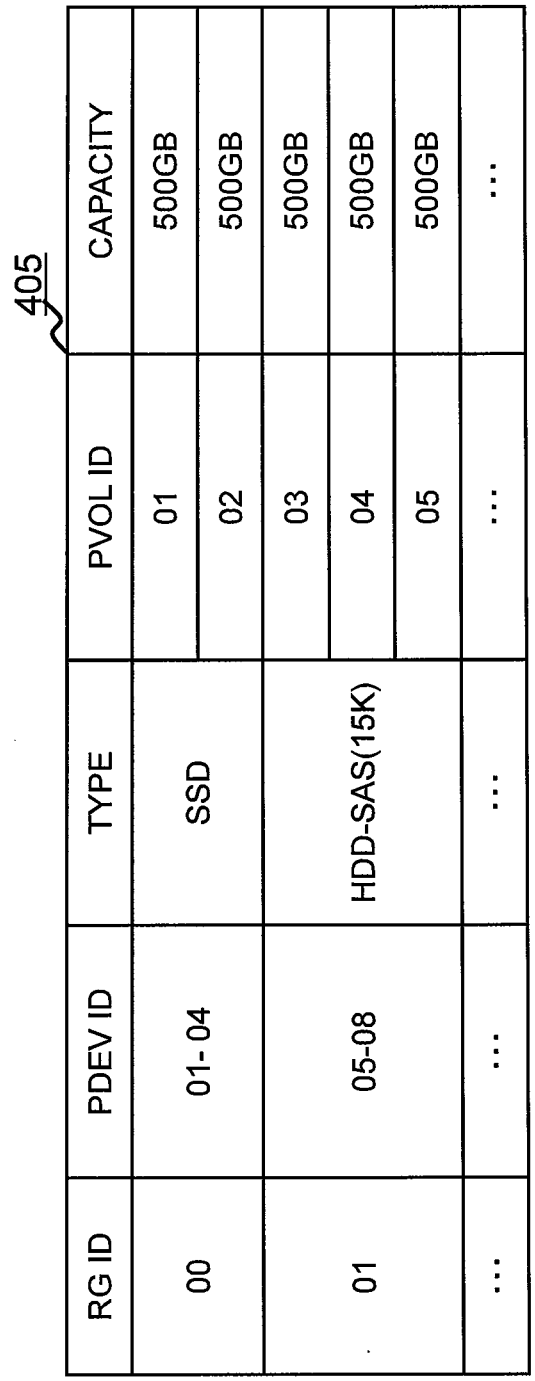
[FIG. 9]

FIG. 9 shows the configuration of a PVOL management table 405.

The PVOL management table 405 is the table for managing the information related to PVOLs. As more specifically described, for example, for each PVOL, comprises the RG ID, the PDEV ID, the type, the PVOL ID, and the capacity. As for one PVOL (hereinafter referred to as a "target PVOL" in the description of FIG. 9) as an example, these information elements are, specifically, as follows.

The "RG ID" is the ID of the RG which is the base of the target PVOL.

The "PDEV ID" is the ID of all the PDEVs configuring the RG which is the base of the target PVOL.

The "type" is the type of the target PVOL. This is the same as the type of the PDEV as the base of the target PVOL. For example, if the RVOL type is "SSD," the type of the target PVOL is also "SSD."

"PVOL ID" is the ID of the target PVOL.

The "capacity" is the capacity of the target PVOL.

FIG. 10 shows the configuration of an allocation table 407.

The allocation table 407 is the table showing which actual page is allocated to which virtual page. As more specifically described, for example, the table 407, for each virtual page, comprises the VVOL ID, the virtual page ID, the pool ID, the actual page ID, and the tier ID. As for one virtual page (hereinafter referred to as a "target virtual page" in the description of FIG. 10) as an example, these information elements are, specifically, as follows.

The "VVOL ID" is the ID of the VVOL comprising the target virtual page.

The "virtual page ID" is the ID of the target virtual page.

The "pool ID" is the ID of the pool allocated to the VVOL comprising the target virtual page.

The "actual page ID" is the ID of the actual page allocated to the target virtual page.

The "tier ID" is the ID of the tier comprising the actual page allocated to the target virtual page.

FIG. 11 shows the configuration of an actual page management table 408.

The actual page management table 408 is the table for managing each actual page status. As more specifically described, for example, the table 408, for each actual page, comprises the pool ID, the actual page ID, and the status. As for one actual page (hereinafter referred to as a "target actual page" in the description of FIG. 11) as an example, these information elements are, specifically, as follows.

The "pool ID" is the ID of the pool comprising the target actual page.

The "actual page ID" is the ID of the target actual page.

The "status" is the status of the target actual page. The values of the status are, for example, "on use" and "free." "On use" indicates that the target actual page is already allocated to any of the virtual pages. "Free" indicates that the target actual page is not allocated to any virtual page and therefore can be allocated to any virtual page.

FIG. 12 shows the configuration of monitor tables 409.

The monitor table 409 exists for each VVOL. The table 409 is the table showing the I/O frequency of a virtual page. With reference to one VVOL (hereinafter referred to as a "target VVOL" in the description of FIG. 12) as an example, the table 409 is described below.

The table 409, as more specifically described, for example, for each VVOL, comprises the VVOL ID, the virtual page ID, the total number of I/Os, the average number of I/Os, the maximum number of I/Os, and the last I/O time. With reference to one virtual page (hereinafter referred to as a "target virtual page" in the description of FIG. 12) as an example, these information elements are, specifically, as follows.

The "VVOL ID" is the ID of the ID of the VVOL comprising the target virtual page (i.e. the target VVOL).

The "virtual page ID" is the ID of the target virtual page.

The "total number of I/Os" is the number of I/Os performed for the target virtual page during the monitor time zone.

The "average number of I/Os" is the value ascertained by dividing the value of the "total number of I/Os" by the specified length of time.

The "maximum number of I/Os" is the maximum number of I/Os among the multiple numbers of I/Os (the numbers of I/Os for the target virtual page) in the multiple time zones comprising the monitor time zone.

The "last I/O time" is the latest time of performing the I/O for the target virtual page.

Two tables 409 also exist, for example (or more than two may also be permitted). The two tables 409 are alternately used. As more specifically described, for example, if reallocation is performed, using the table 409 of the monitor time zone closest to the point of time for performing the processing, the migration page table 411 described later is created and, at the same time, using the other table 409, the I/O frequency monitoring is performed. In the description below, the table 409 which is being used might be referred to as the active table 409 while the table 409 which is not used might be referred to as the standby table 409.

FIG. 13 shows the configuration of a frequency distribution table 410.

The frequency distribution table 410 is the table showing the relation between the number of I/Os and the number of virtual pages. This table 410 is created with reference to the monitor table 409. As the number of I/Os, at least one of the total number of I/Os, the average number of I/Os, and the maximum number of I/Os may be adopted. FIG. 13 shows an example where the average number of I/Os is adopted. That is, the table 410 shown in FIG. 13 shows the number of virtual pages per average number of I/Os. According to FIG. 13, it can be ascertained that the number of virtual pages whose average number of I/Os is "0" is "561." This table 410 (or the graphs created with reference to this table 410) is displayed on the management apparatus 107. The administrator, with reference to the table 410 (or the graphs created with reference to the same), can manually instruct the storage system 103 to start the reallocation of the data elements.

The frequency distribution table 410 may be permitted to be updated in accordance with the updates of the monitor table 409 or may also be permitted to be created with reference to the table 409 when the administrator gives an instruction for the display of the frequency distribution.

FIG. 14 shows the configuration of a migration page table 411.

The migration page table 411 is the table created when performing page-based data migration with reference to the monitor table 409. The table 411 shows the relation between the migration source and the migration destination. As more specifically described, for example, the table 411, for each virtual page as the migration target, comprises the virtual page ID, the migration source tier ID, the migration destination tier ID, and the migration status. As for one virtual page (hereinafter referred to as a "target virtual page" in the description of FIG. 14) as an example, these information elements are, specifically, as follows.

The "virtual page ID" is the ID of the target virtual page.

The "migration source tier ID" is the ID of the tier comprising the actual page (actual page as the migration source) allocated to the target virtual page.

The "migration destination tier ID" is the ID of the tier to be the migration destination of the data elements. The actual page as the migration destination is any of the free actual pages in the tier.

The "migration status" is the status of the migration of the target virtual page. The values of the "migration status" are, for example, "completed" "in process," and "not completed." "Completed" indicates that the data elements are already migrated from the actual page as the migration source to any one of the actual pages in the tier as the migration destination. "In process" indicates that the data elements are being migrated from the actual page as the migration source to any one of the actual pages in the tier as the migration destination. "Not completed" indicates that the data elements do not start to be migrated yet from the actual page as the migration source to any one of the actual pages in the tier as the migration destination.

Note that the migration page table 411 may also be permitted to comprise other types of information elements related to the migration source, instead of or in addition to the virtual page ID. For example, the ID of the actual page allocated to the virtual page may also be permitted to be included in the table 411.

Furthermore, the migration page table 411 may also be permitted to comprise other types of information elements related to the migration destination, instead of or in addition to the migration destination tier ID. For example, with a free actual page in the migration destination tier is identified with reference to the tables 402 (FIGS. 6) and 408 (FIG. 11), the ID of the identified actual page may also be permitted to be included in the table 411. In that case, the status of the identified actual page may also be permitted to be updated from "free" to "on use" (or other type of status e.g. "reserved").

FIG. 15 shows the configuration of a migration definition table 412.

The migration definition table 412, for each VVOL, shows the definition of the migration. As more specifically described, for example, the table 412, for each VVOL, comprises the VVOL ID, tier maintenance, the allocated tier ID, and the storage threshold. As for one VVOL (hereinafter referred to as a "target VVOL" in the description of FIG. 15) as an example, these information elements are, specifically, as follows.

The "VVOL ID" is the ID of the target VVOL.

The "allocated tier ID" is the ID of the allocated tier of the target VVOL.

The "storage threshold" is the threshold of the storage rate of the allocated tier. This threshold is set for each allocated tier. The "storage rate" is, as to one allocated tier (hereinafter referred to as a "target allocated tier" in the description in this paragraph), as follows. That is, the storage rate shows how much rate of the data elements are stored in the target allocated tier among all the data elements in the target VVOL.

Though, according to the example of the table 412 in FIG. 15, the storage threshold is set for each tier, instead of which, it may also be permitted that one storage threshold is set for one pool and that the one tier is common to all the tiers that the one pool comprises.

The processing performed in this embodiment is described below. Note that, in the description below, the processing performed by the computer program is actually performed by the MP (microprocessor) performing the computer program. The MP exist in the MPPK 121 (refer to FIG. 2).

Pool Creation.

Figure 16:
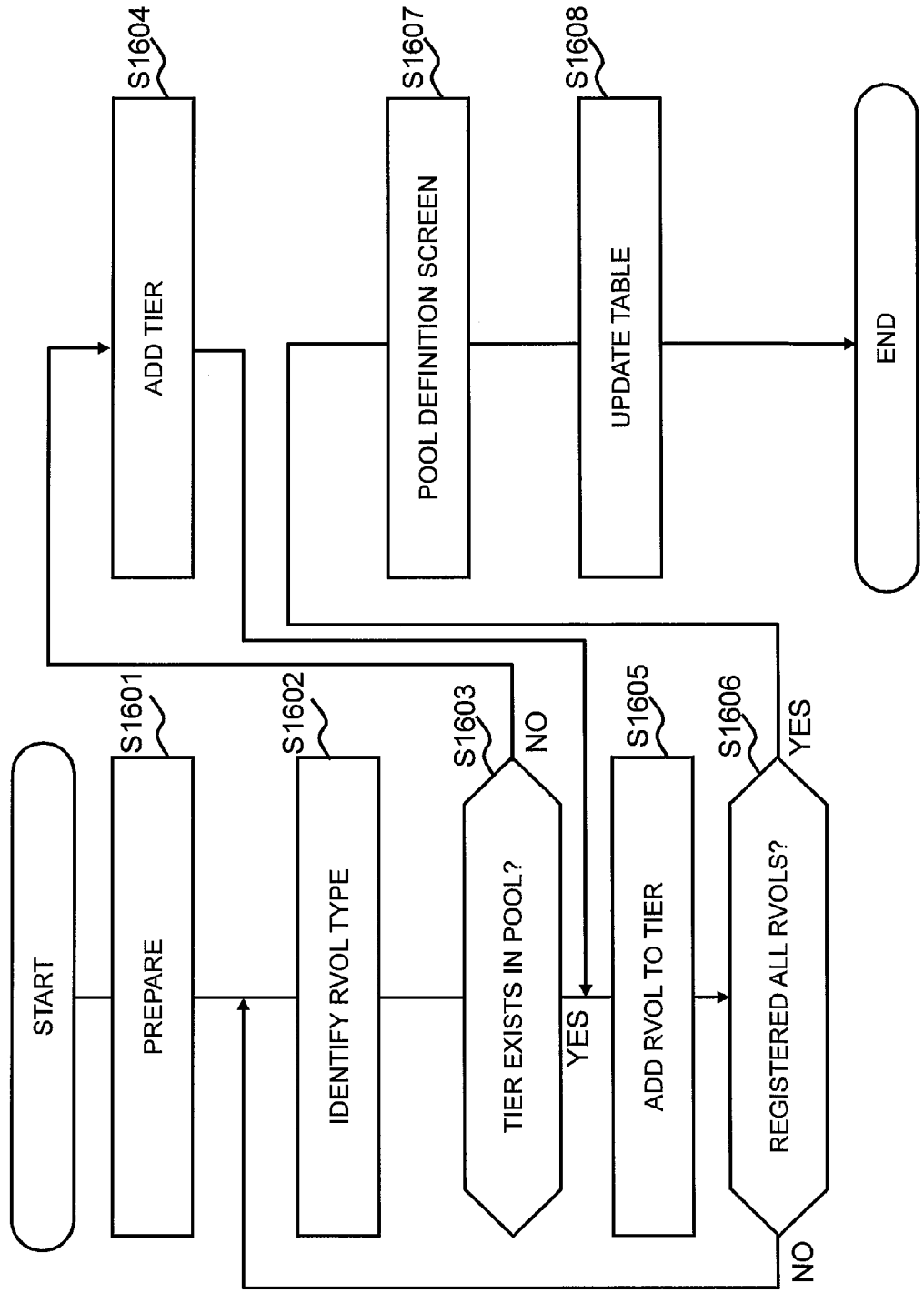
[FIG. 16]

FIG. 16 shows a flow of the pool creation processing. Note that, in this description of "pool creation," the pool newly created through the pool creation processing is referred to as a "target pool."

(S1601)

The UI control program 413 receives an instruction for pool creation via the management apparatus 107 from the administrator. Then, the program 413, for example, performs the preparation processing below.

The program 413 adds a new record of the target pool to the tables 402 (FIG. 6), 403 (FIGS. 7), and 408 (FIG. 11).

The program 413 receives the specification of a PVOL via the management apparatus 107 from the administrator. As more specifically described, for example, the program 413 displays the information related to the RVOL (e.g. the ID, the type, and others) and receives the specification of the RVOL to be the PVOL.

For each specified RVOL, the processing from S1602 to S1605 is performed. With reference to one RVOL (hereinafter referred to as a "target RVOL" in the description of FIG. 16) as an example, the processing from S1602 to S1605 is described.

(S1602)

The program 413 identifies the type of the specified RVOL. As more specifically described, for example, the CMPK 119 stores the RVOL management table comprising, for each RVOL, the ID, the capacity, the type (e.g. SSD, HDD-SAS) and others, and the program 413, from the RVOL management table, identifies the type of the specified RVOL.

(S1603)

The program 413 determines whether the tier corresponding with the identified RVOL type already exists in the target pool or not from the tier management table 403. If the result of this determination is negative, S1604 is performed while, if the result of this determination is affirmative, S1605 is performed.

(S1604)

The program 413 identifies the ID of the tier corresponding with the identified RVOL type from the tier definition table 401. Then, the program 413, for the target pool, adds the identified tier ID to the table 402 (FIG. 6).

(S1605)

The program 413 adds the target RVOL to the tier corresponding with the identified RVOL type (hereinafter referred to as a "target tier" in this paragraph). As more specifically described, for example, the program 413 registers the ID of the target RVOL as the PVOL ID corresponding with the tier ID of the target tier to the table 402 (FIG. 6).

(S1606)

The program 413, for all the specified RVOLs, determines whether the processing S1602 and later is performed or not. If there are any RVOLs for which the processing S1602 and later is not performed among the specified RVOLs, the processing S1602 and later is performed for the RVOLs.

(S1607)

The program 413 displays the pool definition GUI (Graphic User Interface). Then, the program 413 accepts various types of setting through the GUI.

FIG. 17 shows a pool definition GUI 1700.

On the GUI 1700, the ID of a target pool is displayed. Note that the program 413, in response to the operation of a specified tool (e.g. a pull-down menu) by the administrator, may also be permitted to display the ID of other pools than the target pool (i.e. existing pools).

Furthermore, the GUI 1700 comprises input tools for the administrator to use, as to the pool indicated by the displayed ID, the values of the information elements which should be set in the table 403 (FIG. 7), "hierarchization," "reallocation," "automatic performance," the "performance cycle," the "performance time," the "monitor time zone," and the "tier threshold." As the input tools referred to in this embodiment, arbitrary tools such as a radio button, a checkbox, and text entry field can be adopted. Note that it is possible for the GUI 1700, as to the "tier threshold," either to make one threshold common to all the tiers the target pool comprises or to set a threshold for each of the tiers the target pool comprises.

Note that, as mentioned above, existing pool IDs can also be displayed on the GUI 1700, and therefore, by using the GUI 1700, the setting of the existing pool desired by the administrator can also be changed. In that case, for example, if the tier threshold desired by the administrator is larger than the usage rate of the tier for which the threshold is set, the program 413 may also be permitted to display a caution of an inappropriate tier threshold on the management apparatus 105 and not register the tier threshold to the table 402 (FIG. 6).

FIG. 16 is referred to again.

(S1608)

The program 413 updates the table. As more specifically described, for example, the program 413 performs the processing below.

The program 413 registers the values of the information elements input to the GUI 1700 in FIG. 17, "hierarchization," "reallocation," "automatic performance," the "performance cycle," the "performance time," the "monitor time zone," and the "tier threshold" to the table 403 (FIG. 7).

The program 413 partitions the target pool into multiple actual pages, and adds the IDs of the multiple actual pages to the tables 402 (FIGS. 6) and 408 (FIG. 11).

The actual page capacity may be common to all the pools. Therefore, the number of actual pages configuring the target pool may depend on the capacity of the target pool (total capacity of the PVOL configuring the target pool).

Note that the actual page capacity may be different in respective PVOLs. As more specifically described, for example, the capacity of the actual pages configuring the PVOL based on the RG of RAID5 (4D+1P) and the capacity of the actual pages configuring the PVOL based on the RG of RAID6 (4D+2P) may be different. This is because they are different in the number of parities stored in one actual page.

VVOL Creation.

Figure 18:
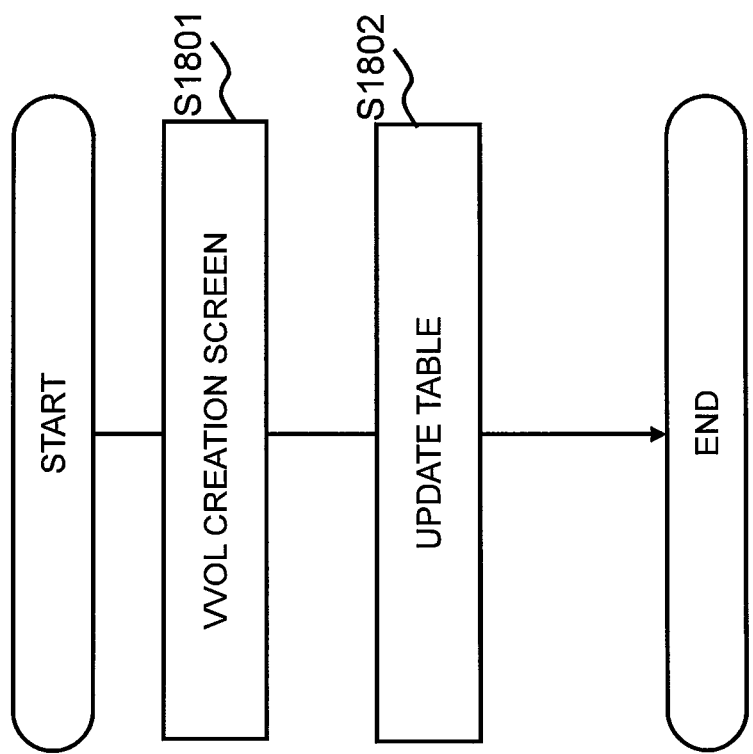
[FIG. 18]

FIG. 18 shows a flow of the VVOL creation processing. Note that, in this description of "VVOL creation," the VVOL newly created through the VVOL creation processing is referred to as a "target VVOL."

(S1801)

The UI control program 413 displays the VVOL creation GUI. Then, the program 413 accepts various types of setting through the GUI.

FIG. 19 shows a VVOL creation GUI 1900.

On the GUI 1900, the ID of a target VVOL is displayed. Note that the program 413, in response to the operation of a specified tool (e.g. a pull-down menu) by the administrator, may also be permitted to display the ID of other VVOLs than the target VVOL (i.e. existing VVOLs).

The GUI 1900 comprises input tools for the administrator to use, as to the VVOL indicated by the displayed ID, to input the values of the information elements which should be set in the table 404 (FIG. 8), "pool ID," the "capacity," "reallocation," "automatic performance," the "performance cycle," the "performance time," and the "monitor time zone."

Furthermore, the GUI 1900 identifies the tier ID corresponding with the input pool ID from the table 402 (FIG. 6), and displays all the identified tier IDs. The GUI 1900 comprises input tools for the administrator to use, as to the VVOL indicated by the displayed ID, to input the values of the "allocated tier," the "storage threshold," and the "default tier." The administrator, by using those input tools, can input which of the multiple tiers which the pool indicated by the input pool ID (pool allocated to the VVOL) comprises should be the allocated tiers, which of the allocated tiers should be a "default tier," and the storage threshold of each allocated tier.

FIG. 18 is referred to again.

(S1802)

The program 413 updates the table. As more specifically described, for example, the program 413 performs the processing below.

The program 413 registers the values of the information elements input to the GUI 1900 in FIG. 19, "pool ID," the "capacity," "reallocation," "automatic performance," the "performance cycle," the "performance time," the "monitor time zone," the "allocated tier ID," and the "default tier ID" to the table 404 (FIG. 8).

The program 413, with reference to the capacity of the target VVOL, ascertains the number of virtual pages configuring the target VVOL. The program 413 registers the ID of the target VVOL and the virtual page IDs for the ascertained number of virtual pages to the table 407 (FIG. 10).

The program 413, for the target VVOL, if "reallocation" is "ON," creates the table 409 (FIG. 12). This is because the I/O frequency is monitored in the monitor time zone. Note that, to the table 409, the virtual page IDs for the above-ascertained number of virtual pages are registered.

The program 413, for the target VVOL, registers the "allocated tier ID" and the "storage threshold" to the table 412 (FIG. 15).

Information Display.

Figure 22:
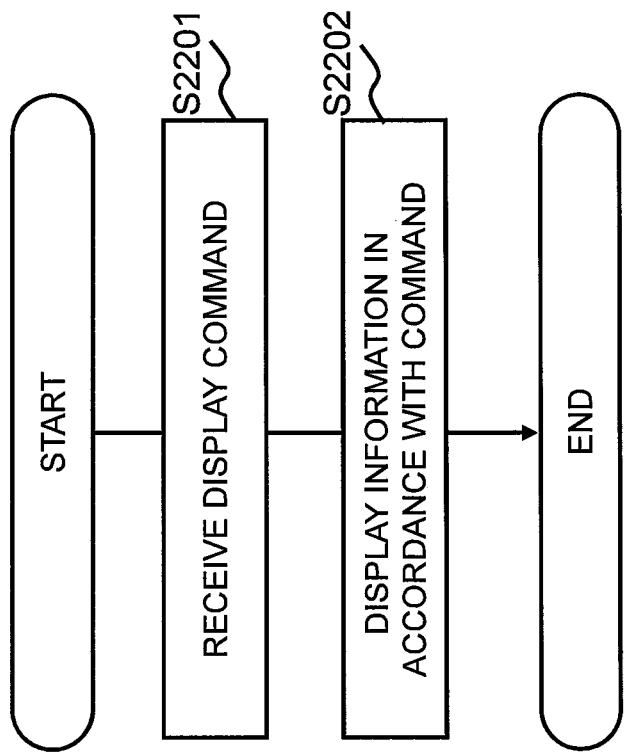
[FIG. 22]

FIG. 22 shows the flow of the information display processing.

The UI control program 413, receiving a display command from the management apparatus 107 (S2201), displays the information specified by the display command on the management apparatus 107 (S2202).

The types of information which can be displayed are, for example, at least one of the tables 401 to 412 (or the information which can be acquired by processing the information (e.g. graphs, summaries, and others)).

Figure 23:
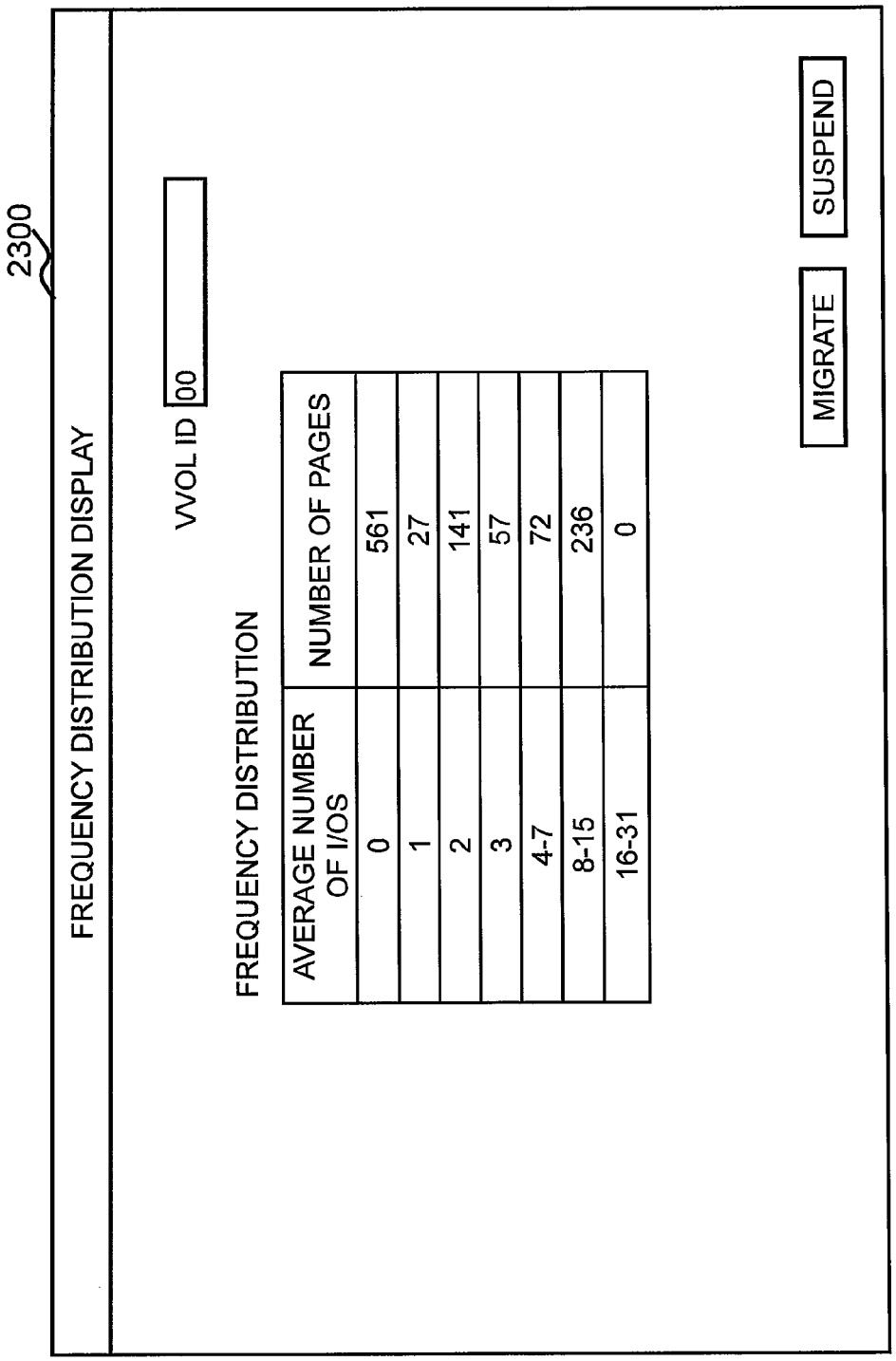
[FIG. 23]

FIG. 23 shows a frequency distribution GUI 2300.

The frequency distribution GUI 2300 is displayed at S2202 in FIG. 22. As more specifically described, for example, at S2201 in FIG. 22, the management apparatus 107, in accordance with the request from the administrator, transmits a frequency distribution display command specifying the VVOL ID desired by the administrator. At S2202 in FIG. 22, the program 413, in accordance with the command, extracts the frequency distribution corresponding with the VVOL ID specified by the command from the table 410 (FIG. 13), and displays the extracted frequency distribution on the management apparatus 107 as shown in FIG. 23. Note that the frequency distribution, though displayed in a table form, instead of or in addition to the same, may also be permitted to be displayed in other forms such as a graphical form.

The administrator, with reference to the frequency distribution displayed on GUI 2300, determines whether to migrate the data elements in the desired VVOL or not. For example, the administrator, if determining that a large number of virtual pages whose average number of I/Os is large exist, may give the storage system 103 an instruction for migrating the data elements in the desired VVOL (e.g. the "migration performance" button on GUI 2300 may be clicked).

As mentioned above, the frequency distribution is used as a criterion for the administrator to determine whether to perform data migration (migrating data elements in the VVOL) or not. In other words, if data migration is automatically performed, the frequency distribution does not have to be calculated.

Write processing (write to a cache memory).

Figure 24:
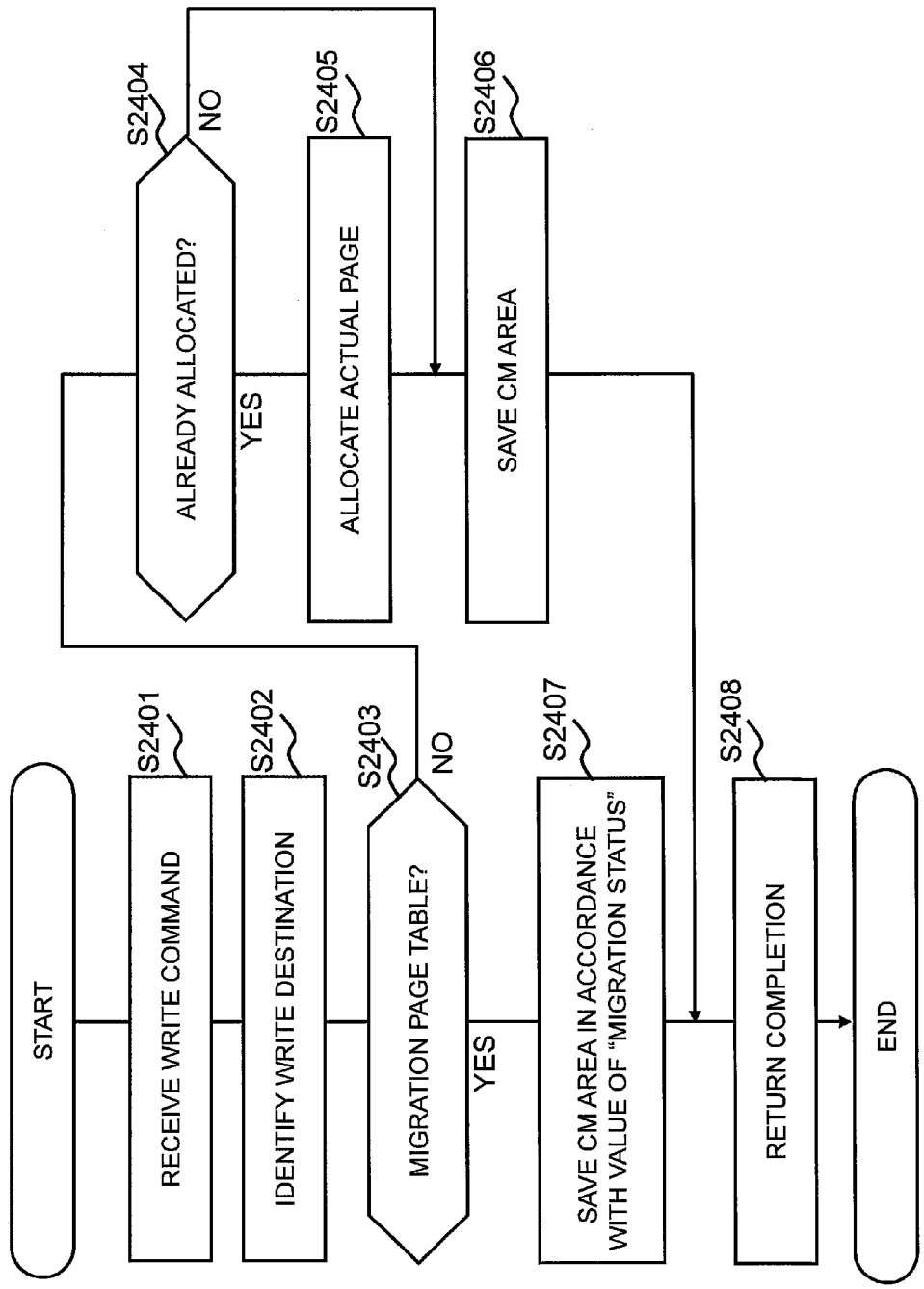
[FIG. 24]

FIG. 24 shows the flow of the write processing (write to a cache memory).

(S2401)

The I/O control program 414 receives a write command from the host 101.

(S2402)

The program 414, from the I/O destination information which the received write command comprises, identifies the VVOL as the write destination and the virtual page. At this point, multiple virtual pages are identified frequently. This is because the size of the data as the write target is usually larger than the capacity of one virtual page. For each identified virtual page, the processing S2403 and later is performed. With reference to one virtual page as an example, (hereinafter referred to as a "target virtual page" in the description of FIG. 24), the processing S2403 and later is described below. Furthermore, in the description of FIG. 24, the data elements as the write target to the target virtual page are referred to as "target data elements."

(S2403)

The program 414 determines whether the ID of the target virtual page exists in the migration page table 411 or not. If the result of this determination is negative, the processing from S2404 to S2406 is performed while, if the result of this determination is affirmative, the processing from S2407 to S2408 is performed.

(S2404)

The program 414, with reference to the allocation table 407 (FIG. 10), determines whether an actual page is allocated to the target virtual page or not. If the result of this determination is negative, the processing S2405 is performed.

(S2405)

The program 414 performs the processing below.

The program 414 identifies the pool corresponding with the VVOL as the write destination and the default tier in the pool based on the VVOL management table 404 (FIG. 8).

The program 414 identifies a free actual page in the identified default tier based on the tier management table 402 (FIG. 6) and the actual page management table 408 (FIG. 11).

The program 414 allocates the identified actual page to the target virtual page. That is, the program 414, in the fields corresponding with the ID of the target virtual page in the allocation table 407 (FIG. 10), registers the ID of the allocated actual page, the ID of the tier comprising the actual page, and the ID of the pool comprising the tier.

The program 414, if unable to identify the free actual page from the default tier, may identify the free actual page from the allocated tier corresponding with the VVOL as the write destination, and allocate the identified actual page to the target virtual page.

The program 414 updates the value of the "usage rate" of the tier comprising the allocated actual page in the table 402 (FIG. 6) (hereinafter referred to as an "allocation source tier" in this description of S2403).

The program 414 determines whether the value of the "usage rate" of the allocation source tier after the update exceeds the "tier threshold" of the allocation source tier or not (hereinafter referred to as a "determination Z"). The "tier threshold" of the allocation source tier is the value registered in the table 402 (FIG. 6) or the value registered in the table 412 (FIG. 15), and the value registered in the table 412 may be preferentially adopted.

The program 414, if the If the result of the determination Z is affirmative, may perform at least one part of the processing (a) and (b).

(a) The program 414 may report an error to the management apparatus 107 (and/or the host 101 as the transmission source of the write command). The administrator, if recognizing the error of the allocation source tier, may add an RVOL to the allocation source tier.

(b) The program 414 invokes the reallocation program 415. The reallocation program 415 performs the processing shown in FIG. 38. The processing shown in FIG. 38 is described later.

(S2406)

The program 414 saves a CM area for the data elements to be stored in the target virtual page from the cache memory.

(S2407)

The program 414, in accordance with the value of the "migration status" corresponding with the target virtual page in the migration page table 411, saves a CM area. As more specifically described, the processing is as follows.

Case A: The "Migration Status" is "Not Completed"

For example, either (concrete example A1) or (concrete example A2) is performed.

CONCRETE EXAMPLE A1

The program 414 saves a CM area, and determines the free actual page in the migration destination tier corresponding with the target virtual page as the write destination. As more specifically described, for example, the program 414, if the data elements in any of the free actual pages in the migration destination tier exist in the cache memory, saves the CM area where the data elements exist and, at the same time, determines the free actual page as the write destination. The free actual pages in the migration destination tier, as mentioned above, can be identified with reference to the tables 402 (FIG. 6) and 408 (FIG. 11).

The program 414 updates the "migration status" corresponding with the target virtual page to "completed." As a result, for the target virtual page, the migration of the data elements is not performed. That is, it can be said that the migration of the data elements for the target virtual page was cancelled.

The program 414, to the target virtual page, instead of the original actual page, allocates the actual page as the determined write destination. That is, the program 414, overwrites the fields corresponding with the ID of the target virtual page in the allocation table 407 with the ID of the actual page as the determined write destination and the ID of the tier comprising the actual page (the ID of the migration destination tier).

The program 414 updates the "status" of the original actual page allocated to the target virtual page in the actual page management table 408 (FIG. 11) to "free." Furthermore, the program 414 updates the "status" of the actual page newly allocated to the target virtual page in the table 408 to "on use."

CONCRETE EXAMPLE A2

The program 414 saves a CM area and determines the actual page allocated to the target virtual page (actual page in the migration source tier) as the write destination. As more specifically described, for example, the program 414, if no data elements of any free actual pages in the migration destination tier exists in the cache memory, saves a CM area (e.g. area where the data elements in the actual page allocated to the target virtual page exist) and, at the same time, determines the actual page allocated to the target virtual page (actual page in the migration source tier) as the write destination.

The program 414 may update the "migration status" corresponding with the target virtual page to "suspended." By this method, for example, for the target virtual page, data migration by the reallocation program 415 is not performed. Note that the value of this "migration status," for example, when the destaging described later is completed by the program 414, may be changed from "suspended" back to "not completed."

Case B: The "Migration Status" is "in Process"

For example, any one of (concrete example B1) to (concrete example B3) is performed.

CONCRETE EXAMPLE B1

The program 414 updates the "migration status" corresponding with the target virtual page to "suspended." Then, the program 414 performs the above-mentioned (concrete example A1) or (concrete example A2). If (concrete example A1) is performed, the "migration status" corresponding with the target virtual page is considered to be updated to "completed." If (concrete example A2) is performed, the "migration status" corresponding with the target virtual page is considered to be updated to "not completed."

CONCRETE EXAMPLE B2

The program 414 saves a CM area. In case of (concrete example B2), destaging is performed after the "migration status" corresponding with the target virtual page is updated to "completed." Therefore, the write destination (destaging destination) is the actual page in the migration destination tier. This is because, at that point, to the target virtual page, the actual page in the migration destination tier is allocated.

CONCRETE EXAMPLE B3

The program 414 saves a CM area. In case of (concrete example B3), destaging is performed if the "migration status" corresponding with the target virtual page is "in process," and the data elements are destaged both to the actual page allocated to the target virtual page and to the actual page in the migration destination tier (i.e. what is called double write is performed).

Case C: The "Migration Status" is "Completed"

For example, the processing below is performed.

The program 414 saves a CM area. In this case, the write destination (destaging destination) is the actual page in the migration destination tier. This is because, as the "migration status" corresponding with the target virtual page is updated to "completed," the actual page allocated to the target virtual page is, as described later, changed to the actual page as the migration destination.

(S2408)

If a CM area was saved for all virtual pages identified at S2402, the program 414 writes the write target data to one or more saved CM areas, and reports the completion to the host 101.

Write Processing (Destaging).

Figure 25:
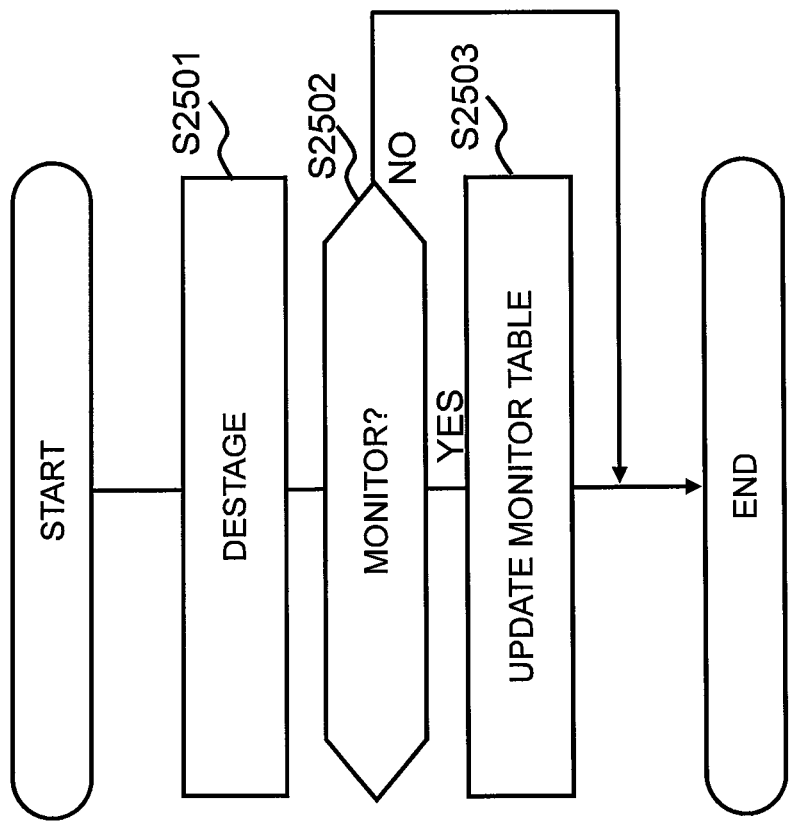
[FIG. 25]

FIG. 25 shows the flow of the destaging processing.

The I/O control program 414, for each of the data elements configuring the write target data, performs the destaging processing.

(S2501)

The program 414 performs destaging. That is, the program 414, among the multiple data elements existing in the cache memory, writes the data elements not yet written to the actual page (dirty data elements) to the actual page. The actual page as the destaging destination is the actual page allocated to the virtual page which is the write destination of the actual page (actual page identified by the allocation table 407). Note that, at this point, if the "migration status" corresponding with the virtual page is "suspended," the program 414 may update the "migration status" to "not completed."

(S2502)

The program 414, with reference to the table 403 (FIG. 7) or 404 (FIG. 8), determines whether the monitor table 409 must be updated or not. The table 404 (FIG. 8) maybe prioritized. As more specifically described, for example, the program 414 makes the following two determinations P and Q.

(Determination P) The program 414 determines whether "reallocation" corresponding with the pool comprising the actual page as the destaging destination at S2501 (hereinafter referred to as a "target pool" in the description of FIG. 25) is "ON" or not, or whether "reallocation" corresponding with the VVOL comprising the virtual page to which the actual page as destaging destination is allocated (hereinafter referred to as a "target VVOL" in the description of FIG. 25) is "ON" or not. If the result of this determination P is negative, S2503 is not performed (that is, the monitor table 409 does not have to be updated).

(Determination Q) If the result of this determination P is affirmative, the program 414 determines whether the current time is within the time zone indicated by the "monitor time zone" corresponding with the target pool or not. If the result of this determination Q is negative, S2503 is not performed. On the other hand, if the result of this determination Q as well as the determination P is affirmative, S2503 is performed (that is, the monitor table 409 must be updated).

(S2503)

The program 414, updates the monitor table 409. As more specifically described, for example, the processing below is performed.

The program 414, if "page-based migration" corresponding with the target VVOL is "ON" in the table 412 (FIG. 15), updates the active monitor table 409 corresponding with the target VVOL. As more specifically described, for example, the program 414 updates the value of the "total number of I/Os" corresponding to the write destination virtual page of the destaged data elements in the active monitor table 409 (for example, increments by 1) and, at the same time, updates the value of the "last I/O time." Furthermore, the program 414, for example, for the write destination virtual page, adds the time of destaging to the above-mentioned I/O history table. In this case, in the I/O history table, the ID of the write destination virtual page may be recorded. For example, with reference to the I/O history table, later, the program 414 may also be permitted to update the "average number of I/Os" and the "maximum number of I/Os" in the active monitor table 409.

Read Processing.

Figure 26:
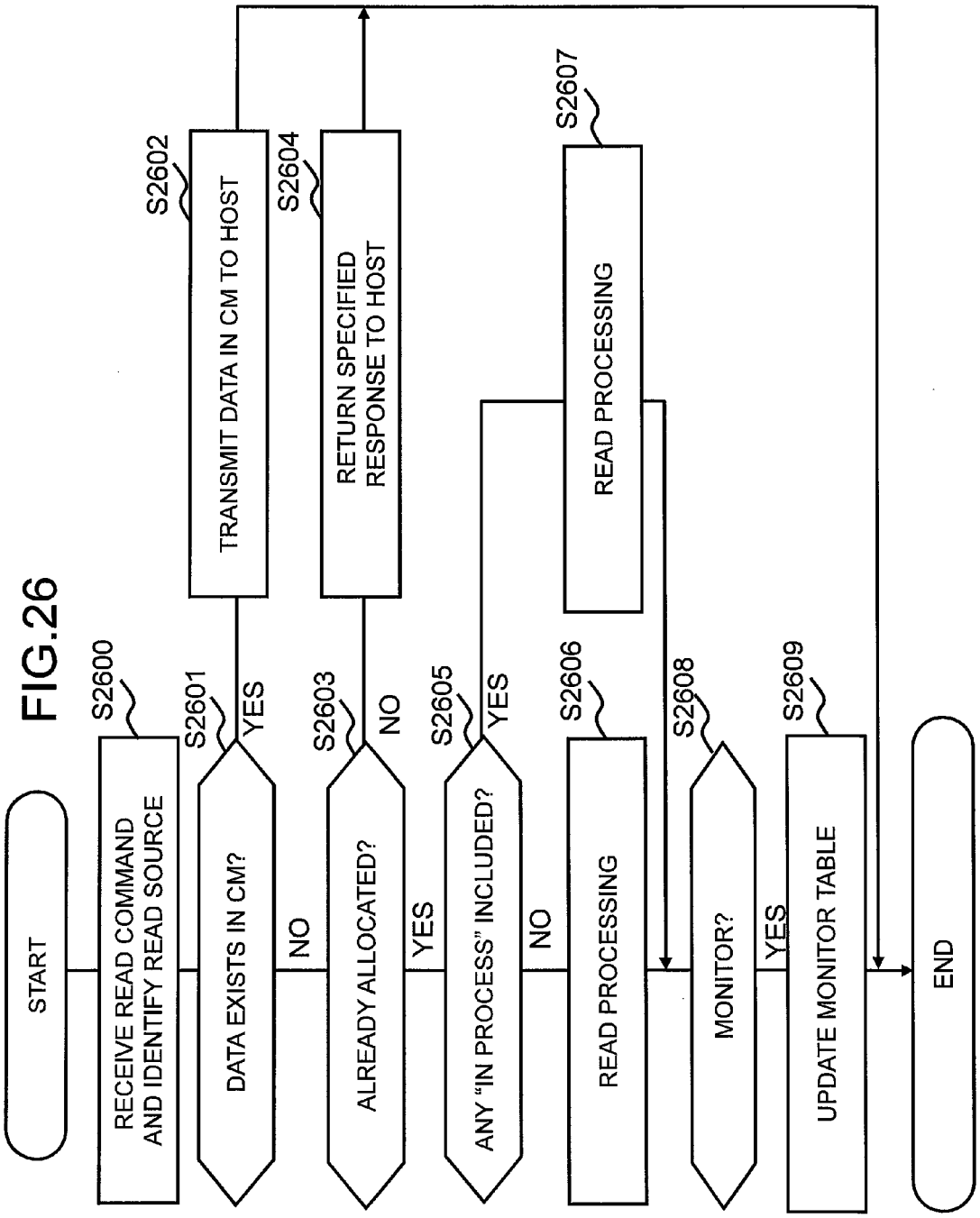
[FIG. 26]

FIG. 26 shows the flow of the read processing.

(S2600)

The I/O control program 414 receives a read command from the host 101. Then, the program 414, with reference to the I/O destination information which the received read command comprises, identifies the VVOL as the read source and the virtual page.

(S2601)

The program 414 determines whether the read target data exists in the cache memory or not. If the result of this determination is negative, S2603 is performed while, if the result of this determination is affirmative, S2602 is performed (S2602)

The program 414 transmits the read target data in the cache memory to the host 101. In this case, the monitor table 409 corresponding with the VVOL as the read source is not updated. This is because no I/O is performed for the actual page.

(S2603)

The program 414, with reference to the allocation table 407, determines whether an actual page is allocated to the virtual page identified at S2600 or not. If the result of this determination is negative, S2604 is performed while, if the result of this determination is affirmative, S2605 is performed.

(S2604)

The program 414 transmits a specified response (e.g. data indicating zero) to the host 101.

(S2605)

The program 414 determines whether at least one of the ID(s) of one or more virtual pages identified at S2600 is registered to the migration page table 411 and, at the same time, the "migration status" corresponding with the registered virtual page ID(s) is "in process" or not. If the result of this determination is negative, S2607 is performed while, if the result of this determination is affirmative, S2606 is performed.

(S2606)

The program 414, from one or more actual pages respectively allocated, to one or more virtual pages identified at S2600 (one or more actual pages identified from the allocation table 407), reads data elements. The program 414 transmits the read target data configured of the data elements to the host 101.

(S2607)

The program 414, for the virtual page whose "migration status" is "in process," waits until the "migration status" is changed to "completed." Then, the program 414, from one or more actual pages respectively allocated to one or more virtual pages identified at S2600 (one or more actual pages identified from the allocation table 407), reads data elements. The program 414 transmits the read target data configured of the data elements to the host 101.

(S2608)

The program 414, with reference to the table 403 (FIG. 7) or 404 (FIG. 8), determines whether the monitor table 409 must be updated or not. The table 404 (FIG. 8) may be prioritized. As more specifically described, for example, the program 414 makes the following two determinations V and W.

(Determination V) The program 414 determines whether "reallocation" corresponding with the pool allocated to the read source VVOL (hereinafter referred to as a "read source pool" in the description of FIG. 26) is "ON" or not, or whether "reallocation" corresponding with the read source VVOL is "ON" or not. If the result of this determination V is negative, S2609 is not performed (that is, the monitor table 409 does not have to be updated).

(Determination W) If the result of this determination V is affirmative, the program 414 determines whether the current time is within the time zone indicated by the "monitor time zone" corresponding with the target pool or not. If the result of this determination W is negative, S2609 is not performed. On the other hand, if the result of this determination Was well as the determination V is affirmative, S2609 is performed (that is, the monitor table 409 must be updated).

(S2609)

The program 414, updates the monitor table 409. As more specifically described, for example, the processing below is performed.

The program 414, if "page-based migration" corresponding with the read source VVOL is "ON" in the table 412 (FIG. 15), updates the active monitor table 409 corresponding with the read source VVOL. As more specifically described, for example, the program 414 updates the value of the "total number of I/Os" corresponding to the write destination virtual page as the read source in the active monitor table 409 (for example, increments by 1) and, at the same time, updates the value of the "last I/O time." Furthermore, the program 414, for example, for the read source write destination virtual page, adds the time of read to the above-mentioned I/O history table. In this case, in the I/O history table, the ID of the read source virtual page may be recorded. For example, with reference to the I/O history table, later, the program 414 may also be permitted to update the "average number of I/Os" and the "maximum number of I/Os" in the active monitor table 409.

The relation between the I/O frequency monitor and reallocation processing.

Figure 27:
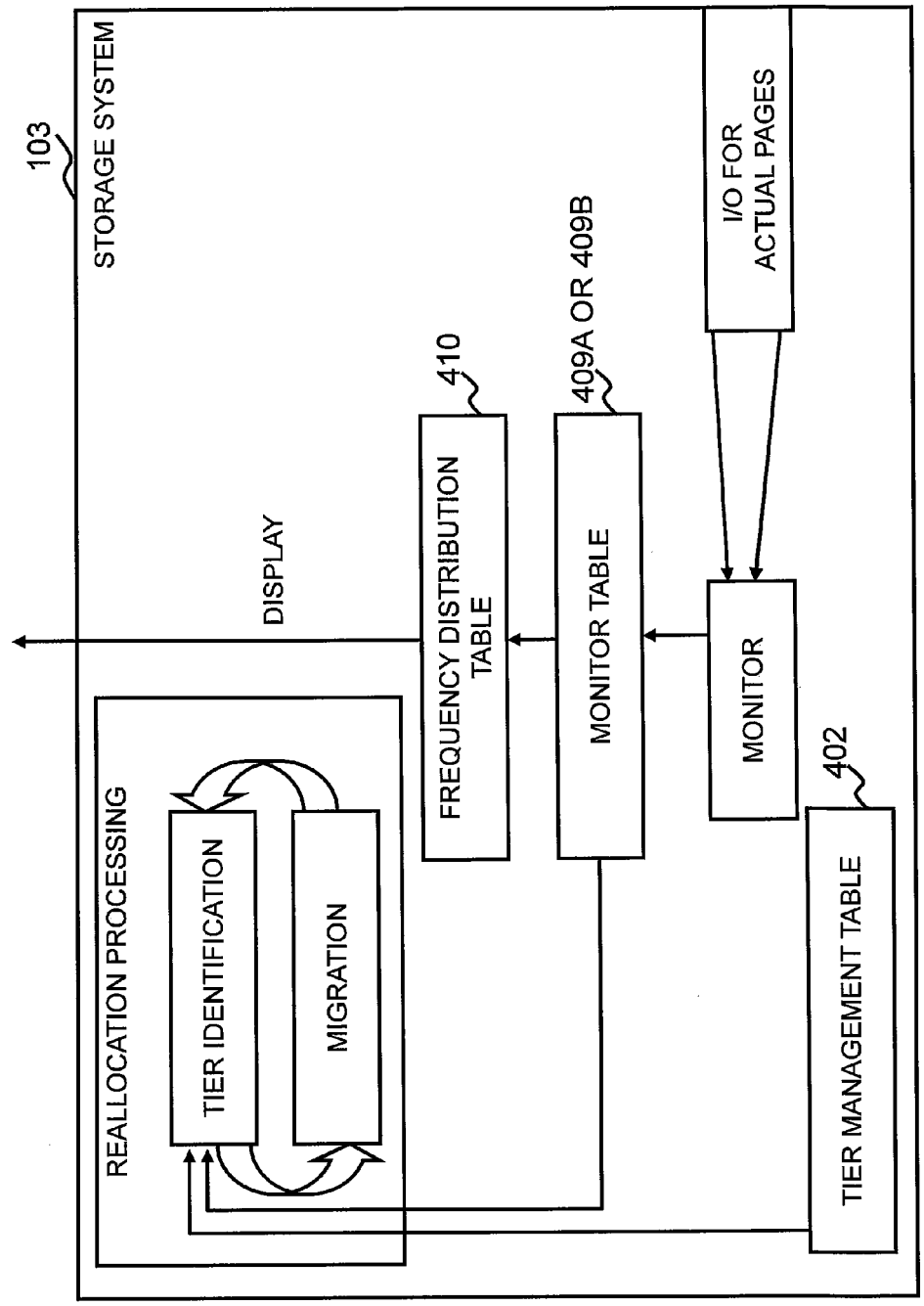
[FIG. 27]

FIG. 27 shows the relation between the I/O frequency monitor and reallocation.

If I/O for an actual page is monitored and if I/O for the actual page is performed, the I/O frequency of the virtual page to which the actual page is allocated or the VVOL comprising the virtual page is updated. That is, the monitor table 409 is updated. In other words, as mentioned above, if the I/O control program 414 receives a read command from the host 101 but if no data elements are read from the actual page, the monitor table 409 is not updated.

In accordance with the updates of the monitor table 409, the frequency distribution table 410 is updated. Note that the frequency distribution table 410 does not have to be prepared in advance and, for example, if the command for the display of the frequency distribution is given from the administrator, the frequency distribution table 410 may be created with reference to the monitor table 409, and the frequency distribution may be displayed with reference to the table 410. Note that, instead of the frequency distribution, the monitor table 409 may be displayed.

The reallocation processing comprises the tier determination processing and the migration processing. In the tier determination processing, the migration page table 411 is created.

The table 411 may be created with reference to the I/O frequency indicated by the monitor table 409 and the tier range in the tier management table 402 (FIG. 6). In the migration processing, with reference to the created migration page table 411, page-based data migration is performed.

Reallocation Processing.

The reallocation processing may be performed if the usage rate of a certain tier exceeds the tier threshold of the tier or may also be permitted to be performed periodically (e.g. at each point of time indicated by the value of the "reallocation performance time").

Figure 28:
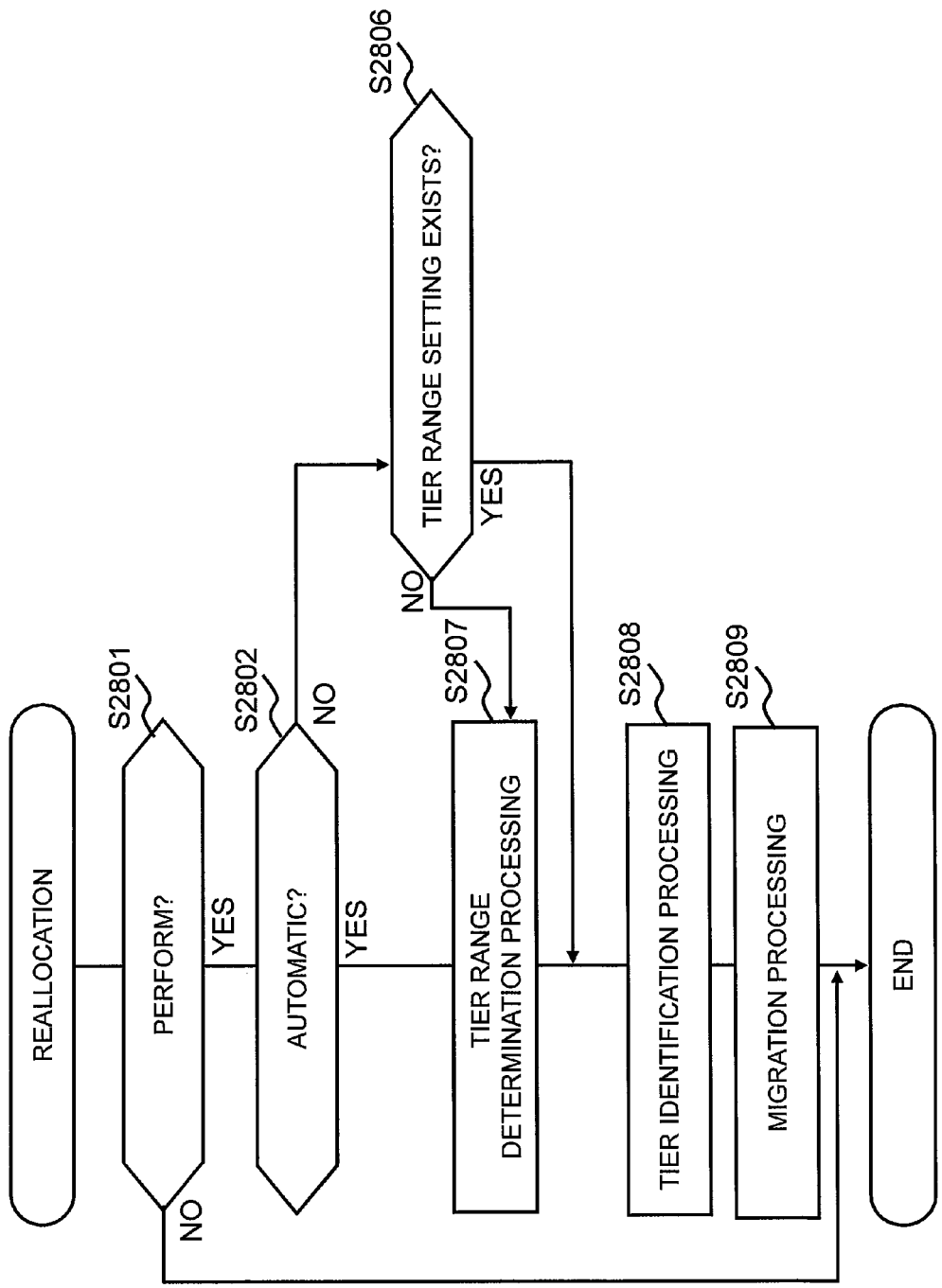
[FIG. 28]

FIG. 28 shows the flow of the reallocation processing. Note that FIG. 28 shows the flow of one VVOL (hereinafter referred to as a "target VVOL" in the description of FIG. 28).

(S2801)

The reallocation program 415 determines whether to perform data migration for the target VVOL or not. As more specifically described, for example, the following processing is performed.

The reallocation program 415 determines, in the VVOL management table 404 (FIG. 8), whether "automatic performance" corresponding with the target VVOL is "ON" or not. If the setting of the value of "automatic performance" corresponding with the target VVOL does not exist, the program 415 determines, in the pool management table 403 (FIG. 7), whether "automatic performance" corresponding with the pool allocated to the target VVOL (hereinafter referred to as a "target pool" in the description of FIG. 28) is "ON" or not.

If "automatic performance" corresponding with the target VVOL or the target pool is "ON," the program 415 determines whether the current time reaches the time indicated by the value of "reallocation performance time" corresponding with the target VVOL or the target pool or not. If the result of this determination is affirmative, the result of the determination at S2801 is affirmative while, if the result of this determination is negative, the result of the determination at S2801 is negative.

If "automatic performance" corresponding with the target VVOL or the target pool is "OFF," if the program 415 receives an instruction for data migration for the target VVOL via the management apparatus 105 from the administrator, the result of the determination at S2801 is affirmative.

The program 415, if "automatic performance" corresponding with the target VVOL or the target pool is "OFF" (S2802: NO), performs S2806.

The program 415, if "automatic performance" corresponding with the target VVOL or the target pool is "ON" (S2802: YES), performs S2807.

(S2806)

The program 415 determines whether the tier range is set by the administrator or not. If the result of this determination is negative, S2807 is performed and then S2808 is performed while, if the result of this determination is negative, S2807 is skipped and S2808 is performed.

(S2807)

The program 415 performs the tier range determination processing. By this processing, the tier range is determined. Multiple methods of determining the tier range can be considered. For example, multiple types of tier ranges may be prepared in advance, and the program 415 may select an arbitrary tier range for each tier from those multiple types of tier ranges.

(S2808)

The program 415 performs the tier determination processing. In the tier determination processing, as mentioned above, the migration page table 411 is created.

(S2809)

The program 415, in accordance with the created migration page table 411, performs the page-based migration processing. In page-based migration, in the target pool, the data elements are migrated from the actual page in a certain tier to the actual page in another tier. The page-based migration processing is described in details later.

The Page-Based Migration Processing.

Figure 34:
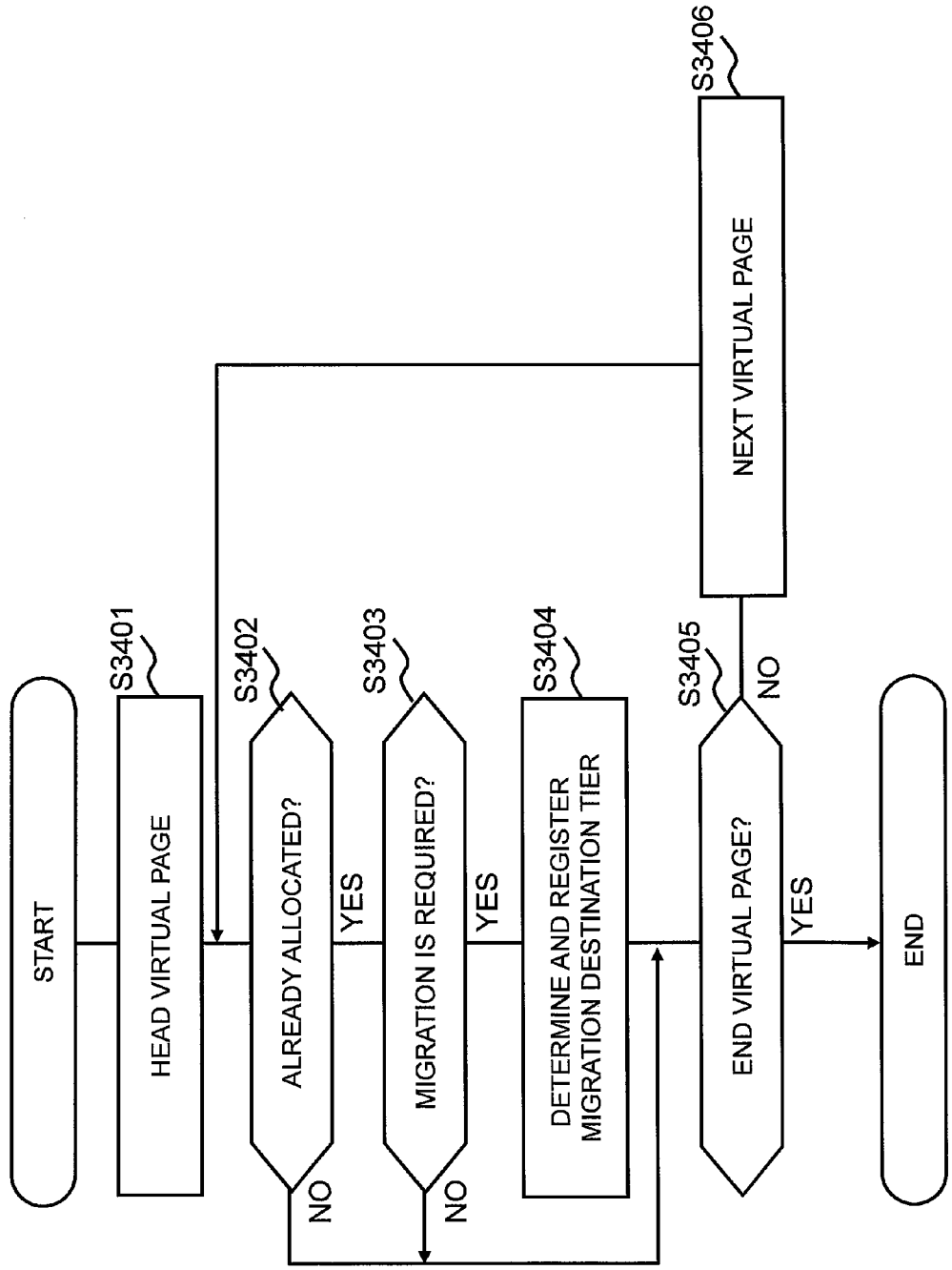
[FIG. 34]

FIG. 34 shows the flow of the migration page table creation processing at S2808 in FIG. 28.

(S3401)

The program 415 selects the head virtual page of the target VVOL.

(S3402)

The program 415, with reference to the allocation table 407, determines whether an actual page is allocated to the selected virtual page or not. If the result of this determination is negative, S3405 is performed while, if the result of this determination is affirmative, S3403 is performed.

(S3403)

The program 415, with reference to the monitor table 409, determines whether the tier where the data elements in the actual page allocated to the selected virtual page should exist should be changed or not. As more specifically described, for example, the processing below is performed.

The program 415 identifies the tier comprising the actual page allocated to the selected virtual page (referred to as a "target tier" in the description of S3403) from the table 402 (FIG. 6).

The program 415, with reference to the I/O frequency of the selected virtual page (e.g. at least one of the total number of I/Os, the average number of I/Os, and the maximum number of I/Os indicated by the active monitor table 409 corresponding with the target VVOL) and the value of the "tier range" corresponding with the target tier, determines whether the data elements in the actual page allocated to the selected virtual page should be migrated from the target tier to another tier or not. For example, if the I/O frequency of the selected virtual page does not fall within the tier range corresponding with the target tier of the selected virtual page, it is determined that the data elements should be migrated.

If the result of this determination at S3403 is negative, S3405 is performed while, if the result of this determination is affirmative, S3404 is performed.

(S3404)

The program 415, with reference to the I/O frequency of the selected virtual page (e.g. at least one of the total number of I/Os, the average number of I/Os, and the maximum number of I/Os indicated by the active monitor table 409B corresponding with the target VVOL) and the value of the "tier range" corresponding with the other allocated tiers in the pool comprising the target tier, determines the migration destination tier. At this point, for example, the allocated tier corresponding with the tier range the I/O frequency of the selected virtual page falls within (allocated tier of the target VVOL) is determined to be the migration destination tier. Then, the program 415, to the migration destination page table 411, registers the ID of the selected virtual page, the ID of the target tier, the ID of the determined migration destination tier, and "not completed" as the migration status.

(S3405)

The program 415 determines whether the selected virtual page is the virtual page at the end of the target VVOL or not.

If the result of this determination is negative, S3406 is performed while, if the result of this determination is affirmative, this migration page table creation processing is completed.
(S3406)

The program 415, from the target VVOL, selects the next virtual page after the virtual page selected at the last time. Then, for the selected virtual page, the processing S3402 and later is performed.

By this migration page table creation processing, the migration page table 411 for the page-based migration processing is created.

Figure 35:
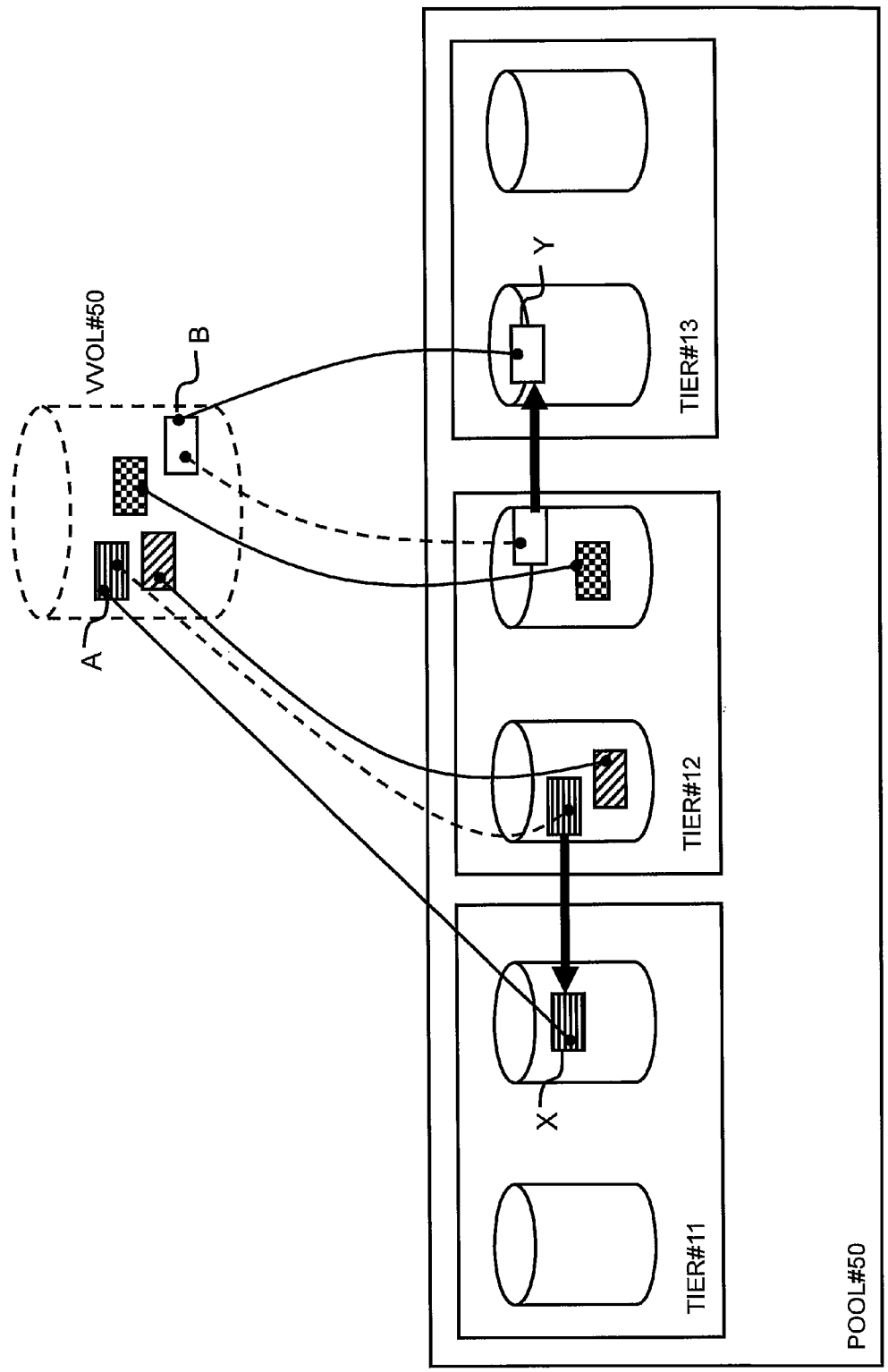
[FIG. 35]

FIG. 35 shows the overview of the page-based migration processing.

According to the page-based migration processing, for each virtual page registered to the table 411, the data elements in the actual page allocated to the virtual page are migrated to the free actual page in the migration destination tier corresponding with the virtual page. To the virtual page, instead of the migration source actual page, the migration destination actual page is allocated. As shown in FIG. 35, by this migration processing, some data elements are migrated to higher tiers and some tiers are migrated to lower tiers.

Depending on what type of tier range is set for what tier, the data elements in the virtual page appropriate for the I/O frequency of the virtual page can be allocated.

For example, let us assume that higher tier ranges are set for higher tiers and lower tier ranges are set for lower tiers. As more specifically described, for example, let us assume that a tier #11 is a high-speed and highly-reliable tier (e.g. a tier whose RVOL type is "SSD") and that a high tier range is set. Furthermore, for example, let us assume that a tier #13 is a low-speed, low-trust tier (e.g. a tier whose RVOL type is "HDD-SATA") and that a low tier range is set.

Furthermore, for example, let us assume that a tier #12 is the default tier of the VVOL #50 and that a medium tier range is set. In this case, the data elements as the write target for the virtual page configuring the VVOL #50 are written to the actual page in the default tier #12 once. Then, for example, if the I/O frequency of a virtual page #A in the VVOL #50 becomes high enough to fall within the high tier range, the data elements in the actual page #X allocated to the virtual page #A are migrated from the tier #12 to the tier #11. On the other hand, for example, if the I/O frequency of a virtual page #B in the VVOL #50 becomes low enough to fall within the low tier range, the data elements in the actual page #Y allocated to the virtual page #B are migrated from the tier #12 to the tier #13.

As mentioned above, with reference to what type of tier range is set for what tier, the result of monitoring the I/O frequency of each virtual page, and page-based data migration, the data elements in the VVOL can be allocated in appropriate tiers (physical storage resources).

FIG. 36 shows the flow of the page-based migration processing.
(S3601)

The reallocation program 415 updates the "pool status" of the pool allocated to the target VVOL to "reallocating."
(S3602)

The program 415 selects the head record of the created migration page table 411.
(S3603)

The program 415 updates the value of the "migration status" in the selected record to "in process."
(S3604)

The program 415 selects a free actual page from the migration destination tier indicated by the selected record and, to the selected actual page (migration destination actual page), migrates the data elements stored in the migration source actual page in the migration source tier. The migration source actual page is an actual page allocated to the target virtual page.
(S3605)

The program 415 updates the table. As more specifically described, for example, the processing below is performed.

The program 415 updates the allocation table 407 for allocating the migration destination actual page instead of the migration source actual page to the virtual page indicated by the selected record (hereinafter referred to as the "selected virtual page" in the description of S3605). That is, the program 415 makes the selected virtual page correspond with the ID of the migration destination actual page and the ID of the migration destination tier.

The program 415 updates the I/O frequency of the selected virtual page (e.g. the active table 409). As more specifically described, for example, the total number of I/Os of the selected virtual page or the target VVOL is incremented by 1.

The program 415 updates the value of the "usage rate" of the migration destination tier in the table 402 (FIG. 6).
(S3606)

The program 415 updates the value of the "migration status" in the selected record to "completed."
(S3607)

The program 415 determines whether the selected record is the record at the end of the virtual page table 411 or not. If the result of this determination is negative, S3608 is performed while, if the result of this determination is affirmative, this migration processing is completed.
(S3608)

The program 415, from the virtual page table 411, selects the next record after the record selected at the last time. Then, for the selected record, the processing S3603 and later is performed.

The flow of the page-based migration processing is as described above. Note that, as a variation of the page-based migration processing, for example, at least one of the multiple variations described below can be considered.

Between S3602 and S3603, the program 415, assuming that the data elements are migrated to the migration destination tier, may determine whether the usage rate of the migration destination tier exceeds the tier threshold of the migration destination tier or not. If the rate is determined to exceed the threshold, the program 415 may skip the processing from S3603 to S3606 and perform S3607 (i.e. the program 415 does not have to migrate the data elements for the selected record). In other cases, if the rate is determined to exceed the threshold, the program 415 may also be permitted to increase free actual pages in the migration destination tier by performing the reallocation processing for the VVOL whose allocated tier is the migration destination tier, and then start S3603.

If the usage rate of the migration destination tier is updated at S3605, the program 415 may determine whether the usage rate of the migration destination tier exceeds the tier threshold of the migration destination tier or not. If the rate is determined to exceed the threshold, the program 415 may display a caution on the management apparatus 107 and/or increase free actual pages in the migration destination tier by performing the reallocation processing for the VVOL whose allocated tier is the migration destination tier.

Changing the Tier Threshold.

The UI control program 413 can receive a change of the tier threshold from the administrator.

FIG. 37 shows the flow of the tier threshold changing processing.

(S3701)

The program 413 accepts the pool ID, the tier ID, and the tier threshold of the tier ID after the change.

(S3702)

The program 413 determines whether the value of the "usage rate" corresponding with the pool ID and the tier ID accepted at S3701 exceeds the tier threshold after the change or not.

(S3703)

The program 413, if the result of this determination is affirmative, displays an error on the management apparatus 107.

Monitoring the Usage Rate.

As mentioned above, the I/O control program 414 or the reallocation program 415, if data elements are written to an actual page, updates the value of the "usage rate" of the tier comprising the actual page in the table 402 (FIG. 6). Then, the program 414 or 415 may determine whether the updated value of the "usage rate" exceeds the value of the "tier threshold" corresponding with the tier or not. If the result of this determination is affirmative, the program 414 or 415 may perform the threshold excess handling processing shown in FIG. 38.

FIG. 38 shows the flow of the threshold excess handling processing.

The program 414 or 415 determines whether the "pool status" of the pool comprising the tier whose usage rate exceeds the tier threshold is "reallocating" or not (S3801).

If the result of the determination at S3801 is affirmative, the program 414 or 415 gives a caution to the management apparatus 107 or the host 101 (S3802). The caution, for example, may include the ID of the tier whose usage rate exceeds the tier threshold, the ID of the pool comprising the tier, and the value of the "pool status" of the pool ("reallocating").

If the result of the determination at S3801 is negative, the program 414 or 415 gives a caution to the management apparatus 107 or the host 101 (S3803), and performs the reallocation processing (FIG. 28) for making the usage rate of the tier equal to or lower than the threshold of the tier (S3804). Note that the caution at S3803 may include a message indicating the ID of the tier whose usage rate exceeds the tier threshold, the ID of the pool comprising the tier, and the performance of reallocation processing for the pool.

Data Element Aggregation.

In this embodiment, the data element aggregation processing may be performed.

Figure 21:
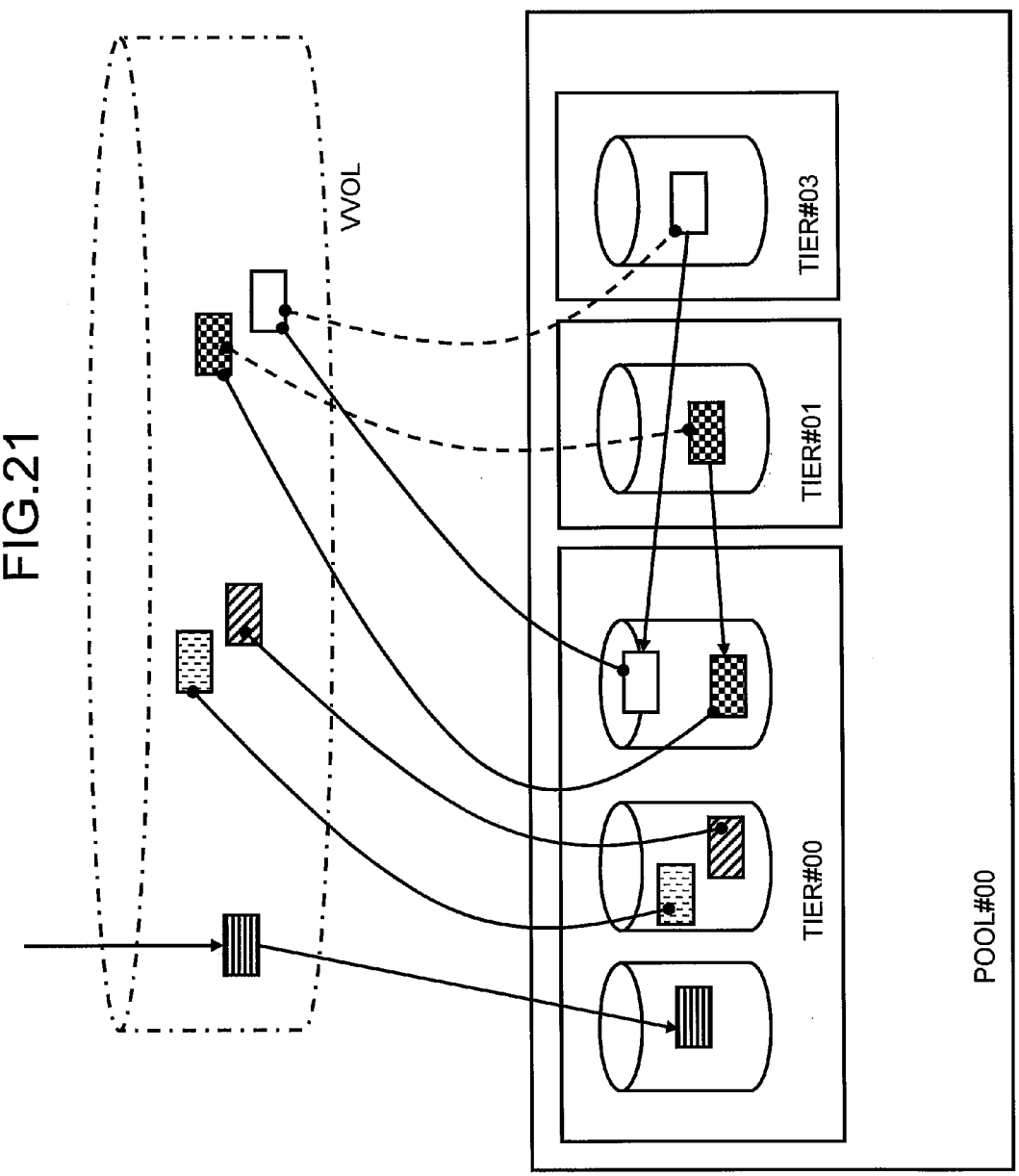
[FIG. 21]

FIG. 21 shows the overview of the data element aggregation processing.

The I/O control program 414 or the reallocation program 415, for a VVOL #39, periodically or when data elements are written to an actual page (e.g. when completing the page-based migration processing), checks the allocation of the data elements in the VVOL #39. As more specifically described, for example, the program 414 or 415 ascertains what rate of data elements among all data elements exist (i.e. storage rate) in each of the allocated tiers #00, #01, and #03 in the VVOL #39. The program 414 or 415 determines whether allocated tiers whose storage rate exceeds the storage threshold exist in each of the allocated tiers #00, #01, and #03 in the VVOL #39 or not.

The program 414 or 415, if allocated tiers whose storage rate exceeds the storage threshold exist, migrates the data elements in the other allocated tiers #01 and #03 than the relevant allocated tier #00 to the allocated tier #00 (specifically, for example, free actual pages in the allocated tier #00).

Note that, after this processing, for example, the program 414, if a write occurs to an virtual page in the VVOL #39 (especially, a virtual page to which no actual page is allocated), may always allocate an actual page from the allocated tier #00 to the virtual page.

Note that, if the migration of the data elements in the allocated tiers #01 and #03 (data elements in the VVOL #39) to the allocated tier #00 causes the usage rate of the allocated tier #00 to exceed the tier threshold of the allocated tier #00, the program 414 or 415 may perform the processing (x) or (y) described below.

(x) The program 414 does not migrate the data elements in the allocated tiers #01 and #03 to the allocated tier #00.

(y) The program 414, by migrating the data elements which are the data elements in the other VVOLs than the target VVOL and are in the allocated tier #00 to the other tiers, increases free actual pages in the allocated tier #00.

Furthermore, in this embodiment, at S2807 of FIG. 28, the tier range can be automatically determined. The tier range is determined, for example, by the MP performing the tier range determination program which is not shown in the figure.

With reference to one pool (hereinafter referred to as a "target pool" in the description of automatic determination of the tier range) as an example, the tier range determination processing is described below.

Figure 29:
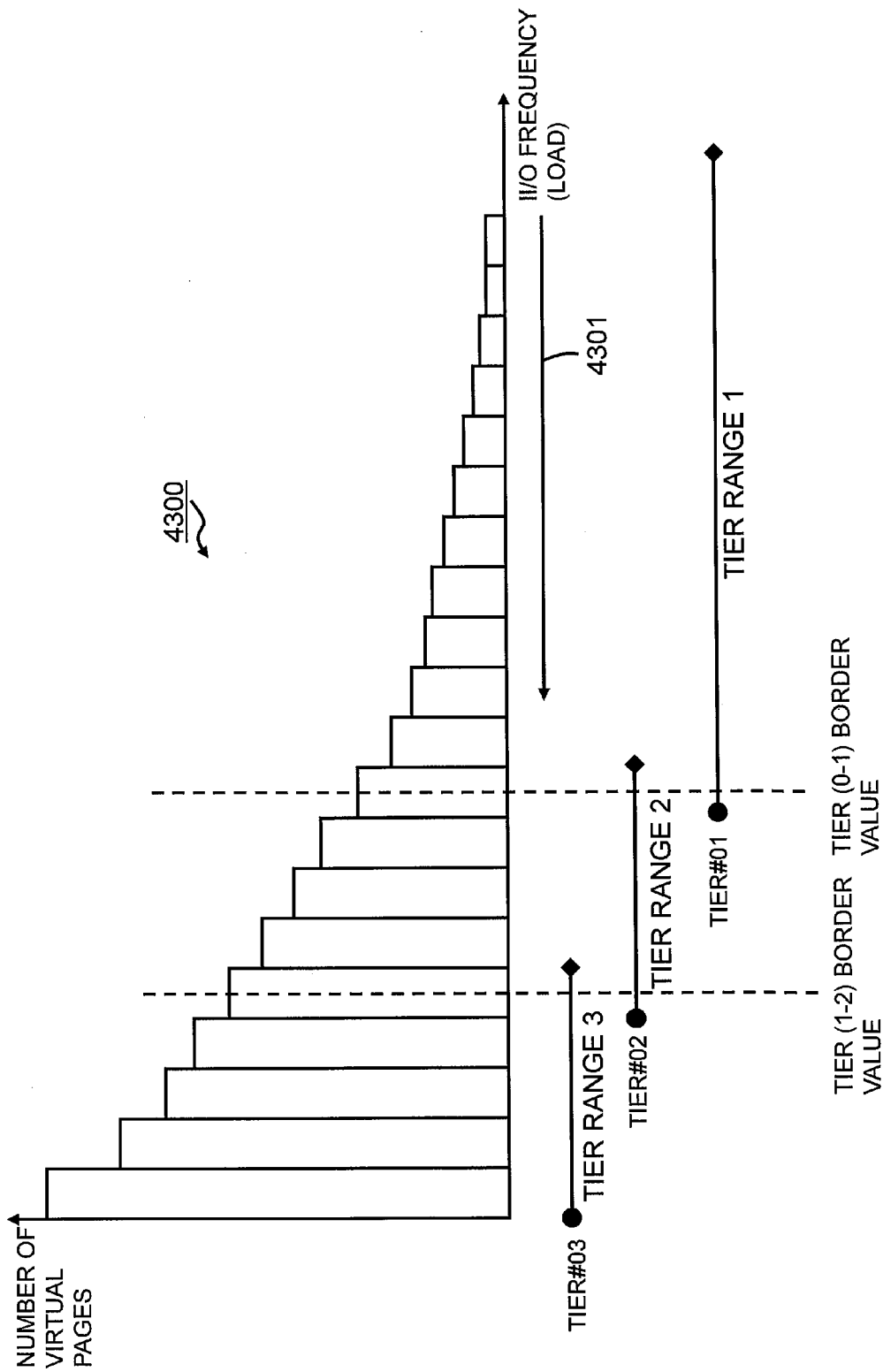
[FIG. 29]

FIG. 29 shows the overview of the tier range determination processing.

Let us assume that the target pool comprises three tiers, #01, #02, and #03. Let us assume that the tier #01 is the highest, the tier #02 is the second highest, and the tier #03 is the lowest. That is, it is assumed that the performance potential of the tier #01 is the highest, the performance potential of the tier #02 is the second highest, and the performance potential of the tier #03 is the lowest. The "performance potential" is the significance of the allocation of data elements in the reallocation processing. The performance potential is described in details later.

The tier range determination program, by aggregating the frequency distribution of all the VVOLs allocated to which the target pool is allocated, acquires the frequency distribution 4300 of the target pool. The horizontal axis of the frequency distribution is the I/O frequency (load), and the vertical axis is the number of virtual pages.

The tier range determination program, determines the tier ranges from the higher tier to the lower tier sequentially (or from the lower tier to the higher tier sequentially). Let us assume below that the tier ranges are determined in the order #01, #02, and #03. The processing performed for determining the tier range for each tier is described below (note that, in FIG. 29, a rhomboid marks the upper limit of a tier range, and a circle marks the lower limit of the tier range).

Determining the Tier Range 1 of the Tier #01

The tier range determination program, as the upper limit of the tier range 1 of the tier #01, sets infinite. That is, as the upper limit of the tier range of the highest tier, infinite is set.

The tier range determination program, as shown by an arrow 4301 in the frequency distribution 4300, cumulates the number of virtual pages from the side of the highest I/O frequency to the side of the lowest. If the cumulative total value reaches the performance potential of the tier #01, the tier range determination program sets the I/O frequency corresponding with the number of virtual pages added just before [the total value] reaches the performance potential of the tier #01 as the tier (0-1) border value (border value between the tier #00 and the tier #01).

The tier range determination program sets the I/O frequency which is lower than the tier (0-1) border value by a certain margin as the lower limit of the tier range 1 of the tier #01. As more specifically described, for example, the lower limit is the I/O frequency lower than the tier (0-1) border value by a certain rate (e.g. the I/O frequency which is lower by 10%).

The tier range determination program, assuming that the data elements in all the virtual pages whose I/O frequencies fall within the tier range 1 are migrated to the tier #01, determines whether the usage rate of the tier #01 exceeds the tier threshold of the tier #01 or not. If the result of this determination is affirmative, the tier range determination program alters the tier range 1 to the width where the usage rate of the tier #01 will not exceed the tier threshold of the tier #01.

Determining the Tier Range 2 of the Tier #02

The tier range determination program, as the upper limit of the tier range 1 of the tier #02, sets the I/O frequency which is higher than the tier (0-1) border value by a certain margin. As more specifically described, for example, the higher limit is the I/O frequency higher than the tier (0-1) border value by a certain rate (e.g. the I/O frequency which is higher by 10%).

The tier range determination program, in the frequency distribution 4300, cumulates the number of virtual pages from the tier (0-1) border value to the side of the lowest. If the cumulative total value reaches the performance potential of the tier #02, the tier range determination program sets the I/O frequency corresponding with the number of virtual pages added just before [the total value] reaches the performance potential of the tier #02 as the tier (1-2) border value (border value between the tier #01 and the tier #02).

The tier range determination program sets the I/O frequency which is lower than the tier (1-2) border value by a certain margin as the lower limit of the tier range 2 of the tier #02.

The tier range determination program, assuming that the data elements in all the virtual pages whose I/O frequencies fall within the tier range 2 are migrated to the tier #02, determines whether the usage rate of the tier #02 exceeds the tier threshold of the tier #02 or not. If the result of this determination is affirmative, the tier range determination program alters the tier range 2 to the width where the usage rate of the tier #02 will not exceed the tier threshold of the tier #02.

Determining the Tier Range 3 of the Tier #03

The tier range determination program, as the upper limit of the tier range 3 of the tier #03, sets the I/O frequency which is higher than the tier (1-2) border value by a certain margin.

The tier range determination program, as the lower limit of the tier range 2 of the tier #02, sets zero. That is, as the lower limit of the tier range of the lowest tier, zero is set.

The tier range determination program, assuming that the data elements in all the virtual pages whose I/O frequencies fall within the tier range 3 are migrated to the tier #03, determines whether the usage rate of the tier #03 exceeds the tier threshold of the tier #03 or not. If the result of this determination is affirmative, the tier range determination program alters the tier range 3 to the width where the usage rate of the tier #03 will not exceed the tier threshold of the tier #03.

By the method described above, the tier ranges 1 to 3 are determined.

Note that a margin for the tier border value is added to the upper limit and/or lower limit of the tier range for the prevention of frequent migration of data elements in accordance with the changes of the I/O frequency. As more specifically described, for example, if no margin exists and, at the same time, the I/O frequency of a certain virtual page frequently exceeds or falls below the tier (0-1) border value, the data elements in the virtual page are migrated to the tier #01 and to the tier #02 frequently. However, if the margin is set as mentioned above, the frequency of the occurrence of that type of migration can be reduced.

Hereinafter, more details of the tier range determination processing are described.

Figure 30:
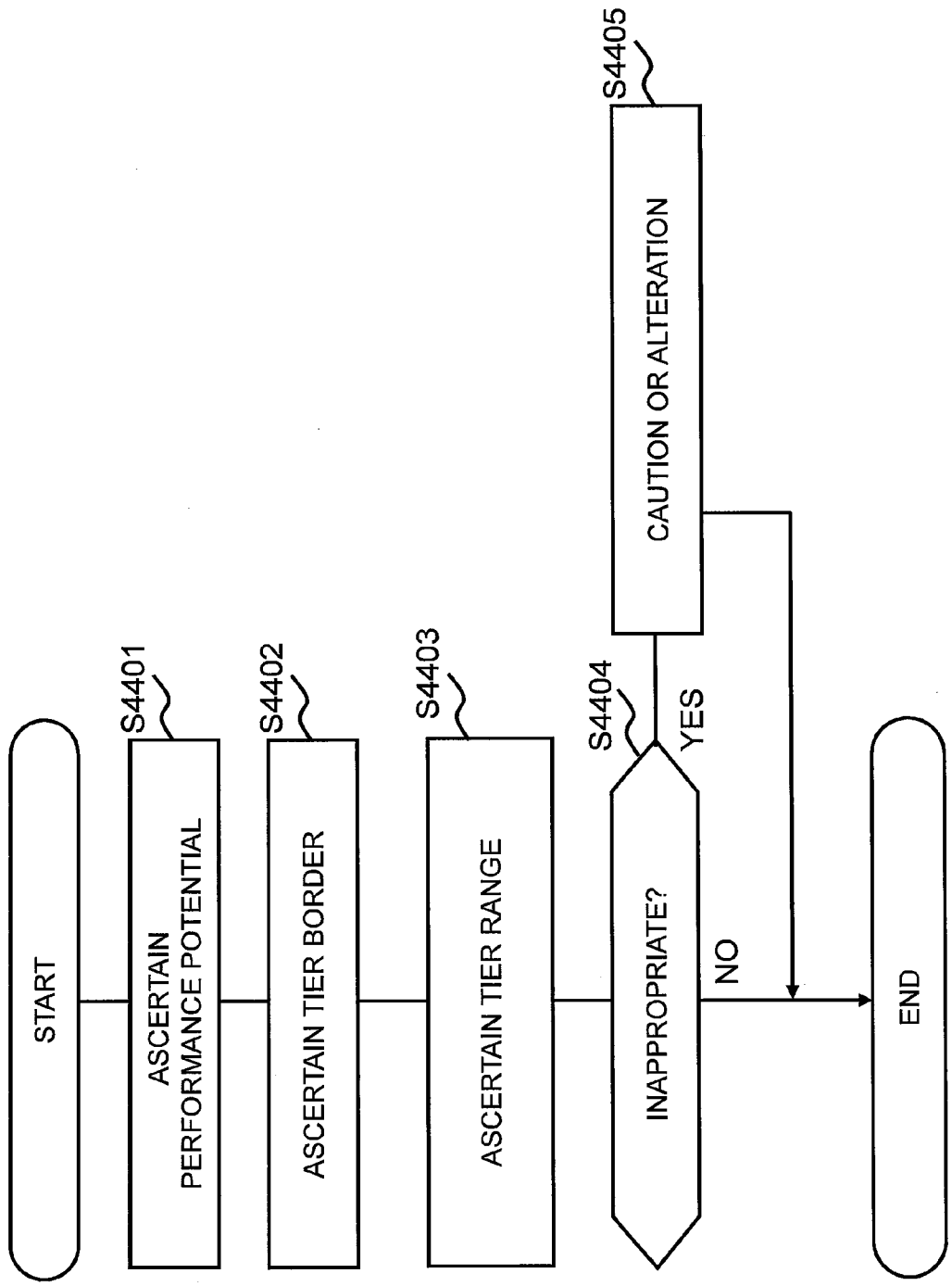
[FIG. 30]

FIG. 30 shows the flow of the tier range determination processing.

(S4401)

The tier range determination program ascertains the performance potential for each tier of the target pool. As for one tier (hereinafter referred to as a "target tier" in the description of S4401) as an example, the performance potential is ascertained as described below (Expression 1), $$\text{Performance potential} = \text{performance level} \times \text{number of effective actual pages (effective capacity)} \quad \text{(Expression 1).}$$

This (Expression 1) indicates that, even if the performance level is low, the performance potential is high if the number of effective actual pages is large.

Note that the "number of effective actual pages" is the total number of actual pages which can be the migration destination of data elements in the reallocation processing among all the actual pages configuring the target tier. That is, in a pool, to ensure the data elements as the write target from the host can be written during the reallocation processing, actual pages which are not made the migration destination in the reallocation processing may be set.

The "performance level" is the performance potential per unit capacity of the target tier (e.g. an actual page). The performance level is, for example, based on the value K ascertained as described below (Expression 2), $$\text{Value } K = \text{RG performance}/\text{RG effective capacity} \quad \text{(Expression 2).}$$

The "RG performance" in the (Expression 2) is, for example, the RG performance at the time the ratio of the read weight and the write weight is 1:1, and is the maximum number of I/Os that the RG as the base of the target tier can process per unit of time. The "RG effective capacity" in the (Expression 2) is, for example, the total number of actual pages storing data elements of the RG as the base of the target tier. Note that, to the performance level, in addition to or instead of the above-mentioned value K, the ratio of the read weight and the write weight may also be applied. The ratio may be changed based on, for example, at least one of the I/O status from the host, the cache memory status (e.g. the distribution of dirty data elements and clean data elements (data elements already stored in the actual page)), and the RAID level of the RG. Furthermore, the performance level may also be set manually by the administrator.

(S4402)

The tier range determination program performs the tier border value ascertaining processing. That is, the tier range determination program, with reference to the performance potential ascertained for each tier of the target pool, ascertains the tier border value.

(S4403)

The tier range determination program, with reference to each ascertained tier border value, ascertains a tier range for each tier.

(S4404)

The tier range determination program determines whether the tier range is inappropriate or not for each tier. As more specifically described with one tier (hereinafter referred to as a "target tier" in the description of S4403 and S4405) as an example, for example, the tier range determination program, assuming that the data elements in all the virtual pages whose I/O frequencies fall within the tier range of the target tier are migrated to the target tier, determines whether the usage rate of the target tier exceeds the tier threshold of the target tier or not.

(S4405)

If the result of the determination at S4404 is affirmative, the tier range determination program either displays a caution on the management apparatus 107 or alters the tier range to ensure that the usage rate of the target tier may not exceed the tier threshold of the target tier.

Figure 31:
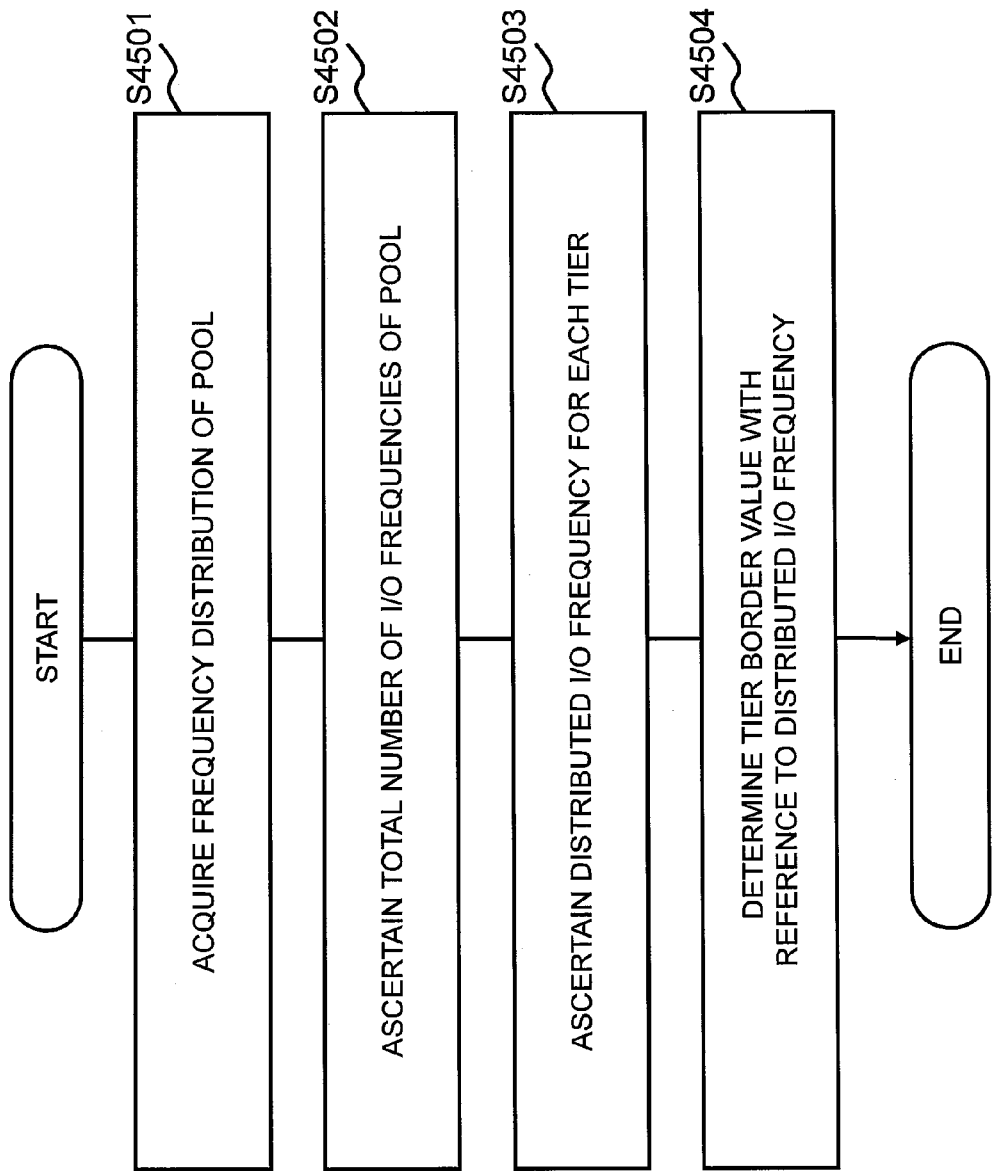
[FIG. 31]

FIG. 31 shows the flow of the tier border value ascertaining processing at S4402 in FIG. 30.

(S4501)

The tier range determination program, by aggregating the frequency distribution of all the VVOLs to which the target pool is allocated, acquires the frequency distribution of the target pool. The frequency distribution can be acquired by using the monitor table 409 corresponding to each VVOL to which the target pool is allocated.

(S4502)

The tier range determination program ascertains the total number of I/O frequencies of the target pool. As more specifically described, the tier range determination program sums the I/O frequencies of all the virtual pages of all the VVOLs to which the target pool is allocated.

(S4503)

The tier range determination program, with reference to the total number of I/O frequencies ascertained at S4502, ascertains the distributed I/O frequency for each tier of the target pool. As more specifically described, the tier range determination program distributes the total number of I/O frequencies ascertained at S4502 to the multiple tiers of the target pool. As more specifically described, for example, the tier range determination program, with reference to the performance potential ratio of the multiple tiers ascertained at S4401 in FIG. 30, distributes the total number of I/O frequencies to the multiple tiers. By this method, for example, if the performance potential ratio is Tier 0.01:Tier 0.02:Tier 0.03=4:2:1 and, at the same time, if the total number of I/O frequencies is 7000, the distributed I/O frequency for the Tier 0.01 is 4000(7000×(4/(4.2.1)), the distributed I/O frequency for the Tier 0.02 is 2000(7000×(2/(4.2.1)), and the distributed I/O frequency for the Tier 0.01 is 1000(7000×(1/(4.2.1)).

(S4504)

The tier range determination program, with reference to the distributed I/O frequency of each tier in the target pool, determines the tier border value. For example, in the example of S4503, the tier (0-1) border value is 2000, and the tier (1-2) border value is 1000.

According to the tier range determination processing described above, with reference to the performance potential of each tier and the frequency distribution of the target pool, for each tier, an appropriate tier range complying with the I/O status of the entire target pool can be set.

The description of the Embodiment 1 is as above.

Note that, in the Embodiment 1, for example, for a VVOL, the default tier may always be, among the allocated tiers of the VVOL, the tier with the highest I/O performance (e.g. the I/O speed or the response time) (e.g. the most significant tier of the allocated tiers). This is for the purpose of optimizing the I/O performance of the VVOL. In this case, the data elements written to the VVOL may be allocated to as high a tier as possible. However, the usage rate of the allocated tier is controlled for the prevention of exceeding the tier threshold of the allocated tier.

Furthermore, for example, commonly for an individual pool and for multiple pools, a save tier may be prepared. The program 414 or 415, for a save tier, to a save tier, normally, whether at a write in accordance with a write command from the host or in the migration processing in the reallocation processing, data elements are not written. However, the program 414 or 415, for example, if the usage rate of a tier as the write destination of the data elements (hereinafter referred to as a "target tier" in the description of this paragraph) exceeds the tier threshold of the tier, may also be permitted to migrate the data elements in an arbitrary actual page in the target tier (or data elements in an actual page in the target tier allocated to the virtual page whose I/O frequency does not fall within the tier range of the target tier) to the save tier, and by that method, increase free actual pages in the target tier. In this case, the program 414 or 415, to the virtual page allocated to the migration source actual page in the target tier, instead of the migration source actual page, may allocate the migration destination actual page in the save tier. After that, the program 414 or 415, to the tier where the tier range within which the I/O frequency of the virtual page allocated to the actual page in the save tier falls is set, may also be permitted to migrate the data elements stored in the actual page in the save tier. The save tier, for example, may be a tier configured of the same RVOL as the most significant tier.

Furthermore, the default tier does not have to be set. The data elements as the write target from the host 101 to the VVOL may be written to as high a tier as possible. If the usage rate of the high tier exceeds the tier threshold, the data elements may also be permitted to be written to the next lower tier from the high tier.

Furthermore, among the monitor tables 409B and 409A, the 409A does not necessarily have to exist. In this case, by summing the values of the I/O frequency of each virtual page which the monitor table 409B comprises, the I/O frequency of the VVOL may be ascertained.

Furthermore, the page-based migration processing can be suspended. For example, the reallocation program 415, if receiving a suspend instruction from the administrator, after performing the processing until making the migration status "in process" to the migration status "completed," can suspend the page-based migration processing. The program 415, for example, a certain length of time after receiving a suspend instruction or if receiving an instruction for resumption, may also be permitted to resume the migration processing with reference to the migration page table 411. Meanwhile, the program 415, if receiving a suspend instruction, may also be permitted to discard the migration page table 411 and, at the time of the next migration processing, create the migration page table 411 with reference to the active monitor tables 409.

Furthermore, though this embodiment assumes that, to a Thin Provisioning VVOL 203, an actual page is allocated in accordance with a write request from the host 101 to an address of the virtual page, this invention is not limited to this case, but the examples described below are also preferable. This is because these examples can also achieve the reduction of the actually used capacity.

The first example is as follows. That is, to some virtual pages of the multiple virtual pages in the VVOL 203 or part of the area included in each virtual page in the VVOL 203, before receiving a write request from the host 101 to an address of the virtual page, an actual area is allocated in advance (pre-allocation), in accordance with the write request from the host 101 to an address of the virtual page, if the already allocated area is not large enough and further allocation is required, an additional actual area is allocated.

The second example is as follows. That is, multiple virtual pages in the VVOL 203 are tentatively allocated (tentative allocation), before receiving a write request from the host 101 to an address of the virtual page, to an actual area or a control area where zero data is stored (these areas correspond with the areas in the storage devices such as SSDs) in advance and, in accordance with the write request from the host 101 to an address of the virtual page, the allocation destination is changed from the tentative allocation area to the actual page where the data should be stored (actual allocation). In this case, if a read request is received from the host 101 to an address of the virtual page before performing the actual allocation, zero data stored in the actual area or the control area as the tentative allocation description is returned to the host 101.

Furthermore, though this embodiment manages multiple pools 201 in one table for managing the multiple pools 201 collectively, this invention is not limited to this, and it is also preferable, for managing actual pages 207 collectively in each pool 201, to set a separate management table in each pool 201 (other forms of information than a table form may also be permitted).

Furthermore, the types of tiers 303 are not limited to the classification by attributes stated in this embodiment, SSD, HDD-SAS, HDD-SATA and others, but it is also preferable to classify the tiers by attributes such as HDD comprising the FC interface, or storage devices other than the HDD type e.g. devices configured of semiconductor storage media such as flash memories. In this case, the virtual page attribute associated with each tier 303 and the attribute of each actual page included in each tier 303 are also not limited to the classification by attributes stated in this embodiment SSD, HDD-SAS, HDD-SATA and others, but are also classified by attributes such as HDD comprising the FC interface, or storage devices other than the HDD type e.g. devices configured of semiconductor storage media such as flash memories.

Furthermore, the types of tiers 303 are not limited to the classification by attributes of the above-mentioned storage device types, but it is also preferable to classify the tiers by the attribute of combining the above-mentioned storage device types and the RAID type from RAID1 to RAID5 and others or the attribute of combining the above-mentioned storage device types, the performance of the above-mentioned storage devices (such as the access speed), the storage capacity, and the RAID type from RAID1 to RAID5 and others. In this case, the virtual page attribute associated with each tier 303 and the attribute of each actual page included in each tier 303 are also not limited to the classification by attributes of the above-mentioned storage device types, but are also classified by the attribute of combining the above-mentioned storage device types and the RAID type from RAID1 to RAID5 and others or the attribute of combining the above-mentioned storage device types, the performance of the above-mentioned storage devices (such as the access speed), the storage capacity, and the RAID type from RAID1 to RAID5 and others.

Embodiment 2

The Embodiment 2 of this invention is described below. At this point, the differences from the Embodiment 1 are mainly described, and the description common to the Embodiment 1 is omitted or shortened (which is true of the following Embodiment 3 and later).

In the Embodiment 2 of this invention, instead of or in addition to the I/O frequency, with reference to the last I/O time of each VVOL or each virtual page, the page-based migration processing is performed. The last I/O time is, as described in the Embodiment 1, if data elements are written to an actual page, registered to the monitor tables 409. The reallocation program, instead of or in addition to the relation between the I/O frequency of a virtual page and the tier range of the tier comprising the data elements in the virtual page, with reference to the last I/O time of the virtual page, determines the virtual page to be registered to the migration page table 411. For example, a virtual page whose last I/O time is earlier than the current time by a specified length of time or larger may be registered to the migration page table 411. In that case, the migration destination of the data elements in the virtual page may be a lower tier than the tier comprising the data elements in the virtual page. This is because the data elements in the virtual page with the earlier last I/O time are less probable to be input/output in the future, and are considered preferable to be allocated in a lower tier.

Embodiment 3

In the Embodiment 3 of this invention, in accordance with by which access pattern I/O is performed, sequential access or random access, the VOL-based or page-based migration processing is performed.

If the I/O target data is the data to which sequential access is performed and if the PDEV which is the base of the I/O destination RVOL is an HDD, the time for seeking the HDD can be short. In this case, even if the I/O target data is in an HDD of relatively low performance, the degree of performance deterioration can be considered small because sequential access is performed. Furthermore, by migrating data to which sequential access is performed to an inexpensive, low-performance PDEV, for other data to which random access is performed, more actual pages based on high-performance PDEVs can be made free. Therefore, the I/O performance of the entire storage system can be expected.

In the Embodiment 3, for example, the I/O control program 414, if data elements are written to an actual page, registers the access pattern of the I/O destination virtual page (sequential access or random access), for example, to the allocation table 407. To the allocation table 407, the performance frequency per access pattern per virtual page may be written.

The reallocation program 415, for example, for creating a migration page table 411, if the access pattern for a virtual page is sequential access (or if the performance frequency of sequential access is high), as the migration destination corresponding with the virtual page, may select a lower tier. Furthermore, for example, the reallocation program 415, even if the I/O frequency of the virtual page is higher than the maximum value of the tier range of the tier comprising the actual page allocated to the virtual page, does not have to make the data elements in the actual page the migration target.

Embodiment 4

In the Embodiment 4 of this invention, the two monitor tables 409, instead of being used alternately, are saved as uneditable in the CMPK 119 or other storage resources by specific timing. For example, the monitor table 409 showing the result of monitoring on Monday may be saved as the table 409 of the Monday while the monitor table 409 showing the result of monitoring on Saturday may be saved as the table 409 of the Saturday, separately from the monitor table 409 of the Monday. Doing this method increases the number of options for operating the reallocation processing.

In the Embodiment 4, for example, the reallocation program 415, just before reallocation, determines whether to save the active monitor table 409 or not, by asking the administrator or other means. If saving the table, just before the reallocation processing, the program 415 saves the monitor table 409 in the management apparatus 107 or other storage resources. The program 415 selects which monitor table 409 to refer to for creating the migration page table 411 from the multiple saved monitor tables 409 and, by using the selected monitor table 409, can create the migration page table 411.

Embodiment 5

In the Embodiment 5 of this invention, as means of comparing I/O frequencies with the tier range, either an absolute value comparison or a relative value comparison can be selected and set.

The "absolute value comparison" is, concerning the page-based migration processing, comparing the I/O frequency of a virtual page (e.g. the total number of I/Os, the average number of I/Os, or the maximum number of I/Os) as is with the tier range, without considering the I/O frequencies of the other virtual pages in the VVOL which comprises the virtual page. According to the absolute value comparison, as it is not necessary to consider the I/O frequencies of the other virtual pages or the VVOL, the time required for the comparison can be shortened, and therefore, the time required for the reallocation processing can be shortened.

The "relative value comparison" is, concerning the page-based migration processing, altering (normalizing) the I/O frequency of a virtual page (e.g. the total number of I/Os, the average number of I/Os, or the maximum number of I/Os) with reference to the I/O frequencies of the other virtual pages in the VVOL which comprises the virtual page, and comparing the altered I/O frequency with the tier range. As more specifically described, for example, even if the I/O frequency of a certain virtual page or a certain VVOL is low, if the I/O frequency of another virtual page or another VVOL is even lower, as a whole, the I/O frequency of the above-mentioned certain virtual page or VVOL is altered not to be very low. Meanwhile, for example, even if the I/O frequency of a certain virtual page or a certain VVOL is high, if the I/O frequency of another virtual page or another VVOL is even higher, as a whole, the I/O frequency of the above-mentioned certain virtual page or VVOL is altered not to be very high. According to the relative value comparison, the optimum allocation complying with the I/O status in the entire monitor time zone can be expected.

Furthermore, in this embodiment, whether the I/O frequency of the comparison target should be the average number of I/Os or the maximum number of I/Os, for example, can be selected and set. According to the average number of I/Os, the data elements can be expected to be allocated in accordance with the I/O frequency of the entire monitor time zone. According to the maximum number of I/Os, the data elements can be expected to be allocated to ensure that the I/O performance is not deteriorated even if the I/O frequency temporarily increases.

Whether the comparison means should be the absolute value comparison or the relative value comparison and whether the comparison target should be the average number of I/Os or the maximum number of I/Os can be set by the administrator through, for example, the above-mentioned pool definition GUI or the VVOL creation GUI. The comparison means and the comparison target related to the pool is, for example, registered to the pool management table 4403 as shown in FIG. 20, and the comparison means and the comparison target related to the VVOL is, for example, registered to the VVOL management table 4404 as shown in FIG. 20 (the columns shown in FIG. 7 and FIG. 8 are omitted in FIG. 32 and FIG. 20, but the columns also exists in the Embodiment 2). Note that, if the comparison means or the comparison targets are different between the VVOL and the pool assigned to the same, as in the Embodiment 1, the setting for the VVOL may be prioritized.

Figure 33:
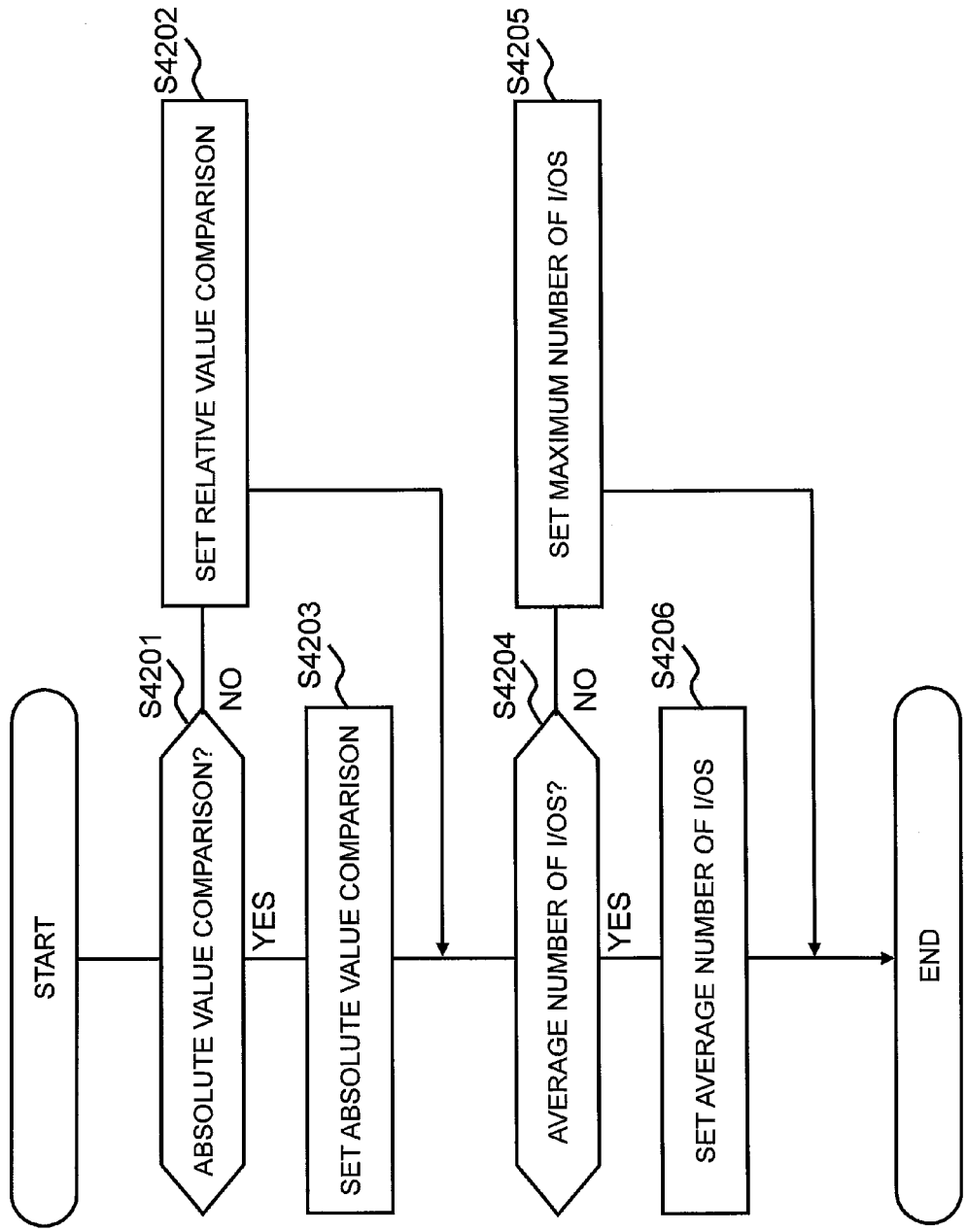
[FIG. 33]

FIG. 33 shows the flow of the setting processing of comparison means and comparison targets.

The setting processing of the comparison means and comparison targets may be performed, for example, in the pool creation processing and/or the VVOL creation processing.

The UI control program 413, for a certain pool or a certain VVOL (hereinafter referred to as "a target pool or a target VVOL" in the description of FIG. 33), if receiving a specification for the relative value comparison (S4201: NO), for the target pool or the target VVOL, sets the comparison means "relative value comparison" in the table 4403 or 4404 (S4202).

The program 413, for the target pool or the target VVOL, if receiving a specification for the absolute value comparison (S4201: YES), for the target pool or the target VVOL, sets the comparison means "absolute value comparison" in the table 4403 or 4404 (S4203).

The program 413, for the target pool or the target VVOL, if receiving a specification for the maximum number of I/Os (S4204: NO), for the target pool or the target VVOL, sets the comparison target "maximum number of I/Os" in the table 4403 or the table 4404 (S4205).

The program 413, for the target pool or the target VVOL, if receiving a specification for the average number of I/Os (S4204: YES), for the target pool or the target VVOL, sets the comparison target "average number of I/Os" in the table 4403 or the table 4404 (S4206).

Note that the comparison means and/or comparison targets, instead of being set manually by the administrator, may also be automatically set or changed. For example, the program 414 or 415, with reference to the monitor table 409B, checks the I/O status of the VVOL or the pool and, in accordance with the checked I/O status, may change the values of the "comparison means" and/or "comparison target" already set in the tables 4403 and/or 4403. For example, if it is detected that the variation of the I/O frequencies of all the virtual pages in one VVOL (or the I/O frequencies of multiple VVOLs) does not fall within a specified range, the "comparison means" may be changed from the "relative value comparison" to "absolute value comparison" while, on the contrary, if it is detected that the variation falls within the specified range, the "comparison means" may be changed from the "absolute value comparison" to "relative value comparison." Meanwhile, for example, if it is detected that the I/O frequency rapidly increases temporarily, the "comparison target" may be changed from the "average number of I/Os" to "maximum number of I/Os" while, on the contrary, if it is detected that the variation of the I/O frequencies falls within the specified range, the "comparison target" may be changed from the "maximum number of I/Os" to "average number of I/Os."

Though some embodiments of this invention were described as above, it is obvious that this invention is not limited to these embodiments and also comprises any changes or modifications within the spirit and scope hereof.

For example, at least one P-VOL may also be permitted to be a virtual P-VOL, and the PDEV which is the base of the P-VOL may also be permitted to exist in another storage system. In this case, the data elements written to the actual page configuring the P-VOL may be written to the PDEV in another storage system which is the base of the P-VOL.

Furthermore, for example, the monitor table 409, whether I/O for the actual page is performed or not, may also be permitted to be updated each time I/O for the virtual page occurs.

Furthermore, for example, in the page-based migration processing, for a virtual page as the allocation destination of the migration destination actual page or the VVOL comprising the virtual page, when the data elements are migrated to the migration destination actual page, the I/O frequency and the last I/O time does not have to be updated. After the migration, when I/O is performed for the actual page allocated to the virtual page or the VVOL in accordance with the I/O for the virtual page or the VVOL, the I/O frequency and the last I/O time of the virtual page or the VVOL may be updated.

Furthermore, for example, the RVOL type, instead of or in addition to the type of the PDEV comprising the RG which is the base of the RVOL, may be based on the RAID level of the RG (RAID1, RAID5 (3D+1P) and others). Therefore, for example, even if the PDEVs respectively configuring the first RG and the second RG are of the same type, if the RAID levels of the first RG and the second RG are different, that means the first RVOL based on the first RG and the second RVOL based on the second RG are of different types, and therefore, the first RVOL and the second RVOL may belong to different tiers. The tiers may also be permitted to be defined from other perspectives, regardless of the RVOL type.

Furthermore, for example, the capacity of one actual page may also be permitted to be the capacity such that multiple actual pages can be allocated to one virtual page. In this case, in page-based migration, for example, from the multiple migration source actual pages allocated to the virtual page, the data elements may be migrated to multiple migration destination actual pages respectively.

Furthermore, for example, the capacity of one actual page may also be permitted to be the capacity such that one actual page can be allocated to multiple virtual pages. In this case, in the page-based migration processing, multiple virtual pages are selected and, for those multiple virtual pages, the data elements may be migrated from the one migration source actual page to the multiple migration destination actual pages.

Furthermore, the pool VOL may also be permitted to be a virtual logical volume corresponding with the VOL provided by the external storage system. In this case, the data elements written to the actual page in the pool VOL are written to the VOL of the external storage system corresponding with the pool VOL.

Furthermore, the unit of the I/O frequency, for example, may also be permitted to be IOPS (the number of I/Os per second).

Furthermore, the range of the I/O frequency in the frequency distribution may also be permitted to be 1 (that is, the number of virtual pages may also be permitted to be counted per I/O frequency).

Reference Sign List

103: Storage system

The invention claimed is:

1. A storage system comprising:
a plurality of storage devices including a plurality of first storage devices and a plurality of second storage devices, wherein a performance of said plurality of first storage devices is better than a performance of said plurality of second storage devices; and
a controller being configured to manage a storage pool including a first tier storage area provided by said plurality of first storage devices and a second tier storage area provided by said plurality of second storage devices, and provide a virtual volume including a plurality of virtual storage areas including at least a first virtual storage area to which a first storage area in said first tier storage area is allocated and a second virtual storage area to which a second storage area in said second tier storage area is allocated;
wherein:
(A) if an I/O load on said first virtual storage area falls below a first threshold, said controller copies data in said first storage area, which is allocated to said first virtual storage area, to a third storage area in said second tier storage area, and allocates said third storage area instead of said first storage area to said first virtual storage area,
(B) if an I/O load on said second virtual storage area exceeds a second threshold, which is set to be greater than said first threshold to reduce a number of data copy processes between a storage area in said first tier storage area and a storage area in said second tier storage area, said controller copies data in said second storage area, which is allocated to said second virtual storage area, to a fourth storage area in said first tier storage area, and allocates said fourth storage area instead of said second storage area to said second virtual storage area, and
(C) if rate of allocated storage areas in first tier storage area to said virtual volume exceeds a third threshold, said controller copies data in said second storage area, which is allocated to said second virtual storage area, to the forth storage area in said first tier storage area, and allocates said forth storage area instead of said second storage area to said second virtual storage area.

2. A storage system according to the claim 1,
wherein said controller determines a tier border value by using an I/O load on each of said plurality of virtual storage areas, and
wherein said controller sets a value which is lower than said tier border value as said first threshold, and sets a value which is higher than said tier border value as said second threshold.

3. A storage system according to the claim 1,
wherein said controller determines a tier border value by cumulating I/O loads on virtual storage areas from a virtual storage area on which a highest I/O load occurs towards a virtual storage area on which a lowest I/O load occurs until a cumulated value reaches a predetermined value, and
wherein said controller sets a value which is lower than said tier border value by a certain margin as said first threshold, and sets a value which is higher than said tier border value by a certain margin as said second threshold.

4. A storage system according to the claim 1, wherein when the controller receives a write request to a virtual storage area in said virtual volume, the controller allocates a storage area in said first tier storage area or said second tier storage area to said virtual storage area.

5. A storage system according to the claim 1, wherein said I/O load on said first virtual storage area is a number of I/Os on said first virtual storage area.

6. A storage system according to the claim 1, wherein said I/O load on said first virtual storage area is a number of I/Os on said first virtual storage area within a monitor time zone which is specified by a management apparatus.

7. A storage system according to the claim 1, wherein said controller is configured to monitor said I/O load on said first virtual storage area within a monitor time zone which is specified by a management apparatus.

8. A storage system according to the claim 1, wherein said controller starts to perform (A) and (B) at a reallocation performance time which is specified by a management apparatus.

9. A storage system according to the claim 1,
wherein said controller includes a cache memory which stores data temporarily, and
wherein said controller is configured to not count an I/O to a virtual storage area for storing data which is stored in said cache memory.

10. A storage system according to the claim 1,
wherein said controller is configured to manage a first tier threshold for said first tier storage area and a second tier threshold for said second tier storage area, and
wherein if a capacity of one or more first storage devices in said first tier storage area, which are allocated to one or more virtual storage areas in said virtual volume, exceeds said first tier threshold or if a capacity of one or more second storage devices in said second tier storage area, which are allocated to one or more virtual storage areas in said virtual volume, exceeds said second tier threshold, said controller issues an error command to a management apparatus.

11. A storage system according to the claim 1,
wherein said controller is configured to manage a first tier threshold for said first tier storage area and a second tier threshold for said second tier storage area, and
wherein if a capacity of one or more first storage devices in said first tier storage area, which are allocated to one or more virtual storage area in said virtual volume, exceeds said first tier threshold or if a capacity of one or more second storage devices in said second tier storage area, which are allocated to one or more virtual storage area in said virtual volume, exceeds said second tier threshold, said controller starts to perform (A) and (B).

12. A storage system according to the claim 1,
wherein a first disk type of said plurality of first storage devices is a solid state drive type and a second disk type of said plurality of second storage devices is a hard disk drive type.

13. A storage system according to the claim 1,
wherein a first disk type of said plurality of first storage devices is a hard disk drive type including serial attached SCSI interface and a second disk type of said plurality of second storage devices is a hard disk drive type including serial ATA interface.

14. A storage system comprising:
a plurality of storage devices including a plurality of first storage devices and a plurality of second storage devices, wherein a performance of said plurality of first storage devices is different from a performance of said plurality of second storage devices; and
a controller being configured to manage a storage pool including a first tier storage area provided by said plurality of first storage devices and a second tier storage area provided by said plurality of second storage devices, and provide a virtual volume including at least a first virtual storage area to which a first storage area in said first tier storage area is allocated and a second virtual storage area to which a second storage area in said second tier storage area is allocated;
wherein said controller is configured to manage a first tier range which is a range of I/O load on a virtual storage area in said virtual volume to which a storage area in said first tier storage area should be allocated, and a second tier range which is a range of I/O load on a virtual storage area in said virtual volume to which a storage area in said second tier storage area should be allocated,
wherein:
(A) if an I/O load on said first virtual storage area exceeds said first tier range, said controller copies data in said first storage area, which is allocated to said first virtual storage area, to a third storage area in said second tier storage area, and allocates said third storage area instead of said first storage area to said first virtual storage area, and
(B) if an I/O load on said second virtual storage area exceeds said second tier range, said controller copies data in said second storage area, which is allocated to said second virtual storage area, to a fourth storage area in said second tier storage area, and allocates said fourth storage area instead of said second storage area to said second virtual storage area,
(C) if a rate of allocated storage areas in said first tier storage area to said virtual volume exceeds a third threshold, said controller copies data in said second storage area, which is allocated to said second virtual storage area, to said forth storage area in said first tier storage area, and allocates said fourth storage area instead of said second storage area to said second virtual storage area, and
wherein, a part of said first tier range is set to overlap a part of said second tier range to reduce a number of data copy processes between a storage area in said first tier storage area and a storage area in said second tier storage area.

15. A storage system according to the claim 14,
wherein said controller determines a tier border value by using an I/O load on each of said plurality of virtual storage areas, and
wherein said controller sets a value which is lower than said tier border value as a lower limit of said first tier range, and sets a value which is higher than said tier border value as an upper limit of said second tier range.

16. A storage system according to the claim 14,
wherein said controller calculates a tier border value by cumulating I/O loads on virtual storage areas from a virtual storage area on which a highest I/O load occurs toward a virtual storage area on which a lowest I/O load occurs until a cumulated value reaches a predetermined value, and
wherein said controller sets a value which is lower than said tier border value by a certain margin as a lower limit of said first tier range, and sets a value which is higher than said tier border value by a certain margin as an upper limit of said second tier range.

17. A storage system according to the claim 14, wherein when the controller receives a write request to a virtual storage area in said virtual volume, the controller allocates a storage area in said first tier storage area or said second tier storage area to said virtual storage area.

18. A storage system according to the claim 14, wherein said I/O load is a number of I/O requests.

19. A storage system according to the claim 14, wherein said I/O load is a number of I/O requests within a monitor time zone which is specified by a management apparatus.

20. A storage system according to the claim 14, wherein said controller is configured to monitor said I/O load on said virtual storage area in said virtual volume within a monitor time zone which is specified by a management apparatus.

21. A storage system according to the claim 14, wherein said controller starts to perform (A) and (B) at a reallocation performance time which is specified by a management apparatus.

22. A storage system according to the claim 14,
wherein said controller includes a cache memory which stores data temporarily, and
wherein said controller is configured to not count an I/O request to a virtual storage area storing data which is stored in said cache memory.

23. A storage system according to the claim 14,
wherein said controller is configured to manage a first tier threshold for said first tier storage area and a second tier threshold for said second tier storage area, and
wherein if a capacity of one or more first storage devices of said first tier storage area, which are allocated to one or more virtual storage areas in said virtual volume, exceeds said first tier threshold or if a capacity of one or more second storage devices of said second tier storage area, which are allocated to one or more virtual storage areas in said virtual volume, exceeds said second tier threshold, said controller issues an error command to a management apparatus.

24. A storage system according to the claim 14,
wherein said controller is configured to manage a first tier threshold for said first tier storage area and a second tier threshold for said second tier storage area, and
wherein if a capacity of one or more first storage devices first tier storage areas, which is allocated to one or more virtual storage areas in said virtual volume, exceeds said first tier threshold or if a capacity of one or more second storage devices of said second tier storage area, which are allocated to one or more virtual storage areas in said virtual volume, exceeds said second tier threshold, said controller starts to perform (A) and (B).

25. A storage system according to the claim 14,
wherein a first disk type of said plurality of first storage devices is a solid state drive type and a second disk type of said plurality of second storage devices is a hard disk drive type.

26. A storage system according to the claim 14,
wherein a first disk type of said plurality of first storage devices is a hard disk drive type including serial attached SCSI interface and a second disk type of said plurality of second storage devices is a hard disk drive type including serial ATA interface.

* * * * *